(12) United States Patent
Hedin

(10) Patent No.: US 11,255,747 B2
(45) Date of Patent: Feb. 22, 2022

(54) APPARATUS AND METHOD FOR ANALYSING THE CONDITION OF A MACHINE HAVING A ROTATING PART

(71) Applicant: S.P.M. Instrument AB, Strängnäs (SE)

(72) Inventor: Lars-Olov Hedin, Hallstahammar (SE)

(73) Assignee: S.P.M. Instrument AB, Strängnäs (SE)

(*) Notice: Subject to any disclaimer, the term of this patent is extended or adjusted under 35 U.S.C. 154(b) by 0 days.

(21) Appl. No.: 16/427,183

(22) Filed: May 30, 2019

(65) Prior Publication Data

US 2019/0383702 A1 Dec. 19, 2019

Related U.S. Application Data

(63) Continuation of application No. 14/373,725, filed as application No. PCT/SE2013/050079 on Jan. 30, 2013, now Pat. No. 10,337,957.

(Continued)

(30) Foreign Application Priority Data

Jan. 30, 2012 (SE) .................................. 1250061-7

(51) Int. Cl.
G01M 13/00 (2019.01)
G06F 7/06 (2006.01)
(Continued)

(52) U.S. Cl.
CPC ............ G01M 13/00 (2013.01); G01H 1/003 (2013.01); G01M 13/028 (2013.01);
(Continued)

(58) Field of Classification Search
None
See application file for complete search history.

(56) References Cited

U.S. PATENT DOCUMENTS 3,705,516 A 12/1972 Reis
4,528,852 A 7/1985 Sohoel
(Continued)

FOREIGN PATENT DOCUMENTS

CN 1926413 3/2007
CN 101266197 9/2008
(Continued)

OTHER PUBLICATIONS

International Search Report in PCT/SE2013/050079 dated May 15, 2013 in four pages.
(Continued)

*Primary Examiner* — Matthew G Marini
(74) *Attorney, Agent, or Firm* — Knobbe Martens Olson and Bear, LLP

(57) ABSTRACT

An apparatus for analysing the condition of a machine having a part rotating with a speed of rotation ($f_{ROT}$), comprising: a first sensor (10) adapted to generate an analogue electric measurement signal ($S_{EA}$) dependent on mechanical vibrations ($V_{MD}$) emanating from rotation of said part; an analogue-to-digital converter (40, 44) adapted to sample said analogue electric measurement signal ($S_{EA}$) at an initial sampling frequency ($f_S$) so as to generate a digital measurement data signal (SMD, $S_{ENV}$) in response to said received analogue electric measurement signal ($S_{EA}$); a device (420) for generating a position signal (Ep) having a sequence of position signal values ($P_{(i)}$) for indicating momentary rotational positions of said rotating part; and a speed value generator (601) being adapted for recording a time sequence of said position signal values ($P_{(i)}$) such that there are angular distances (delta-$FI_{p1\text{-}p2}$, delta-$FI_{p2\text{-}p3}$) and corresponding durations (delta-$T_{p1\text{-}p2}$; delta-$T_{p2\text{-}p3}$) between at least three consecutive position signals (P1, P2, P3) wherein the speed value generator (601) operates to estab- (Continued)

lish at least two momentary speed values (VT1; VT2) based on said angular distances (delta-$FI_{p1\text{-}p2}$, delta-$FI_{p2\text{-}p3}$) and said corresponding durations (delta-$T_{p1\text{-}p2}$; delta-$T_{p2\text{-}p3}$), and wherein further momentary speed values for the rotational part (8) are established by interpolation between the at least two momentary speed values (VT1, VT2).

12 Claims, 42 Drawing Sheets

Related U.S. Application Data

(60) Provisional application No. 61/592,070, filed on Jan. 30, 2012.

(51) Int. Cl.
  *G01H 1/00* (2006.01)
  *G01M 13/028* (2019.01)
  *G01M 13/045* (2019.01)
  *G01P 3/00* (2006.01)

(52) U.S. Cl.
  CPC ............ *G01M 13/045* (2013.01); *G01P 3/00* (2013.01); *G06F 7/06* (2013.01)

(56) References Cited

U.S. PATENT DOCUMENTS

| | | | |
|---|---|---|---|
| 4,912,661 A | 3/1990 | Potter | |
| 4,991,442 A * | 2/1991 | Matsumoto | F16C 19/52 73/660 |
| 5,109,700 A | 5/1992 | Hicho | |
| 5,192,929 A | 3/1993 | Walker | |
| 5,390,545 A | 2/1995 | Doan | |
| 5,825,657 A * | 10/1998 | Hernandez | G01M 13/028 702/182 |
| 6,332,116 B1 | 12/2001 | Qian et al. | |
| 6,496,782 B1 * | 12/2002 | Claus | G05B 23/0221 702/34 |
| 6,874,364 B1 | 4/2005 | Campbell et al. | |
| 7,505,852 B2 | 3/2009 | Board | |
| 7,770,458 B2 | 8/2010 | Blanchard et al. | |
| 8,762,104 B2 | 6/2014 | Hedin | |
| 8,810,396 B2 | 8/2014 | Hedin | |
| 8,812,265 B2 | 8/2014 | Hedin | |
| 2003/0182071 A1 | 9/2003 | Ditommaso et al. | |
| 2007/0112443 A1 * | 5/2007 | Latham | H02M 3/157 700/29 |
| 2007/0282545 A1 | 12/2007 | Board | |
| 2008/0033695 A1 | 2/2008 | Sahara et al. | |
| 2008/0223135 A1 | 9/2008 | Blanchard et al. | |
| 2009/0164142 A1 | 6/2009 | Studer et al. | |
| 2009/0193900 A1 | 8/2009 | Janssens et al. | |
| 2010/0288051 A9 | 11/2010 | Janssens et al. | |
| 2011/0285532 A1 | 11/2011 | Hedin | |
| 2011/0295556 A1 | 12/2011 | Hedin | |
| 2011/0295557 A1 | 12/2011 | Hedin | |
| 2012/0296582 A1 | 11/2012 | Hedin | |
| 2014/0365176 A1 | 12/2014 | Hedin | |
| 2014/0372079 A1 | 12/2014 | Hedin | |

FOREIGN PATENT DOCUMENTS

| | | | |
|---|---|---|---|
| EP | 0107178 | 5/1984 | |
| EP | 1226414 | 7/2002 | |
| JP | 04-279826 | 10/1992 | |
| WO | WO 2007-137132 | 11/2007 | |
| WO | WO 2010-074645 | 7/2010 | |
| WO | WO 2010-074646 | 7/2010 | |
| WO | WO 2010-074648 | 7/2010 | |
| WO | WO-2010128928 A1 * | 11/2010 | ............ G01H 1/003 |
| WO | WO 2011-087440 | 7/2011 | |

OTHER PUBLICATIONS

Extended European Search Report, dated Sep. 16, 2015; Application No. 12810816.4.
Extended European Search Report, dated Sep. 2, 2015; Application No. 13744257.0.
Supplemental Partial European Search Report in corresponding European Application No. 13837138, dated May 4, 2016.
James Lundy, "Detecting Lubrication Problems Using Shock Pulse," Lubrication & Fluid Power, Feb. 2006.
CN Office Action, dated Nov. 23, 2015; Application No. 201380007381X.
CN Office Action, dated Apr. 29, 2015; Application No. 2012800347548.

* cited by examiner

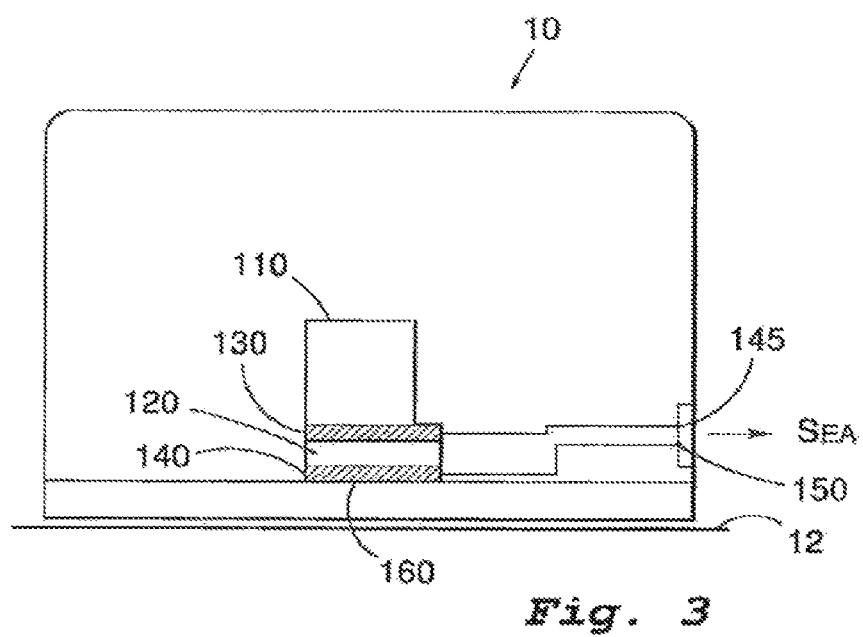

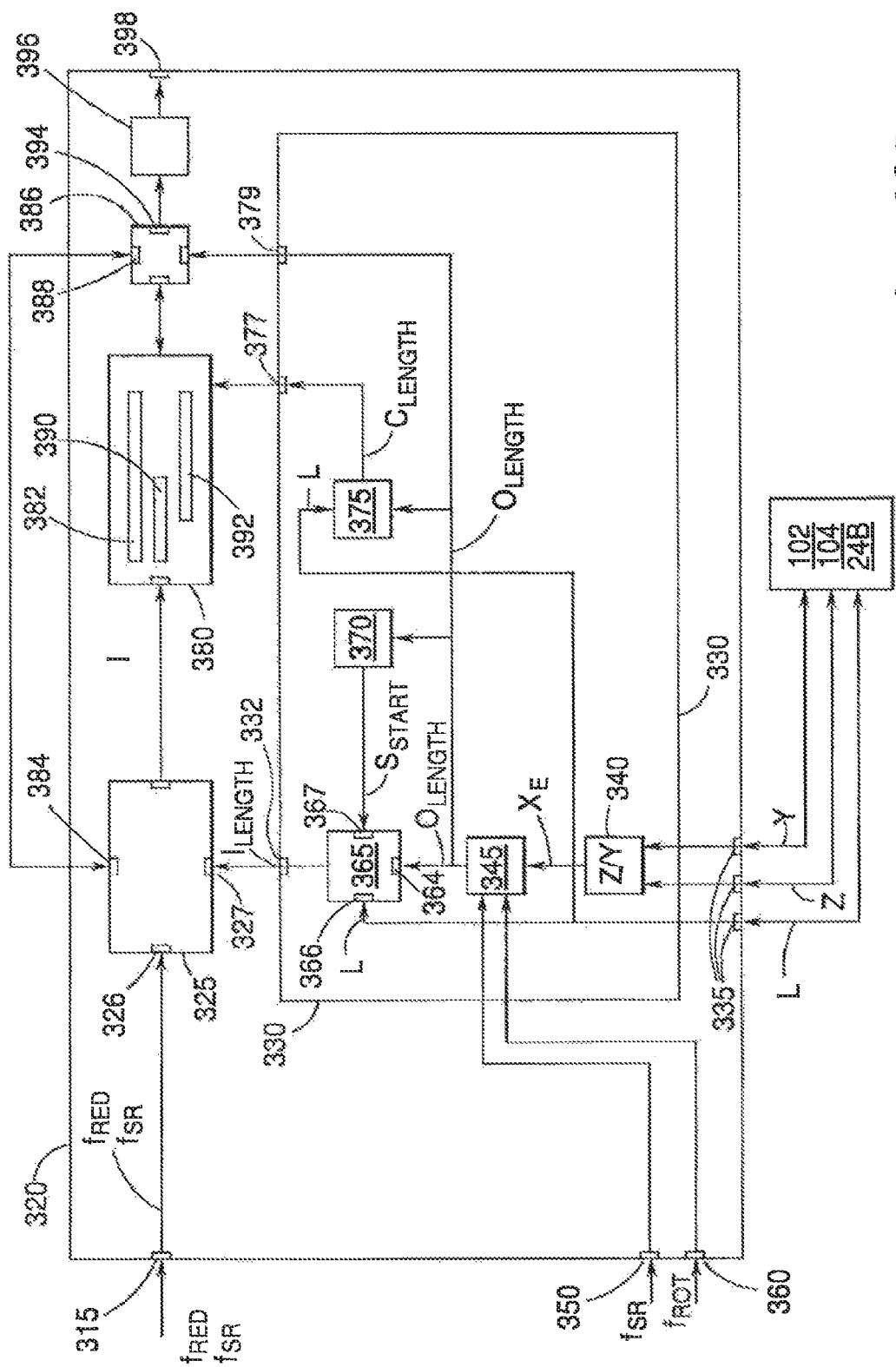

| i | t | P(i, t) | $S_{MDP}(t)$ |
|---|---|---|---|
| $i_0$ | $t_0$ | $I(i_0) * I(i_0 + S_{START} + t_0)$ | |
| $i_0 + 1$ | $t_0$ | $I(i_0+1) * I(i_0 +1+ S_{START} + t_0)$ | |
| ... | | | |
| $i_0 + n$ | $t_0$ | $I(i_0+n) * I(i_0 +n+ S_{START} + t_0)$ | |
| ... | | | |
| $i_0 + C_{LENGTH} - 1$ | $t_0$ | $I(i_0 + C_{LENGTH} -1) * I(i_0 + C_{LENGTH} -1 + S_{START} + t_0)$ | $SMDP(t0) = \sum_{i=i0}^{i=i0+C_{LENGTH}-1} P(i, t0)$ |
| $i_0+1$ | $t_0 + 1$ | $I(i_0+1) * I(i_0 +1+ S_{START} + t_0+1)$ | |
| ... | ... | ... | |
| $i_0 + n$ | $t_0 + 1$ | $I(i_0+n) * I(i_0 +n+ S_{START} + t_0+1)$ | |
| ... | ... | ... | |
| $i_0 + C_{LENGTH} - 1$ | $t_0 + 1$ | $I(i_0 + C_{LENGTH}-1) * I(i_0 + C_{LENGTH}-1 + S_{START} + t_0+1)$ | $SMDP(t0+1) = \sum_{i=i0}^{i=i0+C_{LENGTH}-1} P(i, t0+1)$ |
| ... | ... | ... | ... |

Table I

*Fig. 10H*

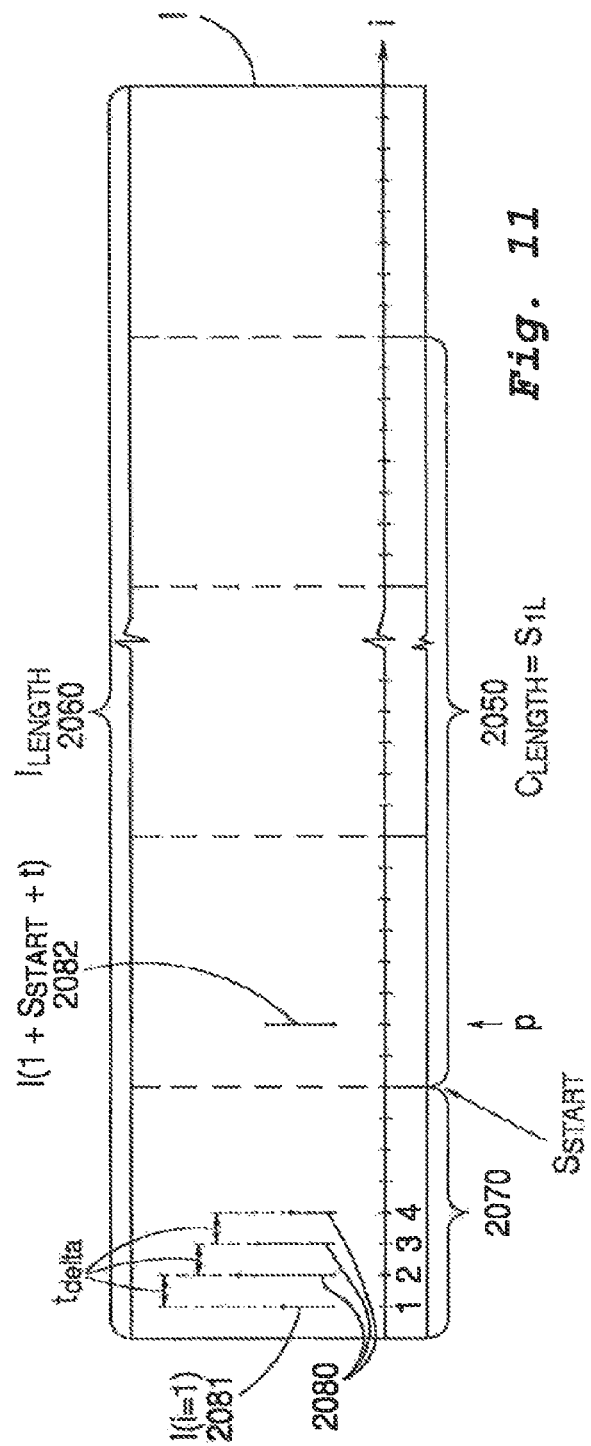

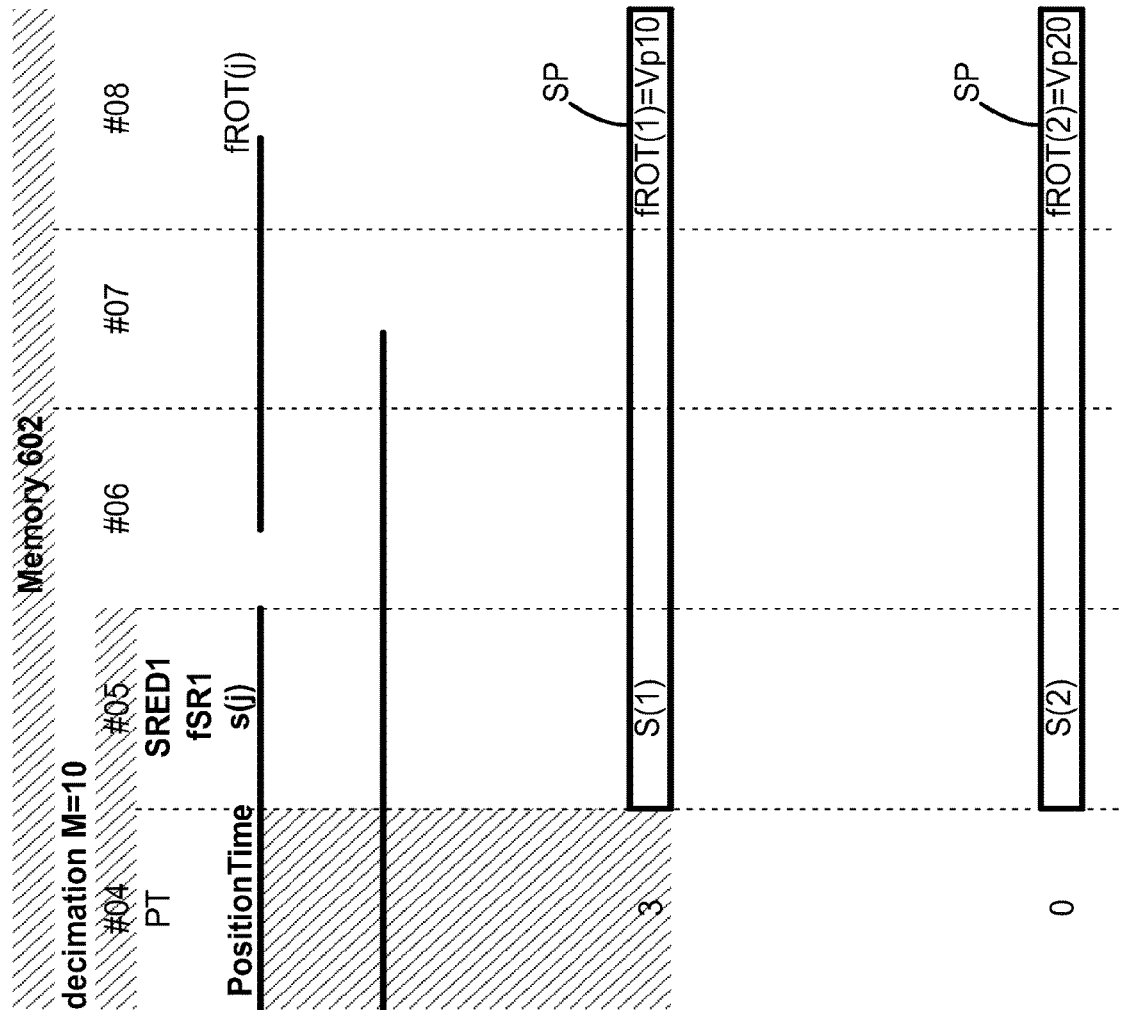
Fig. 19C Part 1

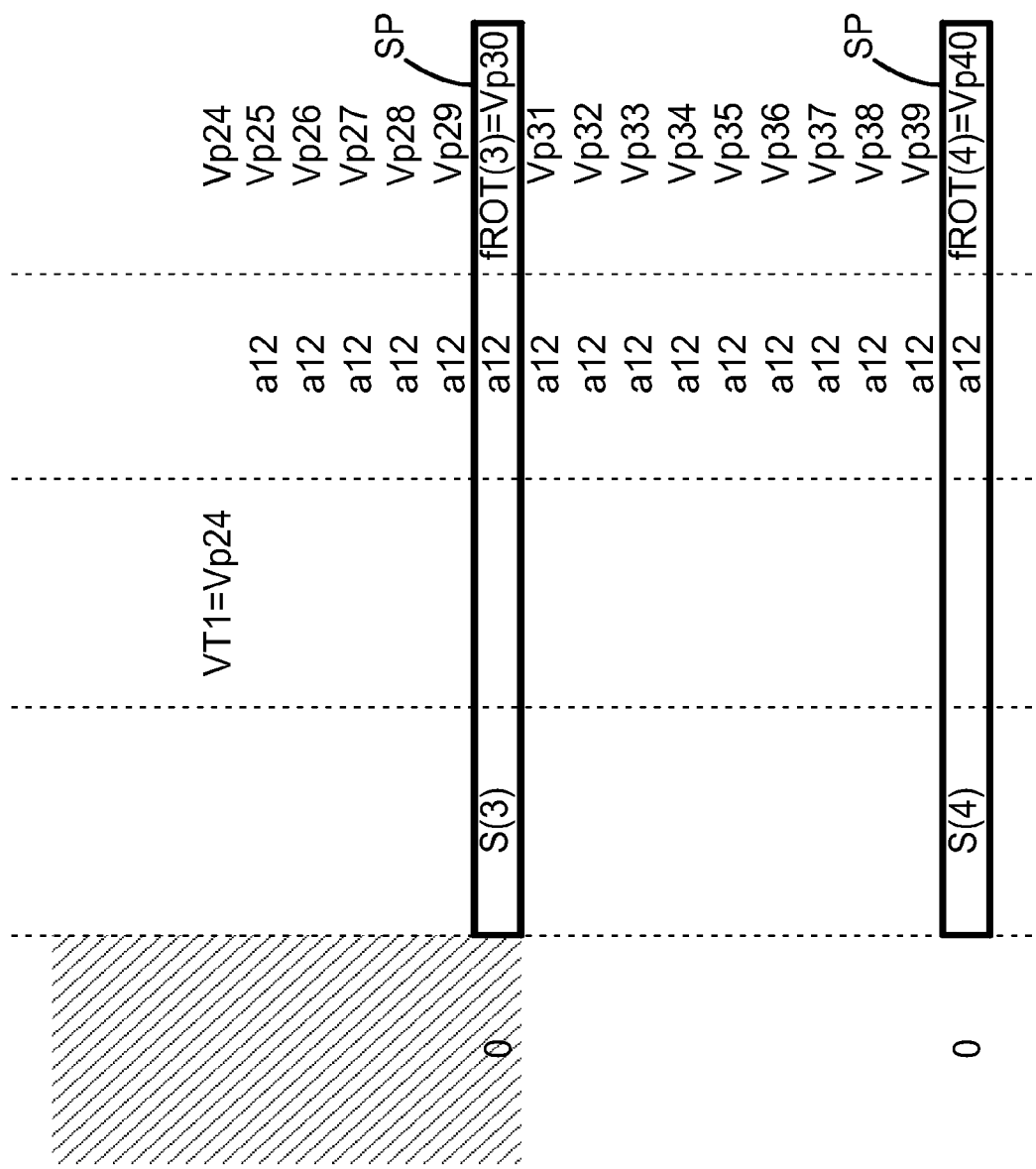
Fig. 19C Part 2

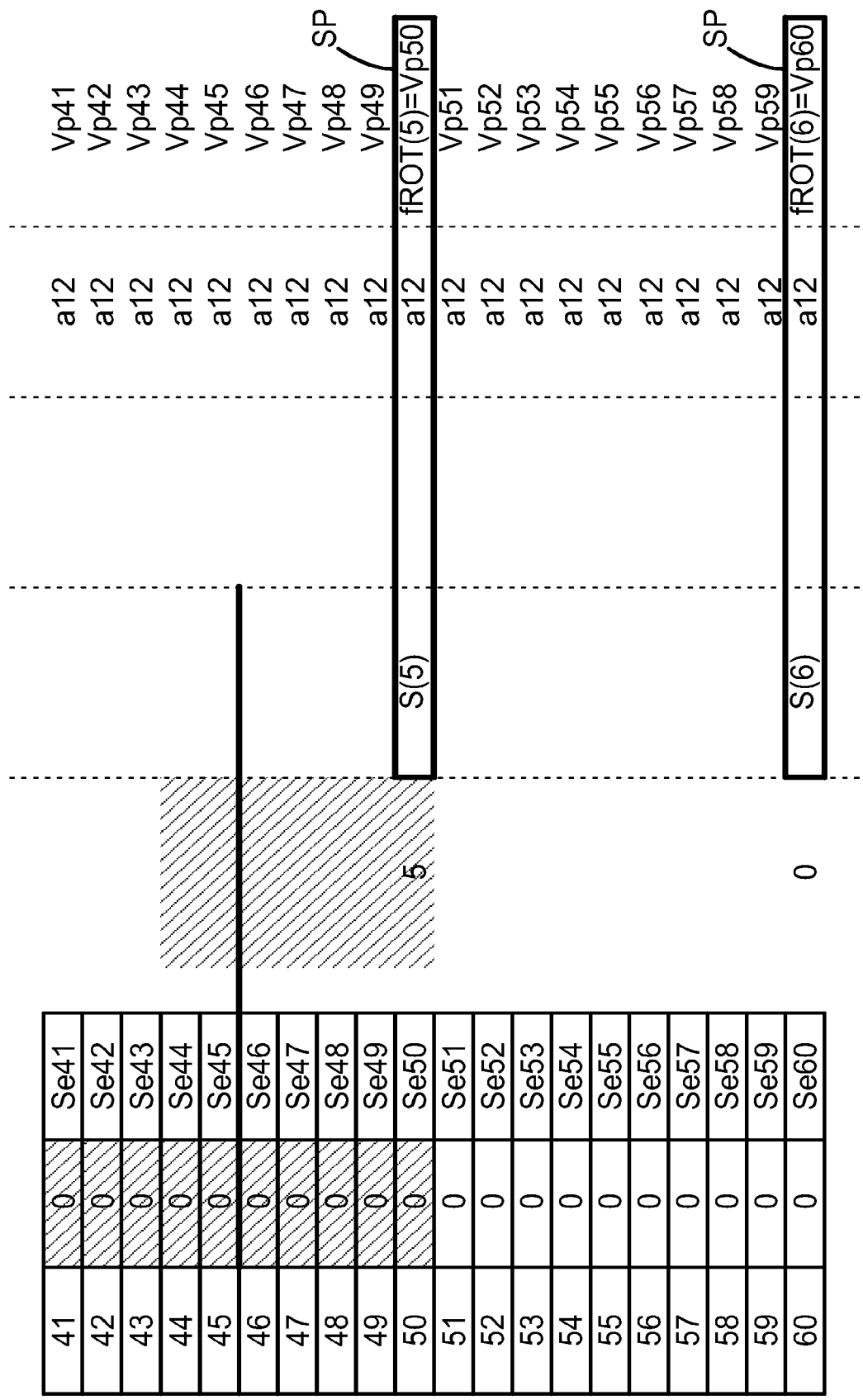
Fig. 19C Part 3

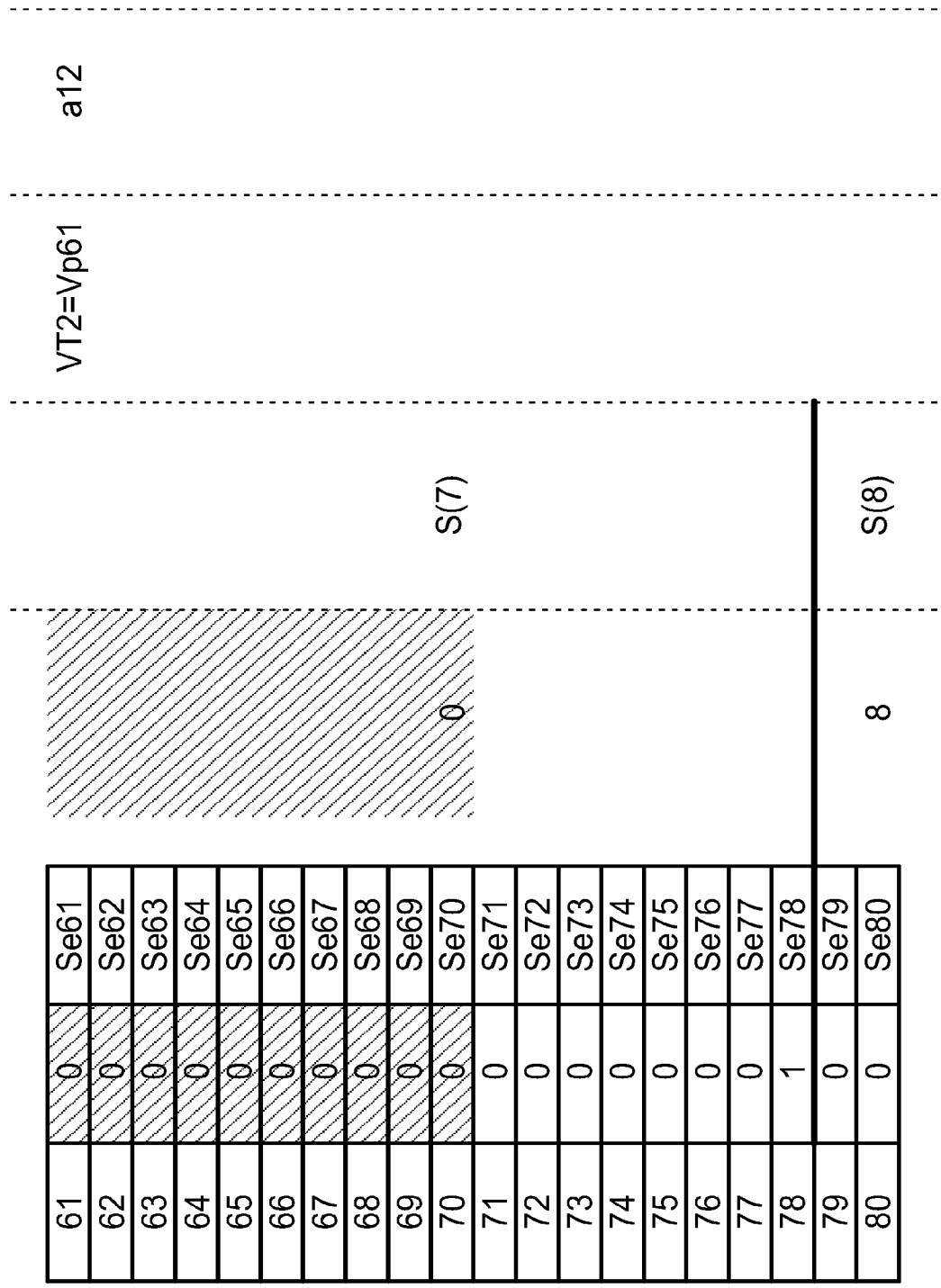
Fig. 19C Part 4

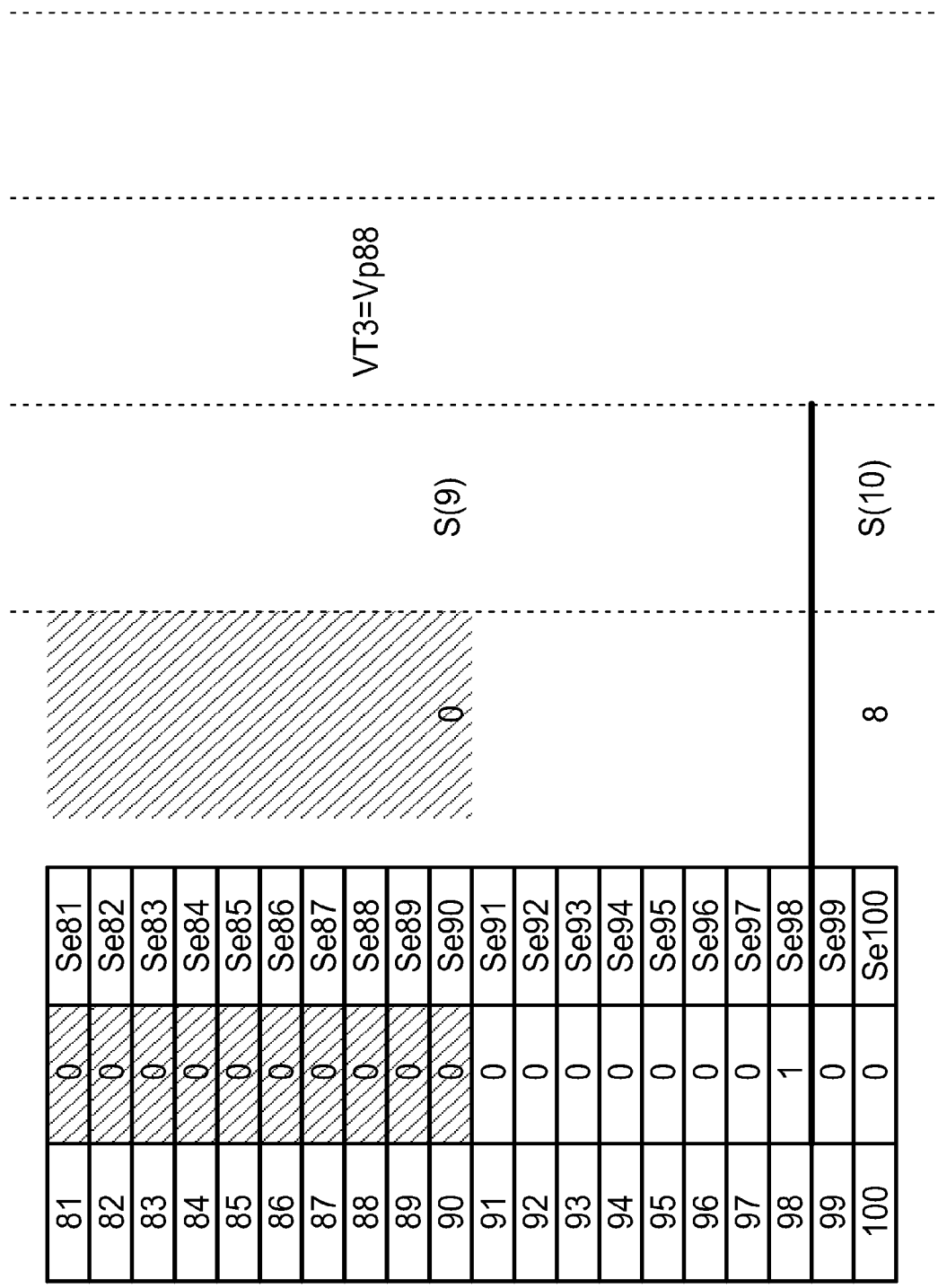
Fig. 19C Part 5

APPARATUS AND METHOD FOR ANALYSING THE CONDITION OF A MACHINE HAVING A ROTATING PART

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a method for analysing the condition of a machine, and to an apparatus for analysing the condition of a machine. The invention also relates to a system including such an apparatus and to a method of operating such an apparatus. The invention also relates to a computer program for causing a computer to perform an analysis function.

Description of the Related Art

Machines with moving parts are subject to wear with the passage of time, which often causes the condition of the machine to deteriorate. Examples of such machines with movable parts are motors, pumps, generators, compressors, lathes and CNC-machines. The movable parts may comprise a shaft and bearings.

In order to prevent machine failure, such machines should be subject to maintenance, depending on the condition of the machine. Therefore the operating condition of such a machine is preferably evaluated from time to time.

SUMMARY OF THE INVENTION

An aspect of the invention relates to the problem of enabling prevention of unexpected machine breakdown due to mechanical wear or damage in a machine having a part rotatable with a speed of rotation. In particular, an aspect of the invention relates to the problem of enabling an improved ability to detect mechanical wear or damage in a machine having a part that rotates with a variable speed of rotation.

This problem is addressed by an apparatus for analysing the condition of a machine having a part rotating with a speed of rotation ($f_{ROT}$), comprising:

a first sensor (10) adapted to generate an analogue electric measurement signal ($S_{EA}$) dependent on mechanical vibrations ($V_{MD}$) emanating from rotation of said part;

an analogue-to-digital converter (40, 44) adapted to sample said analogue electric measurement signal ($S_{EA}$) at an initial sampling frequency ($f_s$) so as to generate a digital measurement data signal ($S_{MD}$, $S_{ENV}$, $S_{RED1}$) in response to said received analogue electric measurement signal ($S_{EA}$);

a device (420) for generating a position signal (Ep) having a sequence of position signal values ($P_{(i)}$) for indicating momentary rotational positions of said rotating part; and a speed value generator (601) being adapted to record
a time sequence of measurement sample values (Se(i), $S_{(j)}$) of said digital measurement data signal ($S_{MD}$, $S_{ENV}$, $S_{RED1}$), and
a time sequence of said position signal values (P(i)) such that there are angular distances (delta-$FI_{p1-p2}$, delta-$FI_{p2-p3}$) and corresponding durations (delta-$T_{p1-p2}$; delta-$T_{p2-p3}$) between at least three consecutive position signals (P1, P2, P3), and
time information (i, dt; j) such that an individual measurement data value ($S_{(j)}$) can be associated with data indicative of time (i, dt; j) and angular position (P(i)); and wherein the speed value generator (601) operates to establish at least two momentary speed values (VT1; VT2) based on said angular distances (delta-$FI_{p1-p2}$, delta-$FI_{p2-p3}$) and said corresponding durations (delta-$T_{p1-p2}$; delta-$T_{p2-p3}$), and wherein the speed value generator (601) operates to establish further momentary speed values ($f_{ROT}$(j)) for the rotational part (8) by interpolation between the at least two momentary speed values (VT1, VT2) such that an interpolated further momentary speed value ($f_{ROT}$(j)) is indicative of the rotational speed at the moment of detection of at least one of said recorded measurement sample values (Se(i), $S_{(j)}$); and a decimator (310, 470, 470B) for generating a second digital signal ($S_{RED2}$, R), having a reduced sampling frequency ($f_{SR2}$), in response to said digital measurement data signal ($S_{MD}$, $S_{ENV}$, $S_{RED1}$), and an evaluator (230; 290, 290T; 294, 290, 290F) for performing a condition analysis function (F1, F2, Fn) for analysing the condition of the machine dependent on said second digital signal ($S_{RED2}$); wherein said decimator (470, 470B) is adapted to perform said decimation dependent on said interpolated further momentary speed value ($f_{ROT}$(j)), VT1, VT2, $f_{ROT}$).

This solution advantageously enables the delivery of a time sequence of measurement sample values (Se(i), $S_{(j)}$) wherein an individual measurement sample value (Se(i), $S_{(j)}$) is associated with a speed value ($f_{ROT}$(j)), Vpi) indicative of a speed of rotation of said of said rotational part (8) at the time of detection of the sensor signal ($S_{EA}$) value corresponding to that data value (Se(i), $S_{(j)}$). The use of interpolation for generating the speed of rotation values enables an advantageously small level of inaccuracy even during an acceleration phase.

The provision of a sequence of measurement sample values (Se(i), $S_{(j)}$) associated with corresponding speed of rotation values having small levels of inaccuracy enables an improved performance, in terms of reduced or eliminated smearing of the measurement sample values, by the subsequent decimation process during acceleration phases. The reduction, or elimination, of smearing of the measurement sample values resulting from the decimation process enables an improved performance of the condition analysis function. Hence, the features of this solution interact to enable an improved ability to detect mechanical wear or damage in a machine having a part rotatable with a variable speed of rotation.

BRIEF DESCRIPTION OF THE DRAWINGS

For simple understanding of the present invention, it will be described by means of examples and with reference to the accompanying drawings, of which:

FIG. 3 is a simplified illustration of a Shock Pulse Measurement sensor according to an embodiment of the invention.

FIG. 10G illustrates another embodiment of enhancer 320.

FIG. 10H is a table for illustrating a part of the calculation of output signal values.

FIG. 11 is a schematic illustration of a first memory having plural memory positions

DETAILED DESCRIPTION OF THE PREFERRED EMBODIMENT

Figure 1:
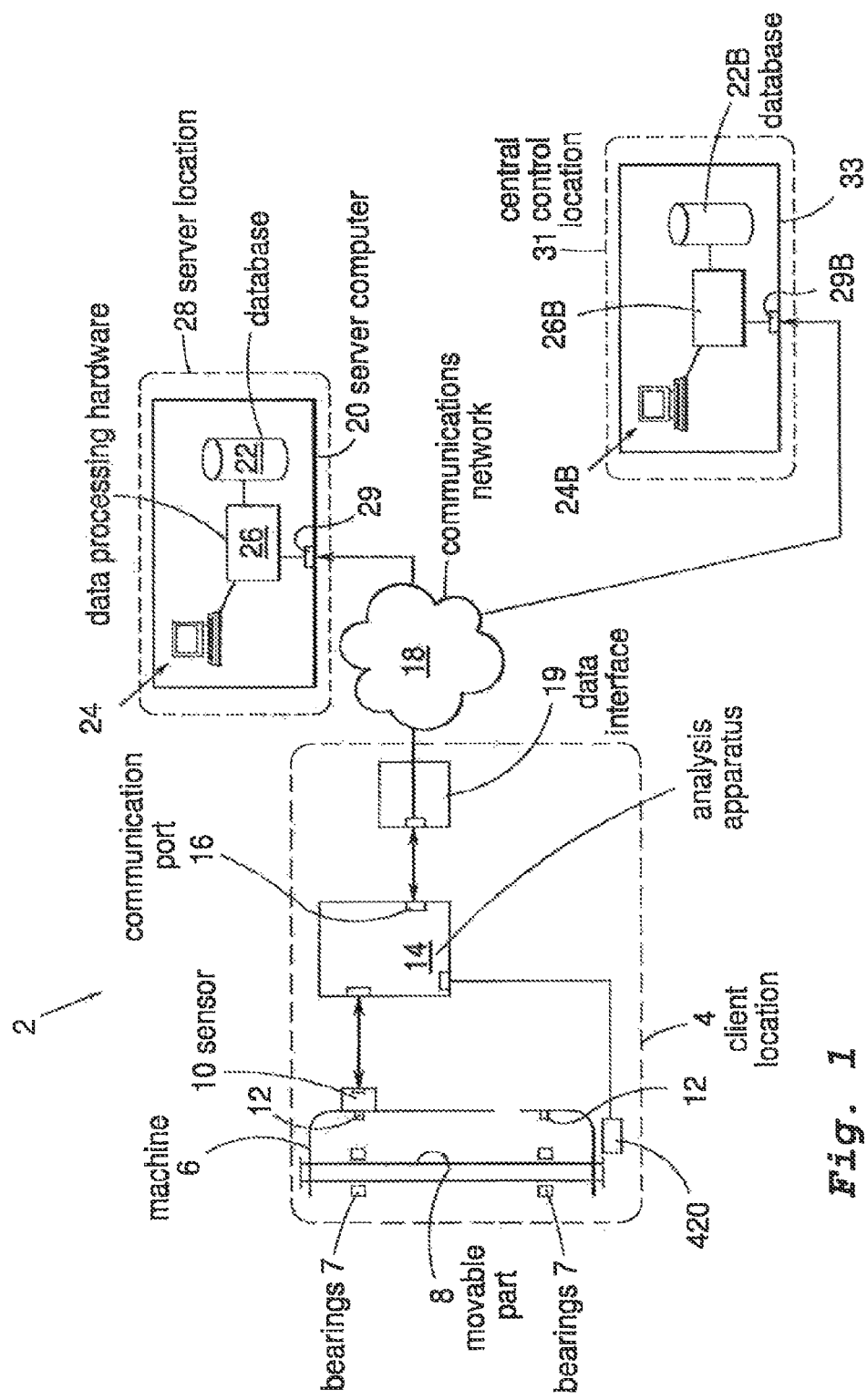
FIG. 1 shows a schematic block diagram of an embodiment of a condition analyzing system 2 according to an embodiment of the invention.

In the following description similar features in different embodiments may be indicated by the same reference numerals.

FIG. 1 shows a schematic block diagram of an embodiment of a condition analyzing system 2 according to an embodiment of the invention. Reference numeral 4 relates to a client location with a machine 6 having a movable part 8. The movable part may comprise bearings 7 and a shaft 8 which, when the machine is in operation, rotates.

The operating condition of the shaft 8 or of a bearing 7 can be determined in response to vibrations emanating from the shaft and/or bearing when the shaft rotates. The client location 4, which may also be referred to as client part or user part, may for example be the premises of a wind farm, i.e. a group of wind turbines at a location, or the premises of a paper mill plant, or some other manufacturing plant having machines with movable parts.

An embodiment of the condition analyzing system 2 is operative when a sensor 10 is attached on or at a measuring point 12 on the body of the machine 6. Although FIG. 1 only illustrates two measuring points 12, it to be understood that a location 4 may comprise any number of measuring points 12. The condition analysis system 2 shown in FIG. 1, comprises an analysis apparatus 14 for analysing the condition of a machine on the basis of measurement values delivered by the sensor 10.

The analysis apparatus 14 has a communication port 16 for bi-directional data exchange. The communication port 16 is connectable to a communications network 18, e.g. via a data interface 19. The communications network 18 may be the world wide internet, also known as the Internet. The communications network 18 may also comprise a public switched telephone network.

A server computer 20 is connected to the communications network 18. The server 20 may comprise a database 22, user input/output interfaces 24 and data processing hardware 26, and a communications port 29. The server computer 20 is located on a location 28, which is geographically separate from the client location 4. The server location 28 may be in a first city, such as the Swedish capital Stockholm, and the client location may be in another city, such as Stuttgart, Germany or Detroit in Michigan, USA. Alternatively, the server location 28 may be in a first part of a town and the client location may be in another part of the same town. The server location 28 may also be referred to as supplier part 28, or supplier part location 28.

According to an embodiment of the invention a central control location 31 comprises a control computer 33 having data processing hardware and software for surveying a plurality of machines at the client location 4. The machines 6 may be wind turbines or gear boxes used in wind turbines. Alternatively the machines may include machinery in e.g. a paper mill. The control computer 33 may comprise a database 22B, user input/output interfaces 24B and data processing hardware 26B, and a communications port 29B. The central control location 31 may be separated from the client location 4 by a geographic distance. By means of communications port 29B the control computer 33 can be coupled to communicate with analysis apparatus 14 via port 16. The analysis apparatus 14 may deliver measurement data being partly processed so as to allow further signal processing and/or analysis to be performed at the central location 31 by control computer 33.

A supplier company occupies the supplier part location 28. The supplier company may sell and deliver analysis apparatuses 14 and/or software for use in an analysis apparatus 14. The supplier company may also sell and deliver analysis software for use in the control computer at the central control location 31. Such analysis software 94,105 is discussed in connection with FIG. 4 below. Such analysis software 94,105 may be delivered by transmission over said communications network 18.

According to one embodiment of the system 2 the apparatus 14 is a portable apparatus which may be connected to the communications network 18 from time to time.

According to another embodiment of the system 2 the apparatus 14 may substantially continuously receive a measurement signal from a sensor 10 so as to enable continuous or substantially continuous monitoring of the machine condition. The apparatus 14 according to this embodiment may also substantially continuously be capable of communicating with the control computer 33 at control location 31. Hence, the apparatus 14 according to this embodiment may substantially always be available on-line for communication with the control computer 33 at control location 31.

According to an embodiment of the system 2 the apparatus 14 is connected to the communications network 18 substantially continuously. Hence, the apparatus 14 according to this embodiment may substantially always be "on line" available for communication with the supplier computer 20 and/or with the control computer 33 at control location 31.

Figure 2A:
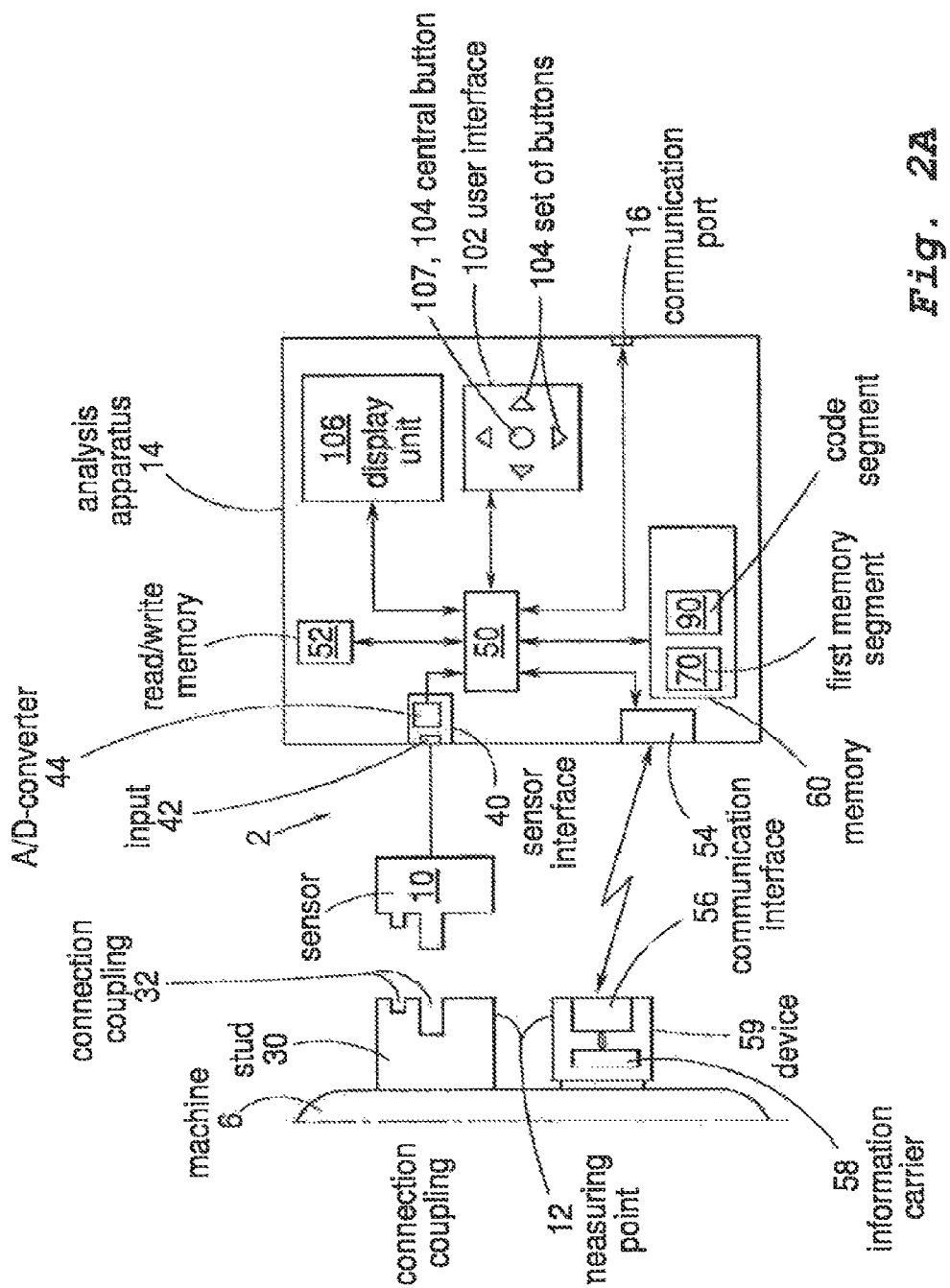
FIG. 2A is a schematic block diagram of an embodiment of a part of the condition analyzing system 2 shown in FIG. 1.

FIG. 2A is a schematic block diagram of an embodiment of a part of the condition analyzing system 2 shown in FIG. 1. The condition analyzing system, as illustrated in FIG. 2A, comprises a sensor unit 10 for producing a measured value. The measured value may be dependent on movement or, more precisely, dependent on vibrations or shock pulses caused by bearings when the shaft rotates.

An embodiment of the condition analyzing system 2 is operative when a device 30 is firmly mounted on or at a measuring point on a machine 6. The device 30 mounted at the measuring point may be referred to as a stud 30. A stud 30 can comprise a connection coupling 32 to which the sensor unit 10 is removably attachable. The connection coupling 32 can, for example comprise double start threads for enabling the sensor unit to be mechanically engaged with the stud by means of a ¼ turn rotation.

A measuring point 12 can comprise a threaded recess in the casing of the machine. A stud 30 may have a protruding part with threads corresponding to those of the recess for enabling the stud to be firmly attached to the measuring point by introduction into the recess like a bolt.

Alternatively, a measuring point can comprise a threaded recess in the casing of the machine, and the sensor unit 10 may comprise corresponding threads so that it can be directly introduced into the recess. Alternatively, the measuring point is marked on the casing of the machine only with a painted mark.

The machine 6 exemplified in FIG. 2A may have a rotating shaft with a certain shaft diameter dl. The shaft in the machine 24 may rotate with a speed of rotation V1 when the machine 6 is in use.

The sensor unit 10 may be coupled to the apparatus 14 for analysing the condition of a machine. With reference to FIG. 2A, the analysis apparatus 14 comprises a sensor interface 40 for receiving a measured signal or measurement data, produced by the sensor 10. The sensor interface 40 is coupled to a data processing means 50 capable of controlling the operation of the analysis apparatus 14 in accordance with program code. The data processing means 50 is also coupled to a memory 60 for storing said program code.

According to an embodiment of the invention the sensor interface 40 comprises an input 42 for receiving an analogue signal, the input 42 being connected to an analogue-to-digital (A/D) converter 44, the digital output 48 of which is coupled to the data processing means 50. The A/D converter 44 samples the received analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

According to an embodiment of the invention the sensor is a Shock Pulse Measurement sensor. FIG. 3 is a simplified illustration of a Shock Pulse Measurement sensor 10 according to an embodiment of the invention. According to this embodiment the sensor comprises a part 110 having a certain mass or weight and a piezo-electrical element 120. The piezo-electrical element 120 is somewhat flexible so that it can contract and expand when exerted to external force. The piezo-electrical element 120 is provided with electrically conducting layers 130 and 140, respectively, on opposing surfaces. As the piezo-electrical element 120 contracts and expands it generates an electric signal which is picked up by the conducting layers 130 and 140. Accordingly, a mechanical vibration is transformed into an analogue electrical measurement signal $S_{EA}$, which is delivered on output terminals 145, 150. The piezo-electrical element 120 may be positioned between the weight 110 and a surface 160 which, during operation, is physically attached to the measuring point 12, as illustrated in FIG. 3.

The Shock Pulse Measurement sensor 10 has a predetermined mechanical resonance frequency that depends on the mechanical characteristics for the sensor, such as the mass m of weight part 110 and the resilience of piezo-electrical element 120. Hence, the piezo-electrical element has an elasticity and a spring constant k. The mechanical resonance frequency $f_{RM}$ for the sensor is therefore also dependent on the mass m and the spring constant k.

According to an embodiment of the invention the mechanical resonance frequency $f_{RM}$ for the sensor can be determined by the equation following equation:

$$f_{RM}=1/(2\pi)\sqrt{(k/m)} \quad \text{(eq1)}$$

According to another embodiment the actual mechanical resonance frequency for a Shock Pulse Measurement sensor 10 may also depend on other factors, such as the nature of the attachment of the sensor 10 to the body of the machine 6.

The resonant Shock Pulse Measurement sensor 10 is thereby particularly sensitive to vibrations having a frequency on or near the mechanical resonance frequency $f_{RM}$. The Shock Pulse Measurement sensor 10 may be designed so that the mechanical resonance frequency $f_{RM}$ is somewhere in the range from 28 kHz to 37 kHz. According to another embodiment the mechanical resonance frequency $f_{RM}$ is somewhere in the range from 30 kHz to 35 kHz.

Accordingly the analogue electrical measurement signal has an electrical amplitude which may vary over the frequency spectrum. For the purpose of describing the theoretical background, it may be assumed that if the Shock Pulse Measurement sensor 10 were excelled to mechanical vibrations with identical amplitude in all frequencies from e.g. 1 Hz to e.g. 200 000 kHz, then the amplitude of the analogue signal $S_{EA}$ from the Shock Pulse Measurement Sensor will have a maximum at the mechanical resonance frequency $f_{RM}$, since the sensor will resonate when being "pushed" with that frequency.

The A/D converter 44 samples the received analogue signal $S_{EA}$ with a certain sampling frequency $f_s$ so as to deliver a digital measurement data signal $S_{MD}$ having said certain sampling frequency $f_s$ and wherein the amplitude of each sample depends on the amplitude of the received analogue signal at the moment of sampling.

Figure 5:
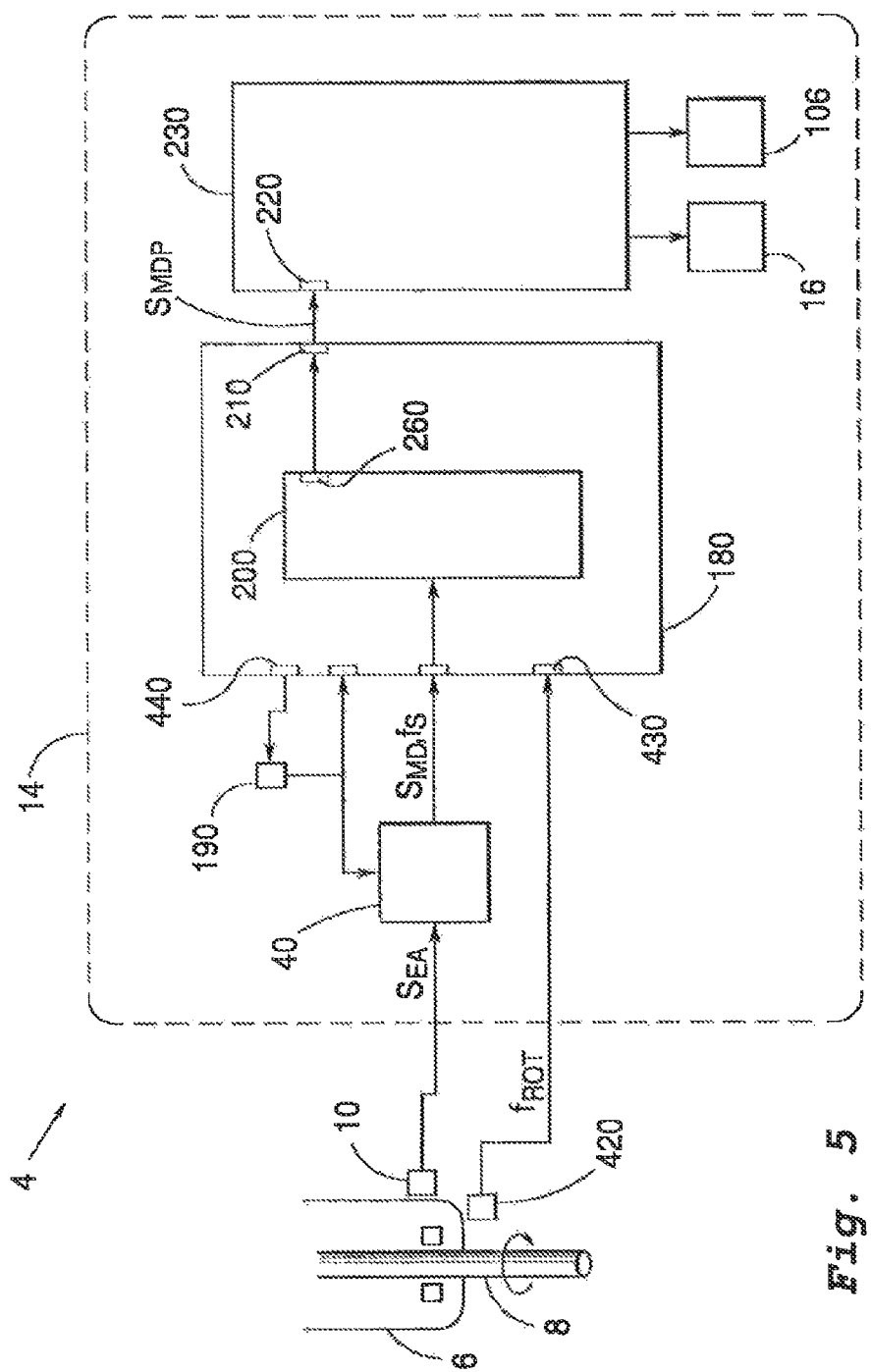
FIG. 5 is a schematic block diagram of an embodiment of the analysis apparatus at a client location with a machine 6 having a movable shaft.

According to embodiments of the invention the digital measurement data signal $S_{MD}$ is delivered to a means 180 for digital signal processing (See FIG. 5).

According to an embodiment of the invention the means 180 for digital signal processing comprises the data processor 50 and program code for causing the data processor 50 to perform digital signal processing. According to an embodiment of the invention the processor 50 is embodied by a Digital Signal Processor. The Digital Signal Processor may also be referred to as a DSP.

Figure 4:
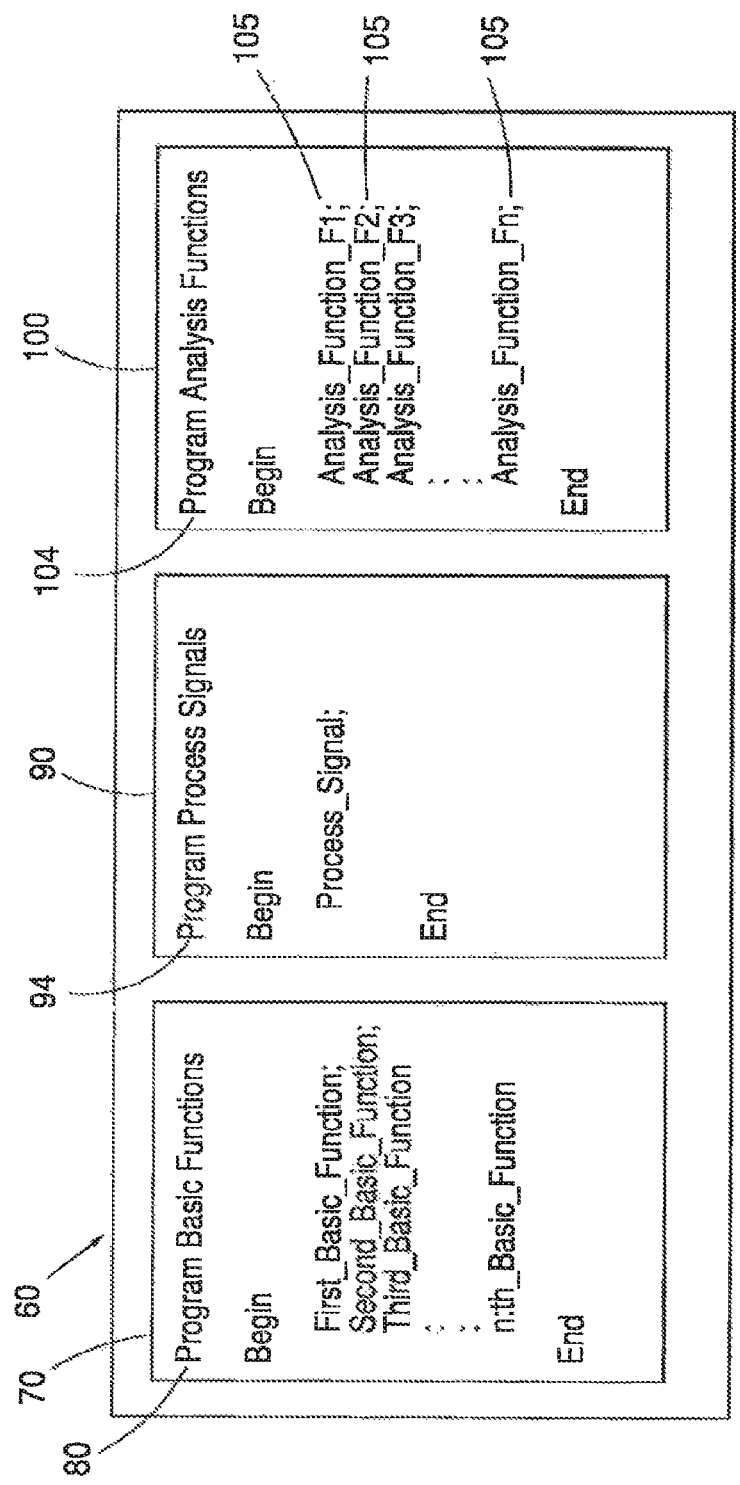
FIG. 4 is a simplified illustration of an embodiment of the memory 60 and its contents.

With reference to FIG. 2A, the data processing means 50 is coupled to a memory 60 for storing said program code. The program memory 60 is preferably a nonvolatile memory. The memory 60 may be a read/write memory, i.e. enabling both reading data from the memory and writing new data onto the memory 60. According to an embodiment the program memory 60 is embodied by a FLASH memory. The program memory 60 may comprise a first memory segment 70 for storing a first set of program code 80 which is executable so as to control the analysis apparatus 14 to perform basic operations (FIG. 2A and FIG. 4). The program memory may also comprise a second memory segment 90 for storing a second set of program code 94. The second set of program code 94 in the second memory segment 90 may include program code for causing the analysis apparatus to process the detected signal, or signals, so as to generate a pre-processed signal or a set of pre-processed signals. The memory 60 may also include a third memory segment 100 for storing a third set of program code 104. The set of program code 104 in the third memory segment 100 may include program code for causing the analysis apparatus to perform a selected analysis function 105. When an analysis function is executed it may cause the analysis apparatus to present a corresponding analysis result on user interface 106 or to deliver the analysis result on port 16 (See FIG. 1 and FIG. 2A and FIGS. 7 and 8).

The data processing means 50 is also coupled to a read/write memory 52 for data storage. Moreover, the data processing means 50 may be coupled to an analysis apparatus communications interface 54. The analysis apparatus communications interface 54 provides for bi-directional communication with a measuring point communication interface 56 which is attachable on, at or in the vicinity of the measuring point on the machine.

The measuring point 12 may comprise a connection coupling 32, a readable and writeable information carrier 58, and a measuring point communication interface 56.

The writeable information carrier 58, and the measuring point communication interface 56 may be provided in a separate device 59 placed in the vicinity of the stud 30, as illustrated in FIG. 2. Alternatively the writeable information carrier 58, and the measuring point communication interface 56 may be provided within the stud 30. This is described in more detail in WO 98/01831, the content of which is hereby incorporated by reference.

The system 2 is arranged to allow bidirectional communication between the measuring point communication interface 56 and the analysis apparatus communication interface 54. The measuring point communication interface 56 and the analysis apparatus communication interface 54 are preferably constructed to allow wireless communication. According to an embodiment the measuring point communication interface and the analysis apparatus communication interface are constructed to communicate with one another by radio frequency (RF) signals. This embodiment includes an antenna in the measuring point communication interface 56 and another antenna the analysis apparatus communication interface 54.

FIG. 4 is a simplified illustration of an embodiment of the memory 60 and its contents. The simplified illustration is intended to convey understanding of the general idea of storing different program functions in memory 60, and it is not necessarily a correct technical teaching of the way in which a program would be stored in a real memory circuit. The first memory segment 70 stores program code for controlling the analysis apparatus 14 to perform basic operations. Although the simplified illustration of FIG. 4 shows pseudo code, it is to be understood that the program code 80 may be constituted by machine code, or any level program code that can be executed or interpreted by the data processing means 50 (FIG. 2A).

The second memory segment 90, illustrated in FIG. 4, stores a second set of program code 94. The program code 94 in segment 90, when run on the data processing means 50, will cause the analysis apparatus 14 to perform a function, such as a digital signal processing function. The function may comprise an advanced mathematical processing of the digital measurement data signal $S_{MD}$. According to embodiments of the invention the program code 94 is adapted to cause the processor means 50 to perform signal processing functions described in connection with FIGS. 5, 6, 9 and/or FIG. 16 in this document.

As mentioned above in connection with FIG. 1, a computer program for controlling the function of the analysis apparatus may be downloaded from the server computer 20.

This means that the program-to-be-downloaded is transmitted to over the communications network 18. This can be done by modulating a carrier wave to carry the program over the communications network 18. Accordingly the downloaded program may be loaded into a digital memory, such as memory 60 (See FIGS. 2A and 4). Hence, a signal processing program 94 and or an analysis function program 104, 105 may be received via a communications port, such as port 16 (FIGS. 1 & 2A), so as to load it into memory 60. Similarly, a signal processing program 94 and or an analysis function program 104, 105 may be received via communications port 29B (FIG. 1), so as to load it into a program memory location in computer 26B or in database 22B.

An aspect of the invention relates to a computer program product, such as a program code means 94 and/or program code means 104, 105 loadable into a digital memory of an apparatus. The computer program product comprising software code portions for performing signal processing methods and/or analysis functions when said product is run on a data processing unit 50 of an apparatus for analysing the condition of a machine. The term "run on a data processing unit" means that the computer program plus the data processing unit carries out a method of the kind described in this document.

The wording "a computer program product, loadable into a digital memory of a condition analysing apparatus" means that a computer program can be introduced into a digital memory of a condition analysing apparatus so as achieve a condition analysing apparatus programmed to be capable of, or adapted to, carrying out a method of the kind described above. The term "loaded into a digital memory of a condition analysing apparatus" means that the condition analysing apparatus programmed in this way is capable of, or adapted to, carrying out a method of the kind described above.

The above mentioned computer program product may also be loadable onto a computer readable medium, such as a compact disc or DVD. Such a computer readable medium may be used for delivery of the program to a client.

According to an embodiment of the analysis apparatus 14 (FIG. 2A), it comprises a user input interface 102, whereby an operator may interact with the analysis apparatus 14. According to an embodiment the user input interface 102 comprises a set of buttons 104. An embodiment of the analysis apparatus 14 comprises a user output interface 106. The user output interface may comprise a display unit 106. The data processing means 50, when it runs a basic program function provided in the basic program code 80, provides for user interaction by means of the user input interface 102 and the display unit 106. The set of buttons 104 may be limited to a few buttons, such as for example five buttons, as illustrated in FIG. 2A. A central button 107 may be used for an ENTER or SELECT function, whereas other, more peripheral buttons may be used for moving a cursor on the display 106. In this manner it is to be understood that symbols and text may be entered into the apparatus 14 via the user interface. The display unit 106 may, for example, display a number of symbols, such as the letters of alphabet, while the cursor is movable on the display in response to user input so as to allow the user to input information.

FIG. 5 is a schematic block diagram of an embodiment of the analysis apparatus 14 at a client location 4 with a machine 6 having a movable shaft 8. The sensor 10, which may be a Shock Pulse Measurement Sensor, is shown attached to the body of the machine 6 so as to pick up mechanical vibrations and so as to deliver an analogue measurement signal $S_{EA}$ indicative of the detected mechanical vibrations to the sensor interface 40. The sensor interface 40 may be designed as described in connection with FIG. 2A or 2B. The sensor interface 40 delivers a digital measurement data signal $S_{MD}$ to a means 180 for digital signal processing.

The digital measurement data signal $S_{MD}$ has a sampling frequency $f_s$, and the amplitude value of each sample depends on the amplitude of the received analogue measurement signal $S_{EA}$ at the moment of sampling. According to an embodiment the sampling frequency $f_S$ of the digital measurement data signal $S_{MD}$ may be fixed to a certain value $f_S$, such as e.g. $f_S$=102 400 Hz. The sampling frequency $f_S$ may be controlled by a clock signal delivered by a clock 190, as illustrated in FIG. 5. The clock signal may also be delivered to the means 180 for digital signal processing. The means 180 for digital signal processing can produce information about the temporal duration of the received digital measurement data signal $S_{MD}$ in response to the received digital measurement data signal S1vm, the clock signal and the relation between the sampling frequency $f_S$ and the clock signal, since the duration between two consecutive sample values equals Ts=1/$f_S$.

According to embodiments of the invention the means 180 for digital signal processing includes a pre-processor 200 for performing a pre-processing of the digital measurement data signal $S_{MD}$ so as to deliver a pre-processed digital signal $S_{MDP}$ on an output 210. The output 210 is coupled to an input 220 of an evaluator 230. The evaluator 230 is adapted to evaluate the pre-processed digital signal $S_{MDP}$ so as to deliver a result of the evaluation to a user interface 106. Alternatively the result of the evaluation may be delivered to a communication port 16 so as to enable the transmission of the result e.g. to a control computer 33 at a control site 31 (See FIG. 1).

According to an embodiment of the invention, the functions described in connection with the functional blocks in means 180 for digital signal processing, pre-processor 200 and evaluator 230 may be embodied by computer program code 94 and/or 104 as described in connection with memory blocks 90 and 100 in connection with FIG. 4 above.

A user may require only a few basic monitoring functions for detection of whether the condition of a machine is normal or abnormal. On detecting an abnormal condition, the user may call for specialized professional maintenance personnel to establish the exact nature of the problem, and for performing the necessary maintenance work. The professional maintenance personnel frequently needs and uses a broad range of evaluation functions making it possible to establish the nature of, and/or cause for, an abnormal machine condition. Hence, different users of an analysis apparatus 14 may pose very different demands on the function of the apparatus. The term Condition Monitoring function is used in this document for a function for detection of whether the condition of a machine is normal or somewhat deteriorated or abnormal. The term Condition Monitoring function also comprises an evaluation function making it possible to establish the nature of, and/or cause for, an abnormal machine condition.

Examples of Machine Condition Monitoring Functions

The condition monitoring functions F1, F2 . . . Fn includes functions such as: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, and misalignment detection.

According to an embodiment the apparatus 14 includes the following functions:

F1=vibration analysis:
F2=temperature analysis,
F3=shock pulse measuring,
F4=spectrum analysis of shock pulse measurement data,
F5=Fast Fourier Transformation of vibration measurement data,
F6=graphical presentation of condition data on a user interface,
F7=storage of condition data in a writeable information carrier on said machine,
F8=storage of condition data in a writeable information carrier 52 in said apparatus,
F9=tachometering,
F10=imbalance detection, and
F11=misalignment detection.
F12=Retrieval of condition data from a writeable information carrier 58 on said machine.
F13=Performing vibration analysis function F1 and performing function F12 "Retrieval of condition data from a writeable information carrier 58 on said machine" so as to enable a comparison or trending based on current vibration measurement data and historical vibration measurement data.
F14=Performing temperature analysis F2; and performing function "Retrieval of condition data from a writeable information carrier 58 on said machine" so as to enable a comparison or trending based on current temperature measurement data and historical temperature measurement data.
F15=Retrieval of identification data from a writeable information carrier 58 on said machine.

Embodiments of the function F7 "storage of condition data in a writeable information carrier on said machine", and F13 vibration analysis and retrieval of condition data is described in more detail in WO 98/01831, the content of which is hereby incorporated by reference.

Figure 6:
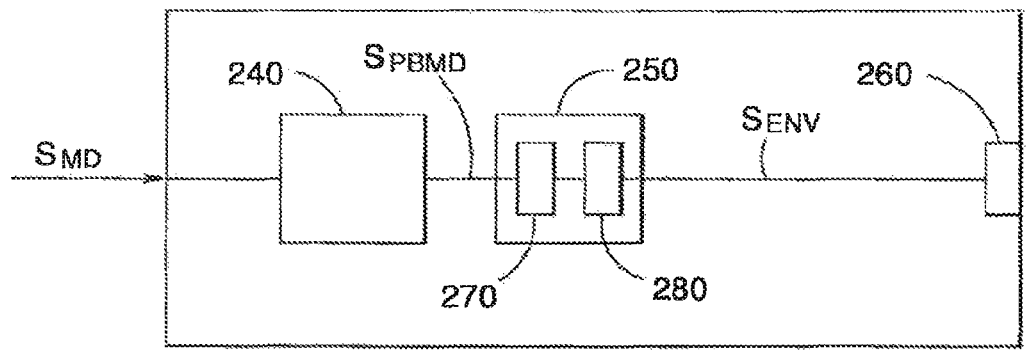
FIG. 6 illustrates a schematic block diagram of an embodiment of the preprocessor according to an embodiment of the present invention.

FIG. 6 illustrates a schematic block diagram of an embodiment of the pre-processor 200 according to an embodiment of the present invention. In this embodiment the digital measurement data signal $S_{MD}$ is coupled to a digital band pass filter 240 having a lower cutoff frequency $f_{LC}$, an upper cutoff frequency $f_{UC}$ and passband bandwidth between the upper and lower cutoff frequencies.

The output from the digital band pass filter 240 is connected to a digital enveloper 250. According to an embodiment of the invention the signal output from the enveloper 250 is delivered to an output 260. The output 260 of the pre-processor 200 is coupled to output 210 of digital signal processing means 180 for delivery to the input 220 of evaluator 230.

The upper and lower cutoff frequencies of the digital band pass filter 240 may selected so that the frequency components of the signal $S_{MD}$ at the resonance frequency $f_{RM}$ for the sensor are in the passband bandwidth. As mentioned above, an amplification of the mechanical vibration is achieved by the sensor being mechanically resonant at the resonance frequency $f_{RM}$. Accordingly the analogue measurement signal $S_{EA}$ reflects an amplified value of the vibrations at and around the resonance frequency $f_{RM}$. Hence, the band pass filter according to the FIG. 6 embodiment advantageously suppresses the signal at frequencies below and above resonance frequency $f_{RM}$, so as to further enhance the components of the measurement signal at the resonance frequency $f_{RM}$. Moreover, the digital band pass filter 240 advantageously further reduces noise inherently included in the measurement signal, since any noise components below the lower cutoff frequency $f_{LC}$, and above upper cutoff frequency $f_{UC}$ are also eliminated or reduced. Hence, when using a resonant Shock Pulse Measurement sensor 10 having a mechanical resonance frequency $f_{RM}$ in a range from a lowest resonance frequency value $f_{RML}$ to a highest resonance frequency value $f_{RMU}$ the digital band pass filter 240 may be designed to having a lower cutoff frequency $f_{LC}=f_{RML}$, and an upper cutoff frequency $f_{UC}=f_{RMU}$. According to an embodiment the lower cutoff frequency $f_{LC}=f_{RML}=28$ kHz, and the upper cutoff frequency $f_{UC}=f_{RMU}=37$ kHz.

According to another embodiment the mechanical resonance frequency $f_{RM}$ is somewhere in the range from 30 kHz to 35 kHz, and the digital band pass filter 240 may then be designed to having a lower cutoff frequency $f_{LC}=30$ kHz and an upper cutoff frequency $f_{UC}=35$ kHz.

According to another embodiment the digital band pass filter 240 may be designed to have a lower cutoff frequency $f_{LC}$ being lower than the lowest resonance frequency value $f_{RM}$, and an upper cutoff frequency $f_{UC}$ being higher than the highest resonance frequency value $f_{RMU}$. For example the mechanical resonance frequency $f_{RM}$ may be a frequency in the range from 30 kHz to 35 kHz, and the digital band pass filter 240 may then be designed to having a lower cutoff frequency $f_{LC}=17$ kHz, and an upper cutoff frequency $f_{UC}=36$ kHz.

Accordingly, the digital band pass filter 240 delivers a passband digital measurement data signal SF having an advantageously low noise content and reflecting mechanical vibrations in the passband. The passband digital measurement data signal SF is delivered to enveloper 250.

The digital enveloper 250 accordingly receives the passband digital measurement data signal SF which may reflect a signal having positive as well as negative amplitudes. With reference to FIG. 6, the received signal is rectified by a digital rectifier 270, and the rectified signal may be filtered by an optional low pass filter 280 so as to produce a digital envelop signal $S_{ENV}$.

Accordingly, the signal $S_{ENV}$ is a digital representation of an envelope signal being produced in response to the filtered measurement data signal SF. According to some embodiments of the invention the optional low pass filter 280 may be eliminated. One such embodiment is discussed in connection with FIG. 9 below. Accordingly, the optional low pass filter 280 in enveloper 250 may be eliminated when decimator 310, discussed in connection with FIG. 9 below, includes a low pass filter function.

According to the FIG. 6 embodiment of the invention the signal $S_{ENV}$ is delivered to the output 260 of pre-processor 200. Hence, according to an embodiment of the invention the pre-processed digital signal $S_{MDP}$ delivered on the output 210 (FIG. 5) is the digital envelop signal $S_{ENV}$.

Whereas prior art analogue devices for generating an envelope signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital band pass filter 240 leads to a high signal amplitude and the signal processing being performed in the digital domain eliminates addition of noise and eliminates addition of biasing errors.

With reference to FIG. 5 the pre-processed digital signal $S_{MDP}$ is delivered to input 220 of the evaluator 230.

According to another embodiment, the filter 240 is a high pass filter having a cut-off frequency $f_{LC}$. This embodiment simplifies the design by replacing the band-pass filter with a high-pass filter 240, thereby leaving the low pass filtering to another low pass filter downstream, such as the low pass filter 280. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RM}$ is somewhere in the range from 30 kHz to 35 kHz, the high pass filter 240 may be designed to having a lower cutoff frequency $f_{LC}=30$ kHz. The high-pass filtered signal is then passed to the rectifier 270 and on to the low pass filter 280.

According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}=20$ kHz.

Figure 7:
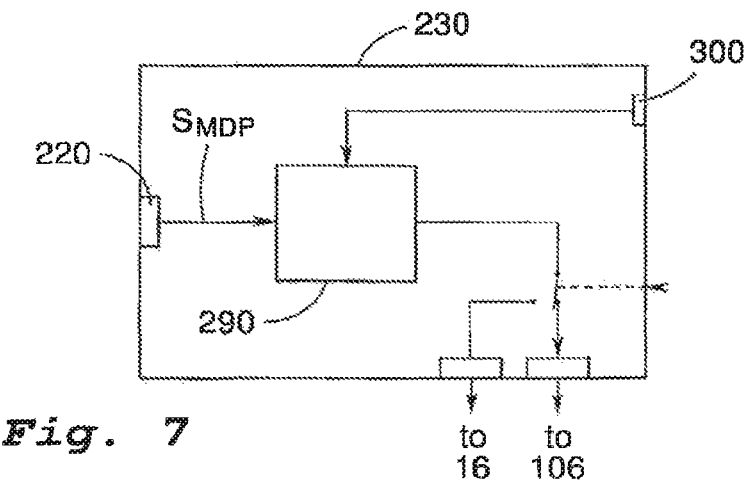
FIG. 7 illustrates an embodiment of the evaluator 230.

FIG. 7 illustrates an embodiment of the evaluator 230 (See also FIG. 5). The FIG. 7 embodiment of the evaluator 230 includes a condition analyser 290 adapted to receive a pre-processed digital signal $S_{MDP}$ indicative of the condition of the machine 6. The condition analyser 290 can be controlled to perform a selected condition analysis function by means of a selection signal delivered on a control input 300. The selection signal delivered on control input 300 may be generated by means of user interaction with the user interface 102 (See FIG. 2A). When the selected analysis function includes Fast Fourier Transform, the analyzer 290 will be set by the selection signal 300 to operate on an input signal in the frequency domain.

Dependent on what type of analysis to be performed the condition analyser 290 may operate on an input pre-processed digital signal $S_{MDP}$ in the time domain, or on an input pre-processed digital signal $S_{MDP}$ in the frequency domain. Accordingly, dependent on the selection signal delivered on control input 300, the FFT 294 may be included as shown in FIG. 8, or the signal $S_{MDP}$ may be delivered directly to the analyser 290 as illustrated in FIG. 7.

Figure 8:
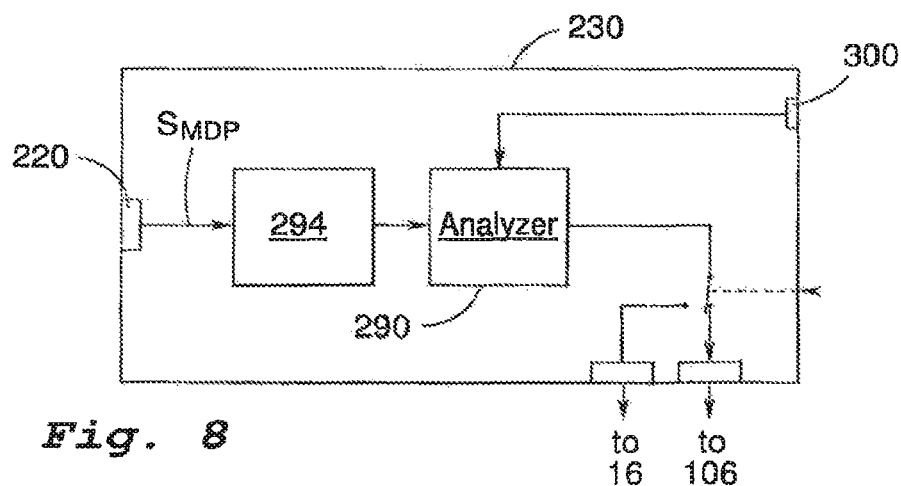
FIG. 8 illustrates another embodiment of the evaluator 230.

FIG. 8 illustrates another embodiment of the evaluator 230. In the FIG. 8 embodiment the evaluator 230 includes an optional Fast Fourier Transformer 294 coupled to receive the signal from input 220 of the evaluator 230. The output from the FFTransformer 294 may be delivered to analyser 290.

In order to analyze the condition of a rotating part it is desired to monitor the detected vibrations for a sufficiently long time to be able to detect repetitive signals. Certain repetitive signal signatures are indicative of a deteriorated condition of the rotating part. An analysis of a repetitive signal signature may also be indicative of the type of deteriorated condition. Such an analysis may also result in detection of the degree of deteriorated condition.

Hence, the measurement signal may include at least one vibration signal component SD dependent on a vibration movement of the rotationally movable part 8; wherein said vibration signal component has a repetition frequency $f_D$ which depends on the speed of rotation $f_{ROT}$ of the rotationally movable part 8. The vibration signal component which is dependent on the vibration movement of the rotationally movable part 8 may therefore be indicative of a deteriorated condition or a damage of the monitored machine. In fact, a relation between repetition frequency $f_D$ of the vibration signal component Sn and the speed of rotation $f_{ROT}$ of the rotationally movable part 8 may be indicative of which mechanical part it is that has a damage. Hence, in a machine having a plurality of rotating parts it may be possible to identify an individual slightly damaged part by means of processing the measurement signal using an analysis function 105, including a frequency analysis.

Such a frequency analysis may include fast fourier transformation of the measurement signal including vibration signal component Sn. The fast fourier transformation (FFT), uses a certain frequency resolution. That certain frequency resolution, which may he expressed in terms of frequency bins, determines the limit for discending different frequencies. The term "frequency bins" is sometimes referred to as "lines". If a frequency resolution providing Z frequency bins up to the shaft speed is desired, then it is necessary to record the signal during X revolutions of the shaft.

In connection with the analysis of rotation parts it may be interesting to analyse signal frequencies that are higher than the rotation frequency $f_{ROT}$ of the rotating part. The rotating part may include a shaft and hearings. The shaft rotation frequency $f_{ROT}$ is often referred to as "order 1". The interesting bearing signals may occur about ten times per shaft revolution (Order 10), i.e. a damage repetition frequency $f_D$ (measured in Hz) divided by rotational speed $f_{ROT}$ (measured in rps) equals 10 Hz/rps, i.e. order $y=f_D/f_{ROT}=10$ Hz/rps. Moreover, it may be interesting to analyse overtones of the bearing signals, so it may be interesting to measure up to order 100. Referring to a maximum order as Y, and the total number of frequency bins in the FFT to be used as Z, the following applies: Z=X*Y. Conversely, X=Z/Y, wherein X is the number of revolutions of the monitored shaft during which the digital signal is analysed; and Y is a maximum order; and Z is the frequency resolution expressed as a number of frequency bins Consider a case when the decimated digital measurement signal $S_{MDP}$ (See FIG. 5) is delivered to the FFT analyzer 294, as described in FIG. 8: In such a case, when the FFT analyzer 294 is set for Z=1600 frequency bins, and the user is interested in analysing frequencies up to order Y=100, then the value for X becomes X=Z/Y=1600/100=16.

Hence, it is necessary to measure during X=16 shaft revolutions when Z=1600 frequency bins is desired and the user is interested in analysing frequencies up to order Y=100.

The frequency resolution Z of the FFT analyzer 294 may be settable using the user interface 102, 106 (FIG. 2A).

Hence, the frequency resolution value Z for the condition analysis function 105 and/or signal processing function 94 (FIG. 4) may be settable using the user interface 102, 106 (FIG. 2A).

According to an embodiment of the invention, the frequency resolution Z is settable by selecting one value Z from a group of values. The group of selectable values for the frequency resolution Z may include

Z=400

Z=800

Z=1600

Z=3200

Z=6400

As mentioned above, the sampling frequency $f_s$ may be fixed to a certain value such as e.g $f_s=102\,400$ kHz, and the factor k may be set to 2.56, thereby rendering the maximum frequency to be analyzed $f_{SEAmax}$ to be:

$$f_{SEAmax}=f_s/k=102\,400/2,56=40 \text{ kHz}$$

For a machine having a shaft with rotational speed $f_{ROT}$=1715 rpm=28.58 rps, a selected order value Y=100 renders a maximum frequency to be analyzed to be $$f_{ROT}*Y=28.58 \text{ rps}*100=2858 \text{ Hz}.$$

The FFTransformer 294 may be adapted to perform Fast Fourier Transform on a received input signal having a certain number of sample values. It is advantageous when the certain number of sample values is set to an even integer which may be divided by two (2) without rendering a fractional number.

Accordingly, a data signal representing mechanical vibrations emanating from rotation of a shaft may include repetitive signal patterns. A certain signal pattern may thus be repeated a certain number of times per revolution of the shaft being monitored. Moreover, repetitive signals may occur with mutually different repetition frequency.

In the book "Machinery Vibration Measurements and Analysis" by Victor Wowk (ISBN 0-07-071936-5), there is provided a couple of examples of mutually different repetition frequencies on page 149:

"Fundamental train frequency (FTF)
Ball spin (BS) frequency
Outer Race (OR)
Inner Race (IR)"

The book also provides formulas for calculating these specific frequencies on page 150. The content of the book "Machinery Vibration Measurements and Analysis" by Victor Wowk, is hereby incorporated by reference. In particular the above mentioned formulas for calculating these specific frequencies are hereby incorporated by reference. A table on page 151 of the same book indicates that these frequencies also vary dependent on bearing manufacturer, and that FTF may have a bearing frequency factor of 0,378;
BS may have a bearing frequency factor of 1,928;
OR may have a bearing frequency factor of 3,024; and
IR may have a bearing frequency factor of 4,976

The frequency factor is multiplied with the rotational speed of the shaft to obtain the repetition frequency. The book indicates that for a shaft having a rotational speed of 1715 rpm, i.e. 28.58 Hz, the repetition frequency for a pulse emanating from the Outer Race (OR) of a bearing of standard type 6311 may be about 86 Hz; and the FTF repetition frequency may be 10.8 Hz.

When the monitored shaft rotates at a constant rotational speed such a repetition frequency may be discussed either in terms of repetition per time unit or in terms of repetition per revolution of the shaft being monitored, without distinguishing between the two. However, if the machine part rotates at a variable rotational speed the matter is further complicated, as discussed below in connection with FIGS. 16, 17 and 20.

Machinely Presenting Sudden Damages

Some types of machinery may suffer complete machine failure or breakdown very abruptly. For some machine types, such as rotating parts in a wind power station, breakdown has been known to occur suddenly and as a complete surprise to the maintenance personnel and to the machine owner. Such sudden breakdown causes a lot of costs to the machine owner and may cause other negative side effects e.g. if machine parts fall off as a result of unexpected mechanical failure. The inventor realized that there is a particularly high noise level in the mechanical vibrations of certain machinery, and that such noise levels hamper the detection of machine damages. Hence, for some types of machinery, conventional methods for preventive condition monitoring have failed to provide sufficiently early and/or reliable warning of on-coming deteriorating conditions. The inventor concluded that there may exist a mechanical vibration $V_{MD}$ indicative of a deteriorated condition in such machinery, but that conventional methods for measuring vibrations may hitherto have been inadequate.

The inventor realized that machines having slowly rotating parts were among the types of machinery that seem to be particularly prone to sudden failure. The inventor also realized that a low rotational speed $f_{ROT}$ may lead to lower amplitudes of the mechanical vibration $V_{MD}$. When the mechanical vibration $V_{MD}$ indicative of an incipient machine damage has a low amplitude, the noise content in the measuring signal will become higher in relative terms. When measuring on a machine having rotational speed of less than 50 rpm the enveloped and decimated digital measurement signal $S_{RED}$ delivered by the decimator 310 may be so noisy as to prevent successful condition monitoring analysis if the decimated digital measurement signal $S_{RED}$ is fed directly to the analyzer 290. In other words, the signal-to-noise ratio, SNR of decimated digital measurement signal $S_{RED}$ may be so low as to prevent the detection of any vibration signal component SD.

Having realized that a particularly high noise level in the mechanical vibrations of certain machinery hampers the detection of machine damages, the inventor came up with a method for enabling detection of weak mechanical signals in a noisy environment. As mentioned above, the repetition frequency $f_D$ of vibration signal component SD in a noisy measuring signal $S_{EA}$ depends on a mechanical vibration $V_{MD}$ which is indicative of an incipient damage of a rotational part 8 of the monitored machine 6. The inventor realized that it may be possible to detect an incipient damage, i.e. a damage that is just starting to develop, if a corresponding weak signal can be discerned.

Hence, the measurement signal may include at least one vibration signal component SD dependent on a vibration movement of the rotationally movable part 8; wherein said vibration signal component has a repetition frequency $f_D$ which depends on the speed of rotation $f_{ROT}$ of the rotationally movable part 8. The existence of a vibration signal component which is dependent on the vibration movement of the rotationally movable part 8 may therefore provide an early indication of a deteriorating condition or an incipient damage of the monitored machine.

In a wind turbine application the shaft whose bearing is analyzed may rotate at a speed of less than 120 revolutions per minute, i.e. the shaft rotational frequency $f_{ROT}$ is less than 2 revolutions per second (rps). Sometimes such a shaft to be analyzed rotates at a speed of less than 50 revolutions per minute (rpm), i.e. a shaft rotational frequency $f_{ROT}$ of less than 0.83 rps. In fact the speed of rotation may typically be less than 15 rpm. Whereas a shaft having a rotational speed of 1715 rpm, as discussed in the above mentioned book, produces 500 revolutions in just 17.5 seconds; a shaft rotating at 50 revolutions per minute takes ten minutes to produce 500 revolutions. Certain large wind power stations have shafts that may typically rotate at 12 RPM=0.2 rps.

Accordingly, when a bearing to be analyzed is associated with a slowly rotating shaft, and the bearing is monitored by a detector generating an analogue measurement signal $S_{EA}$ which is sampled using a sampling frequency $f_s$ of about 100 kHz, the number of sampled values associated with one full revolution of the shaft becomes very large. As an illustrative example, it takes 60 million (60 000 000) sample values at a sampling frequency of 100 kHz to describe 500 revolutions when the shaft rotates at 50 rpm.

Moreover, performing advanced mathematical analysis of the signal requires a lot of time when the signal includes so many samples. Accordingly it is desired to reduce the number of samples per second before further processing of the signal $S_{ENV}$.

Figure 9:
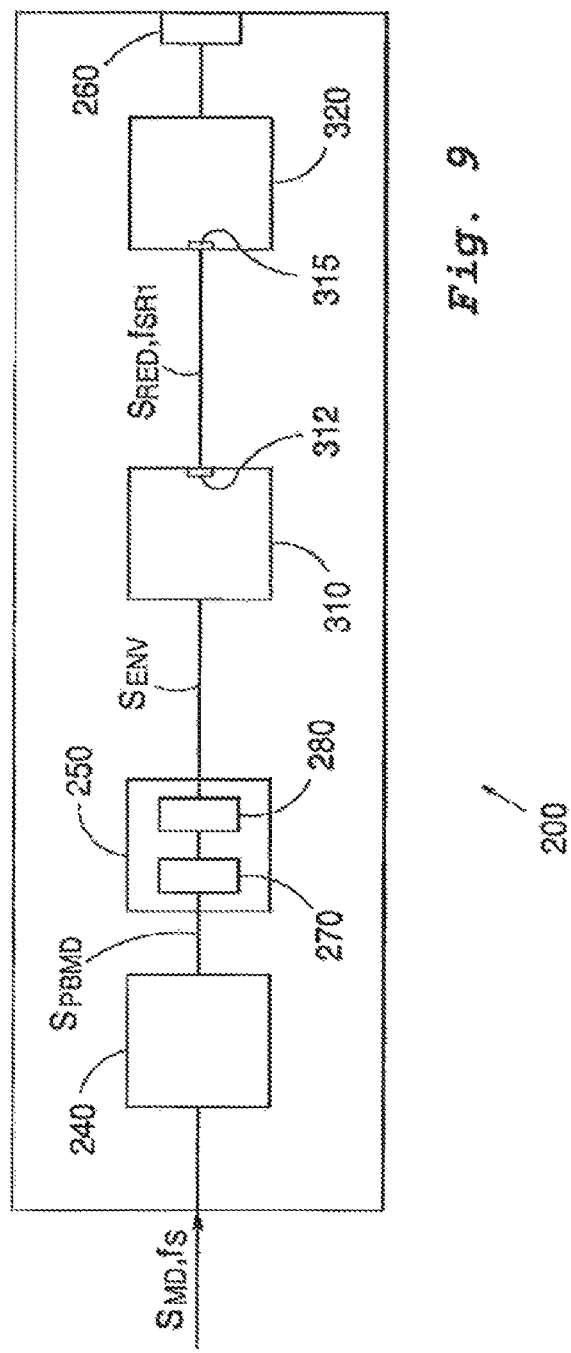
FIG. 9 illustrates another embodiment of the pre-processor 200.

FIG. 9 illustrates another embodiment of the pre-processor 200. The FIG. 9 embodiment of the pre-processor 200 includes a digital band pass filter 240 and a digital enveloper 250 as described above in connection with FIG. 6. As mentioned above, the signal $S_{ENV}$ is a digital representation of an enveloped signal which is produced in response to the filtered measurement data signal SF.

According to the FIG. 9 embodiment of the pre-processor 200, the digital enveloped signal $S_{ENV}$ is delivered to a decimator 310 adapted to produce a digital signal $S_{RED}$ having a reduced sampling frequency $f_{SR1}$. The decimator 310 operates to produce an output digital signal wherein the temporal duration between two consecutive sample values is longer than the temporal duration between two consecutive sample values in the input signal. The decimator is described in more detail in connection with FIG. 14, below. According to an embodiment of the invention the optional low pass filter 280 may be eliminated, as mentioned above. When, in the FIG. 9 embodiment, the signal produced by the digital rectifier 270 is delivered to decimator 310, which includes low pass filtering, the low pass filter 280 may be eliminated.

An output 312 of the decimator 310 delivers the digital signal $S_{RED}$ to an input 315 of an enhancer 320. The enhancer 320 is capable of receiving the digital signal $S_{RED}$ and in response thereto generating an output signal $S_{MDP}$. The output signal $S_{MDP}$ is delivered to output port 260 of pre-processor 200.

Figure 10A:
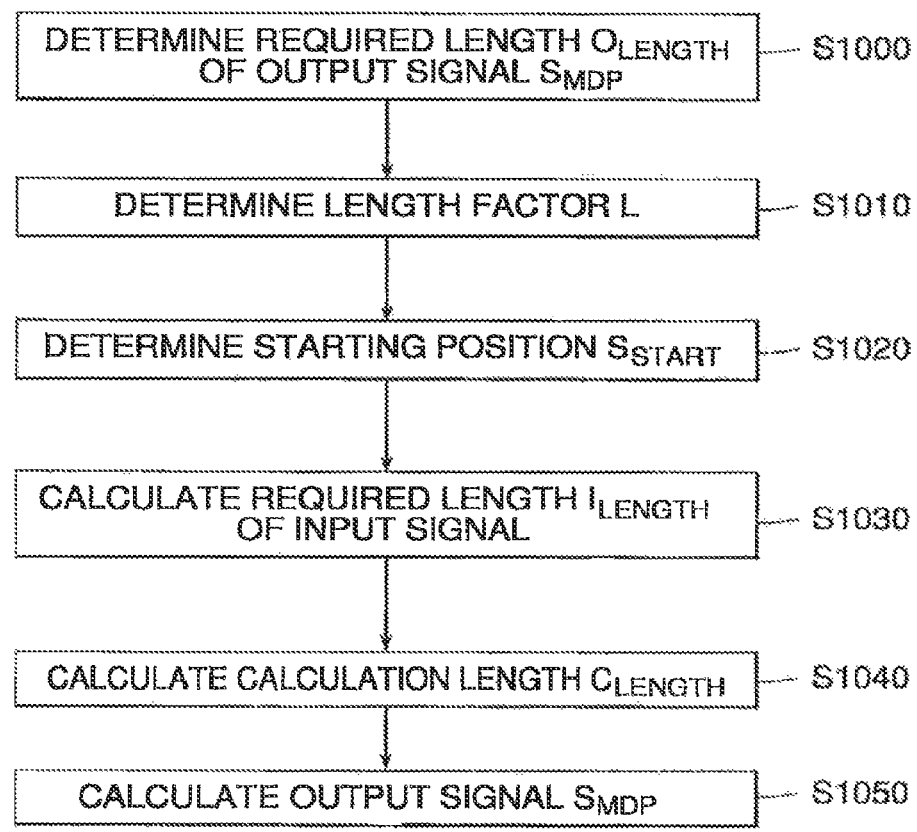
FIG. 10A is a flow chart that illustrates embodiments of a method for enhancing repetitive signal patterns in signals.

FIG. 10A is a flow chart that illustrates embodiments of a method for enhancing repetitive signal patterns in signals. This method may advantageously be used for enhancing repetitive signal patterns in signals representing the condition of a machine having a rotating shaft. An enhancer 320 may be designed to operate according to the method illustrated by FIG. 10A.

Method steps S1000 to S1040 in FIG. 10A represent preparatory actions to be taken in order to make settings before actually generating the output signal values.

When the preparatory actions have been executed, the output signal values may be calculated, as described with reference to step S1050.

Figure 10B:
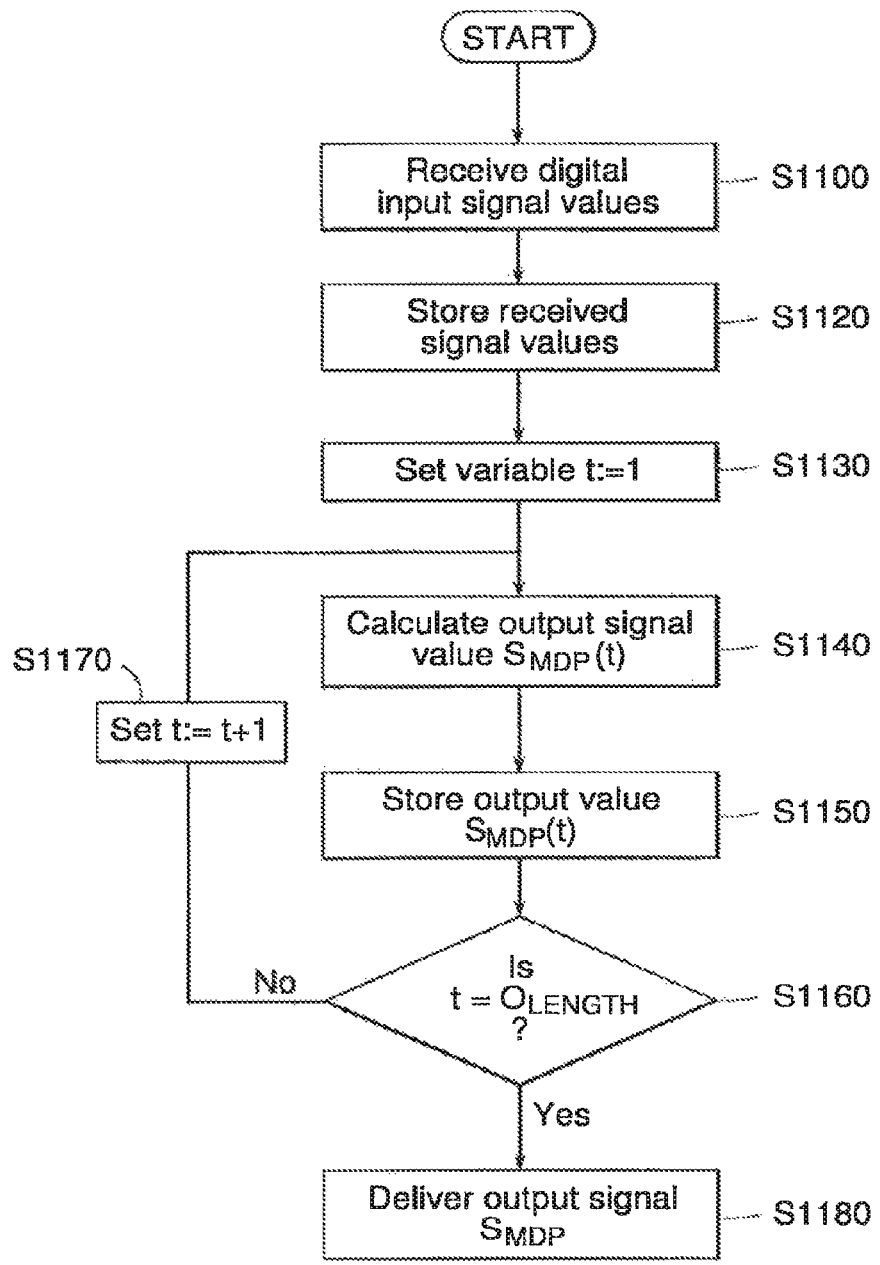
FIG. 10B is a flow chart illustrating a method of generating a digital output signal.

FIG. 10B is a flow chart illustrating a method of generating a digital output signal. More particularly, FIG. 10B illustrates an embodiment of a method to generate a digital output signal when preparatory actions described with reference to steps S1000 to S1040 in FIG. 10A have been performed.

With reference to step S1000 in FIG. 10A, a desired length $O_{LENGTH}$ of an output signal $S_{MDP}$ is determined.

FIG. 11 is a schematic illustration of a first memory having plural memory positions i. The memory positions i of the first memory hold an example input signal I comprising a sequence of digital values. The example input signal is used for calculating the output signal $S_{MDP}$ according to embodiments of the invention. FIG. 11 shows some of many consecutive digital values for the input signal I. The digital values 2080 in the input signal I only illustrate a few of the digital values that are present in the input signal. In FIG. 11 two neighbouring digital values in the input signal are separated by a duration $t_{delta}$. The value $t_{delta}$ is the inverse of a sampling frequency $f_{SR}$ of the input signal received by the enhancer 320 (See FIG. 9 & FIG. 16).

Figure 12:
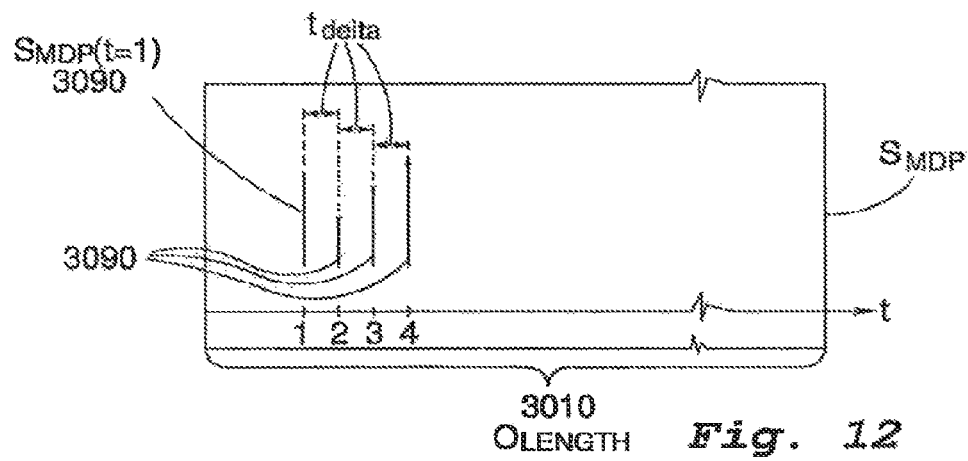
FIG. 12 is a schematic illustration of a second memory having plural memory positions t.

FIG. 12 is a schematic illustration of a second memory having plural memory positions t. The memory positions t of the second memory hold an example output signal $S_{MDP}$ comprising a sequence of digital values. Hence, FIG. 12 illustrates a portion of a memory having digital values 3090 stored in consecutive memory positions. FIG. 12 shows consecutive digital values for the output signal $S_{MDP}$. The digital values 3090 in the output signal $S_{MDP}$ only illustrate a few of the digital values that are present in the output signal. In FIG. 12 two neighbouring digital values in the output signal may be temporally separated by the duration $t_{delta}$.

According to an embodiment, the user may input a value representing a lowest repetition frequency $f_{REPmin}$ to be detected as well as information about a lowest expected speed of rotation of the shaft to be monitored. The analysis system 2 (FIG. 1) includes functionality for calculating a suitable value for the variable $O_{LENGTH}$ in response to these values.

Alternatively, with reference to FIG. 2A, a user of an analysis apparatus 14 may set the value $O_{LENGTH}$ 3010 of the output signal $S_{MDP}$ by means of inputting a corresponding value via the user interface 102.

In a next step S1010 a length factor L is chosen. The length factor L determines how well stochastic signals are suppressed in the output signal $S_{MDP}$. A higher value of L gives less stochastic signals in the output signal $S_{MDP}$ than a lower value of L.

Hence, the length factor L may be referred to as a Signal-Noise Ratio improver value, also referred to as SNR improver value. According to one embodiment of the method L is an integer between 1 and 10, but L can also be set to other values.

According to an embodiment of the method, the value L can be preset in the enhancer 320. According to another embodiment of the method the value L is inputted by a user of the method through the user interface 102 (FIG. 2A). The value of the factor L also has an impact on calculation time required to calculate the output signal. A larger value of L requires longer calculation time than a lower value of L.

Next, in a step S1020, a starting position $S_{START}$ is set. The starting position $S_{START}$ may indicate a position in the input signal I.

The starting position $S_{START}$ is set to avoid or reduce the occurrence of non-repetitive patterns in the output signal $S_{MDP}$. When the starting position $S_{START}$ is set so that a part 2070 of the input signal before the starting position has a length which corresponds to a certain time interval $T_{STOCHASTIC\_MAX}$ then stochastic signals with the a corresponding frequency $f_{STOCHASTIC\_MAX}$ and higher frequencies will be attenuated in the output signal O, $S_{MDP}$.

In a next step S1030 the required length of the input data signal is calculated. The required length of the input data signal is calculated in the step S1030 according to formula (1) below:

$$I_{LENGTH}=O_{LENGTH}*L+S_{START}+O_{LENGTH} \quad (1)$$

Next, in a step S1040, a length $C_{LENGTH}$ in the input data signal is calculated. The length $C_{LENGTH}$ is the length over which the calculation of the output data signal is performed. This length $C_{LENGTH}$ is calculated according to formula (3) below.

$$C_{LENGTH}=I_{LENGTH}-S_{START}-O_{LENGTH} \quad (3)$$

Formula (3) can also be written as $I_{LENGTH}=C_{LENGTH}+S_{START}+O_{LENGTH}$

The output signal is then calculated in a step S1050. The output signal is calculated according to formula (5) below. In formula (5) a value for the output signal is calculated for a time value t in the output signal.

$$S_{MDP}(t) = \sum_{i=1}^{i=CLENGTH} I(i) * I(i + S_{start} +) \text{ where } 1 \leq O_{LENGTH} \quad (5)$$

The output signal $S_{MDP}$ has a length $O_{LENGTH}$, as mentioned above. To acquire the entire output signal $S_{MDP}$ a value for each time value from t=1 to t=$O_{LENGTH}$ has to be calculated with formula (5). In FIG. 11 a digital value 2081 illustrates one digital value that is used in the calculation of the output signal. The digital value 2081 illustrates one digital value that is used in the calculation of the output signal where i=1. The digital value 2082 illustrates another digital value that is used in the calculation of the output signal. Reference numeral 2082 refers to the digital value $I(1+S_{START}+t)$ in formula (5) above, when i=1 and t=1. Hence, reference numeral 2082 illustrates the digital sample value at position number P in the input signal:

$$P = 1 + S_{START} + 1 = S_{START} + 2.$$

In FIG. 12, reference numeral 3091 refers to the digital sample value $S_{MDP}(t)$ in the output signal where t=1.

Another embodiment of the method for operating the enhancer 320 for enhancing repetitive patterns in signals representing the condition of a machine having a rotating shaft will now be described. According to an embodiment the length $O_{LENGTH}$ may be preset in the enhancer 320. According to other embodiments of the method the length $O_{LENGTH}$ may be set by user input through the user interface 102 (FIG. 2A). According to a preferred embodiment of the method the variable $O_{LENGTH}$ is set to an even integer which may be divided by two (2) without rendering a fractional number. Selecting the variable $O_{LENGTH}$ according to this rule advantageously adapts the number of samples in the output signal so that it is suitable for use in the optional Fast Fourier Transformer 294. Hence, according to embodiments of the method the variable $O_{LENGTH}$ may preferably be set to a number such as e.g. 1024, 2048, 4096.

In a particularly advantageous embodiment the value $S_{START}$ is set, in step S1020, so that the part 2070 of the input signal before the starting position has the same length as the output signal 3040, i.e. $S_{START} = O_{LENGTH}$.

As mentioned in connection with equation (1) above, the required length of the input data signal is $$I_{LENGTH} = O_{LENGTH} * L + S_{START} + O_{LENGTH}$$

Hence, setting $S_{START} = O_{LENGTH}$ in eq (1) renders $$I_{LENGTH} = O_{LENGTH} * L + O_{LENGTH} + O_{LENGTH} = O_{LENGTH} * L + O_{LENGTH} * 2$$

Accordingly, the required length of the input signal can be expressed in terms of the length of the output signal according to equation (6) below.

$$I_{LENGTH} = (L+2) * O_{LENGTH} \quad (6)$$

where L is the length factor discussed above, and $O_{LENGTH}$ is the number of digital values in the output signal, as discussed above.

The length $C_{LENGTH}$ can be calculated, in this embodiment of the invention, according to formula (7) below.

$$C_{LENGTH} = L * O_{LENGTH} \quad (7)$$

When the preparatory actions described with reference to steps S1000 to S1040 in FIG. 10A have been performed, the digital output signal may be generated by means of a method as described with reference to FIG. 10B. According to an embodiment of the invention, the method described with reference to FIG. 10B is performed by means of a DSP 50 (FIG. 2A).

Figure 16:
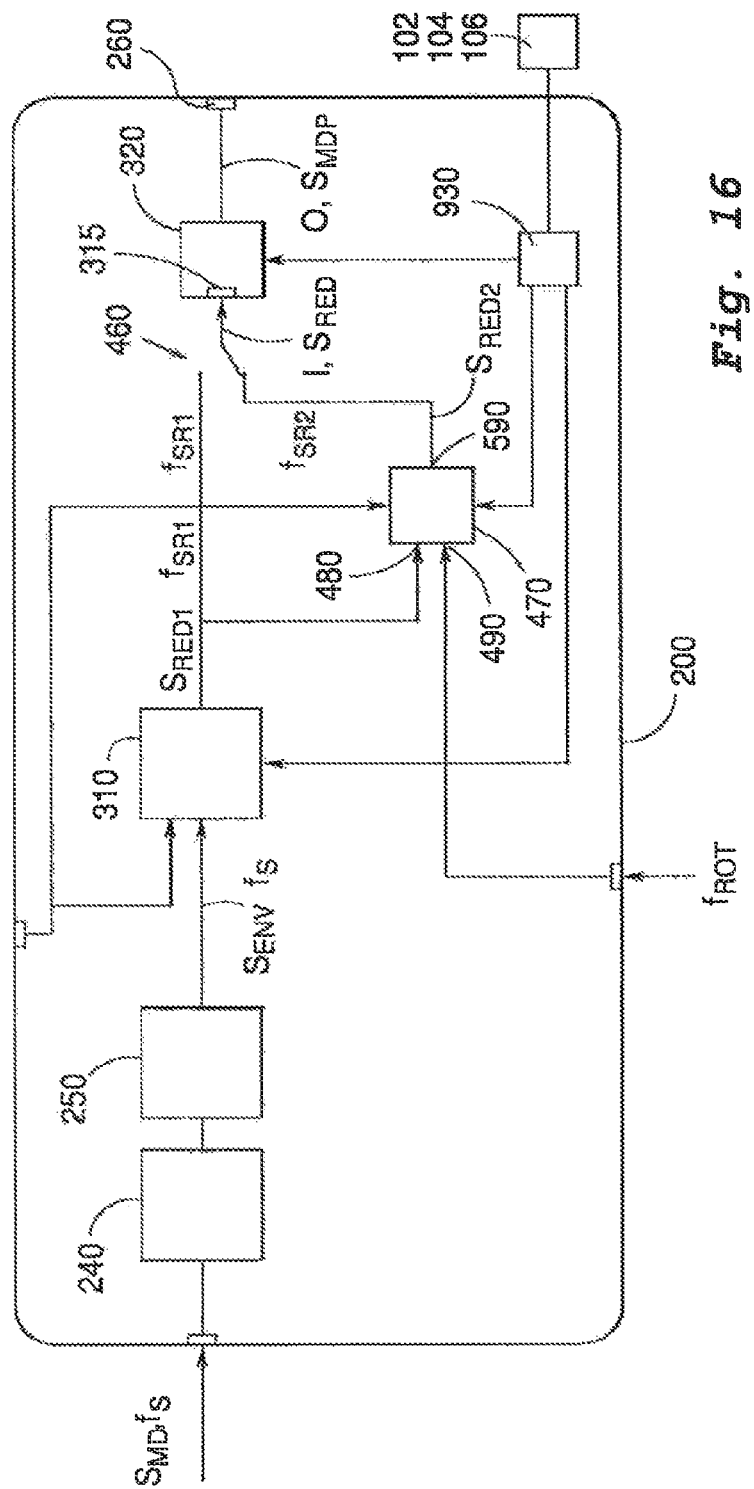
FIG. 16 illustrates an embodiment of the invention including a decimator and an enhancer, as described above, and a fractional decimator.

In a step S1100 (FIG. 10B) the enhancer 320 receives a digital input signal I having a first plurality $I_{LENGTH}$ of sample values on an input 315 (See FIG. 9 and/or FIG. 16). As noted above the digital input signal I may represent mechanical vibrations emanating from rotation of a shaft so far as to cause occurrence of a vibration having a period of repetition TR.

The received signal values are stored (Step S1120) in an input signal storage portion of a data memory associated with the enhancer 320. According to an embodiment of the invention the data memory may be embodied by the read/write memory 52 (FIG. 2A).

In a step S1130 the variable t, used in equation (5) above, is set to an initial value. The initial value may be 1 (one).

In step S1140 an output sample value $S_{MDP}(t)$ is calculated for sample number t. The calculation may employ the below equation:

$$s_{MDP}(t) = \sum_{i=1}^{i=CLENGTH} I(i) * I(i + Sstart + t)$$

The resulting sample value $S_{MDP}(t)$ is stored (Step S1150, FIG. 10B) in an output signal storage portion of the memory 52 (See FIG. 12).

In a step S1160 the process checks the value of variable t, and if the value of t represents a number lower than the desired number of output sample values $O_{LENGTH}$ a step S1160 is performed for increasing the value of variable t, before repeating steps S1140, S1150 and S1160.

If, in step S1160, the value of t represents a number equal to the desired number of output sample values $O_{LENGTH}$ a step S1180 is performed.

In step S1180 the output signal O, $S_{MDP}$ is delivered on output 260 (See FIG. 9 and/or FIG. 16).

As mentioned above, a data signal representing mechanical vibrations emanating from rotation of a shaft may include repetitive signal signatures, and a certain signal signature may thus be repeated a certain number of times per revolution of the shaft being monitored. Moreover, several mutually different repetitive signal signatures may occur, wherein the mutually different repetitive signal signatures may have mutually different repetition frequency. The method for enhancing repetitive signal signatures in signals, as described above, advantageously enables simultaneous detection of many repetitive signal signatures having mutually different repetition frequency. This advantageously enables the simultaneous detection of e.g a Bearing Inner Race damage signature and a Bearing Outer Race damage signature in a single measuring and analysis session, as described below.

Figure 13:
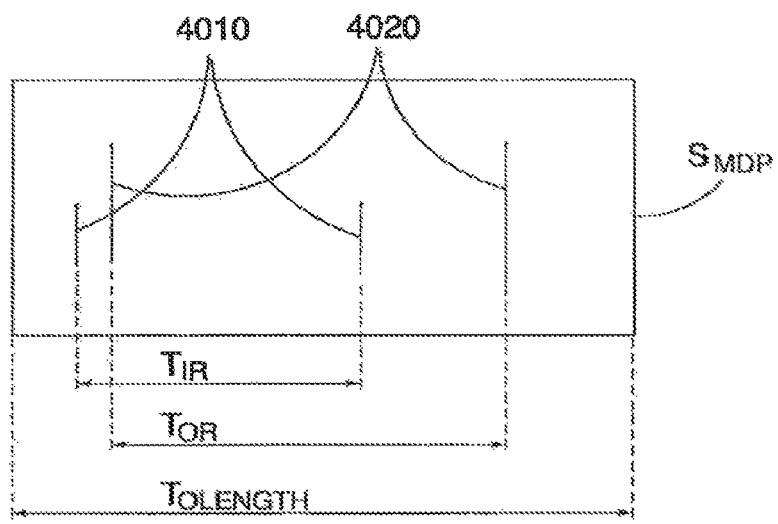
FIG. 13 is a schematic illustration of an example output signal $S_{MDP}$ comprising two repetitive signals signatures.

FIG. 13 is a schematic illustration of an example output signal $S_{MDP}$ comprising two repetitive signals signatures 4010 and 4020. The output signal $S_{MDP}$ may comprise more repetitive signals signatures than the ones illustrated in FIG. 13, but for illustrative purpose only two repetitive signal signatures are shown. Only some of many digital values for the repetitive signals signatures 4010 and 4020 are shown in FIG. 13.

In FIG. 13 the Outer Race (OR) frequency signal 4020 and the Inner Race (IR) frequency signal 4010 are illustrated. As can be seen in FIG. 13 the Outer Race (OR)

frequency signal 4020 has a lower frequency than the Inner Race (IR) frequency signal 4010. The repetition frequency for the Outer Race (OR) frequency signal 4020 and the Inner Race (IR) frequency signal 4010 is $1/T_{OR}$ and $1/T_{IR}$, respectively.

In the above described embodiments of the method of operating the enhancer 320 for enhancing repetitive signal patterns the repetitive signal patterns are amplified when calculating the output signal in step S1050. A higher amplification of the repetitive signal patterns is achieved if the factor L is given a higher value, in step S1010, than if L is given a lower value. A higher value of L means that a longer input signal $I_{LENGTH}$ is required in step S1030. A longer input signal $I_{LENGTH}$ therefore results in a higher amplification of the repetitive signal patterns in the output signal. Hence, a longer input signal $I_{LENGTH}$ renders the effect of better attenuation of stochastic signals in relation to the repetitive signal patterns in the output signal.

According to an embodiment of the invention the integer value $I_{LENGTH}$ may be selected in response to a desired amount of attenuation of stochastic signals. In such an embodiment the length factor L may be determined in dependence on the selected integer value $I_{LENGTH}$.

Now consider an exemplary embodiment of the method for operating the enhancer 320 for enhancing repetitive signal patterns where the method is used for amplification of a repetitive signal pattern with a certain lowest frequency. In order to be able to analyse the repetitive signal pattern with the certain lowest frequency a certain length of the output signal is required.

As mentioned above, using a longer input data signal in the calculation of the output signal results in that the repetitive signal pattern is amplified more than if a shorter input data signal is used. If a certain amplification of the repetitive signal pattern is required it is therefore possible to use a certain length of the input signal in order to achieve this certain amplification of the repetitive signal pattern.

To illustrate the above mentioned embodiment consider the following example:

A repetitive signal pattern with a lowest repetition frequency $f_1$ is of interest. In order to ensure detection of such a repetitive signal, it will be necessary to produce an output signal capable of indicating a complete cycle, i.e. it needs to represent a duration of $T_1=1/f_1$. When consecutive output signal sample values are separated by a sample period $t_{delta}$ the minimum number of sample values in the output signal will be $O_{Lengthmin}=T_1/t_{delta}$.

As mentioned above, the amount of amplification of the repetitive signal will increase with the length of the input signal.

As mentioned above, the method described with reference to FIGS. 10 to 13 above operates to enhance repetitive signal signatures in a sequence of measurement data emanating from a rotating shaft. The wording "repetitive signal signature" is to be understood as being sample values [x(t), x(t+T), x, (t+2T), . . . x(t+nT)] including an amplitude component having a non-stochastic amplitude value, and wherein a duration T between these sample values is constant, as long as the shaft rotates at a constant speed of rotation. With reference to FIG. 13 it is to be understood that digital values 4010 result from enhancing plural repetitive signal values in the input signal I (See FIG. 11), wherein the input signal values are separated in time by a duration $T_{IR}$. Hence, in that case it can be deduced that the "repetitive signal signature" relates to a damage at the inner ring of the bearing assembly, when the period of repetition $T_{IR}$ corresponds to a ball pass rate at the inner ring. Of course this presumes knowledge of the shaft diameter and the speed of rotation. Also, when there is such a "repetitive signal signature" signal component, there may be a repetitive signal component value x such that x(t) has similar amplitude as x(t+T) which has similar amplitude as x(t+2T), which has similar amplitude as x(t+nT)x, and so on. When there is such a "repetitive signal signature" present in the input signal, it may advantageously be detected using the above described method, even when the repetitive signal signature is so weak as to generate an amplitude component smaller than that of the stochastic signal components.

The method described in connection with FIGS. 10-13 may be performed by the analysis apparatus 14 when the processor 50 executes the corresponding program code 94, as discussed in conjunction with FIG. 4 above. The data processor 50 may include a central processing unit for controlling the operation of the analysis apparatus 14, as well as a Digital Signal Processor (DSP). The DSP may be arranged to actually run the program code 90 for causing the analysis apparatus 14 to execute the program 94 causing the process described above in connections with FIGS. 10-13 to be executed. The Digital Signal Processor may be e.g. of the type TMS320C6722, manufactured by Texas Instruments. In this manner the analysis apparatus 14 may operate to execute all signal processing functions 94, including filtering function 240, enveloping function 250, decimation function 310 & 470 and enhancing function 320.

According to another embodiment of the invention, the signal processing may be shared between the apparatus 14 and the computer 33, as mentioned above. Hence, apparatus 14 may receive the analogue measurement signal $S_{EA}$ and generate a corresponding digital signal $S_{MD}$, and then deliver the digital signal $S_{MD}$ to control computer 33, allowing further signal processing functions 94 to be performed at the control location 31.

Figure 10C:
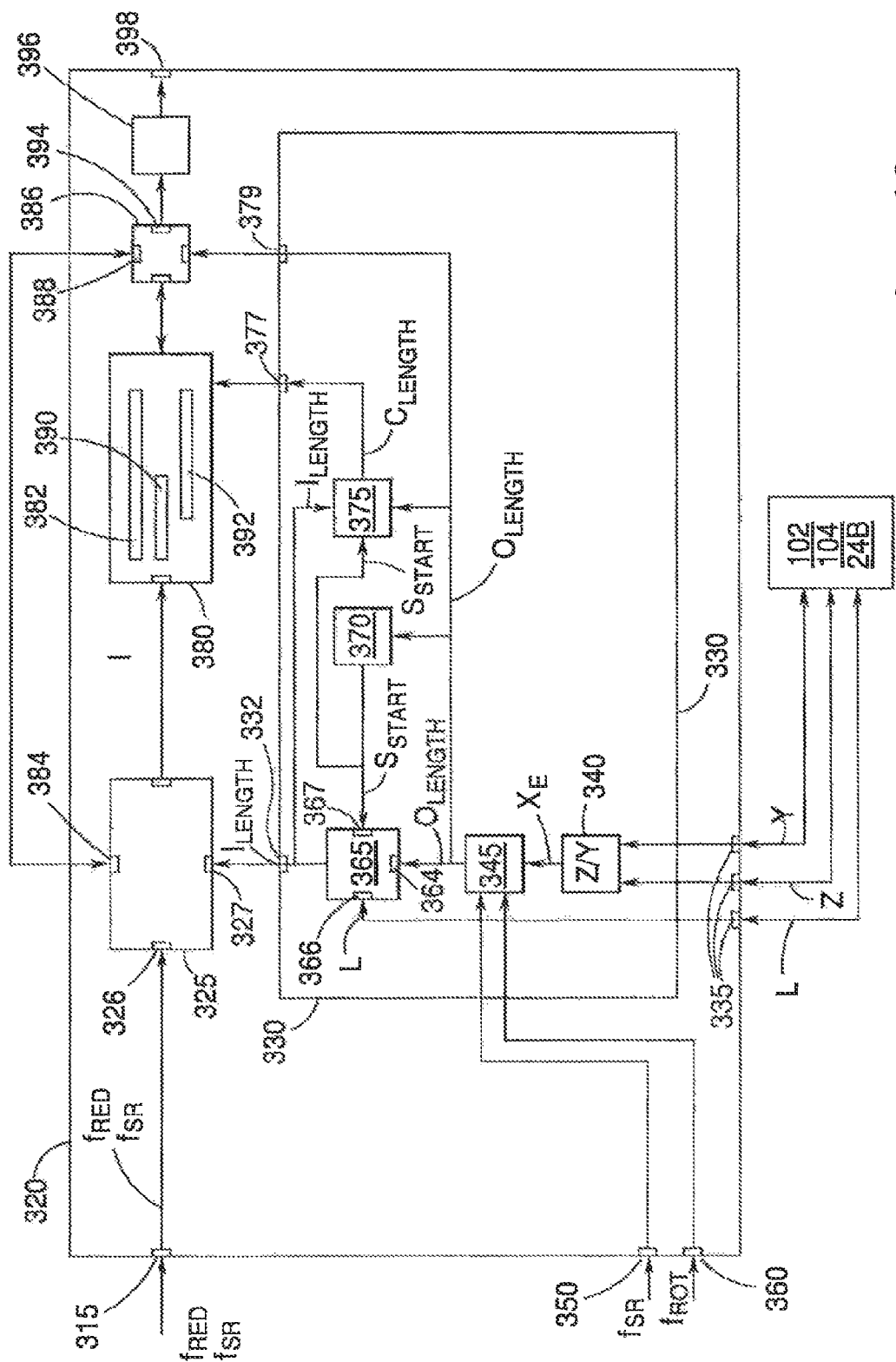
FIG. 10C illustrates an embodiment of enhancer.

FIG. 10C illustrates an embodiment of enhancer 320. The enhancer 320 has an input 315 on which it may receive a digital signal $S_{RED}$ having a sample rate $f_{SRED}$. Enhancer 320 may include a signal handler 325 adapted to receive the digital signal $S_{RED}$ on a port 326. The signal handler 325 also includes a port 327 for receiving a control value indicative of the desired length $I_{LENGTH}$ of the input signal I.

Enhancer 320 may also include a parameter setting means 330. The parameter setting means 330 operates to generate relevant control values for performing the desired signal enhancement. Hence the parameter setting means 330 has an output 332 for delivering the control value $I_{LENGTH}$ to signal handler 325.

Enhancer 320 may receive setting instructions on inputs 335. The setting instructions received on inputs 335 may include data indicative of an order value Y, data indicative of a frequency resolution Z, and data indicative of an SNR improver value L. The inputs 335 may be coupled to deliver the received data to the parameter setting means 330 (See FIG. 10C).

The enhancer 320 may be integrated in an analysis apparatus 14, as described above e.g., with reference to FIG. 1.

Alternatively the enhancer 320 may be a part of the control computer 33 at the central control location 31 (See FIG. 1). Accordingly digital signal $S_{RED}$ having a sample rate $f_{SRED}$ may be delivered to control computer 33 on port 29B, e.g. from analysis apparatus 14 via communications network 18.

Figure 10D:
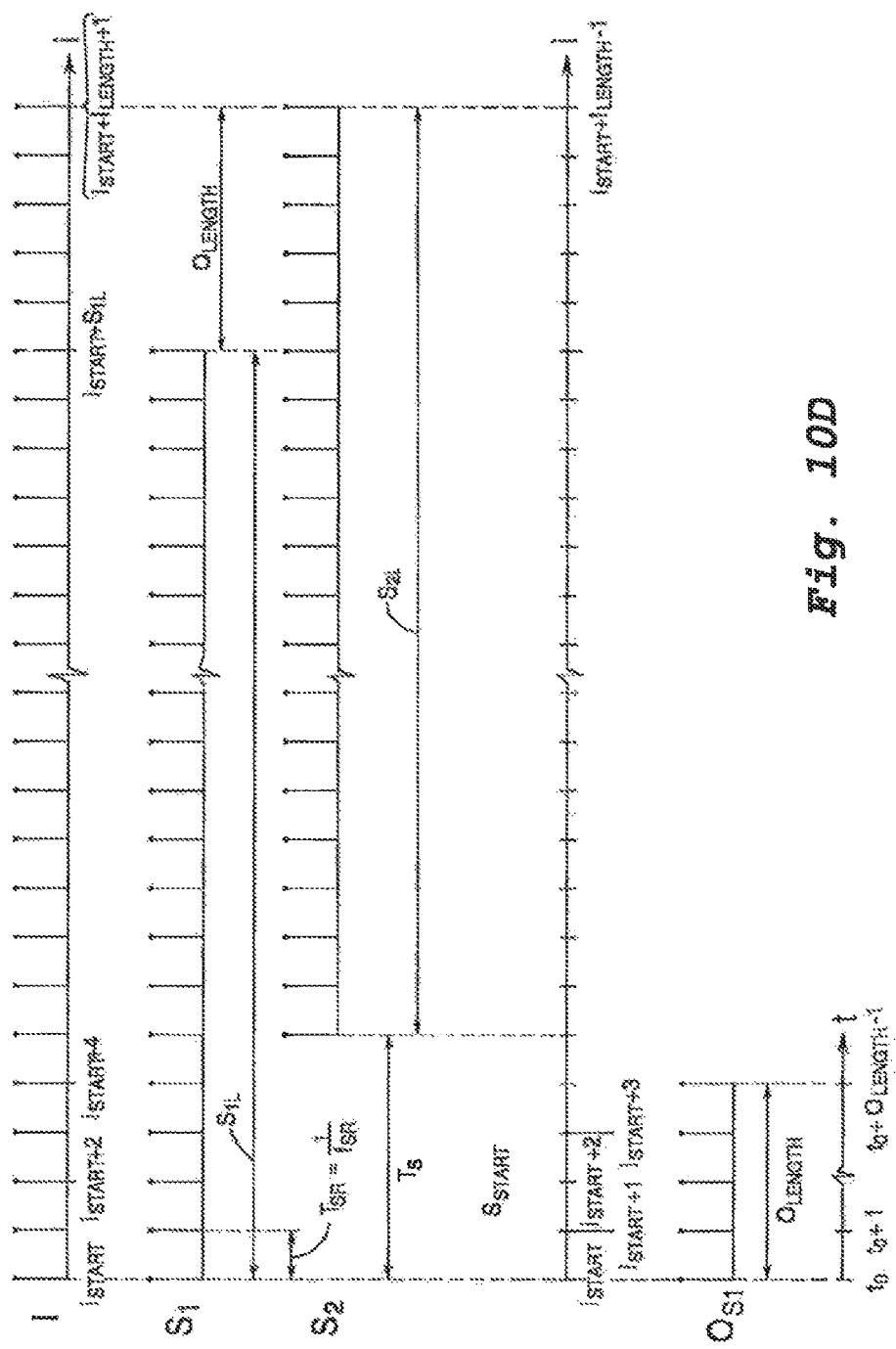
FIG. 10D illustrates signals according to an embodiment of the enhancer method.

FIG. 10D illustrates signals according to an embodiment of the enhancer method. A digital input signal I having a sample rate $f_{SR}$ is schematically illustrated at the top of FIG.

10D. The digital input signal I includes at least $I_{LENGTH}$ sample values, wherein $I_{LENGTH}$ is a positive integer.

The execution of a calculation like that described by equation (5) above, may be illustrated as an operation involving a first signal portion S1 and a second signal portion S2.

The first signal portion S1 includes a copy of the first $S_{1L}$ sample values in the input signal I. $S_{1L}=I_{LENGTH}-O_{LENGTH}$ The second signal portion S2 includes a copy of the last $S_{2L}$ sample values in the input signal I. $S_{2L}=I_{LENGTH}-S_{START}$ The signal $O_{S1}$ at the bottom of FIG. 10D is a schematic illustration of an output signal $O_{S1}$ obtained in response to a calculation involving the first signal portion S1 and the second signal portion S2.

Figure 10E:
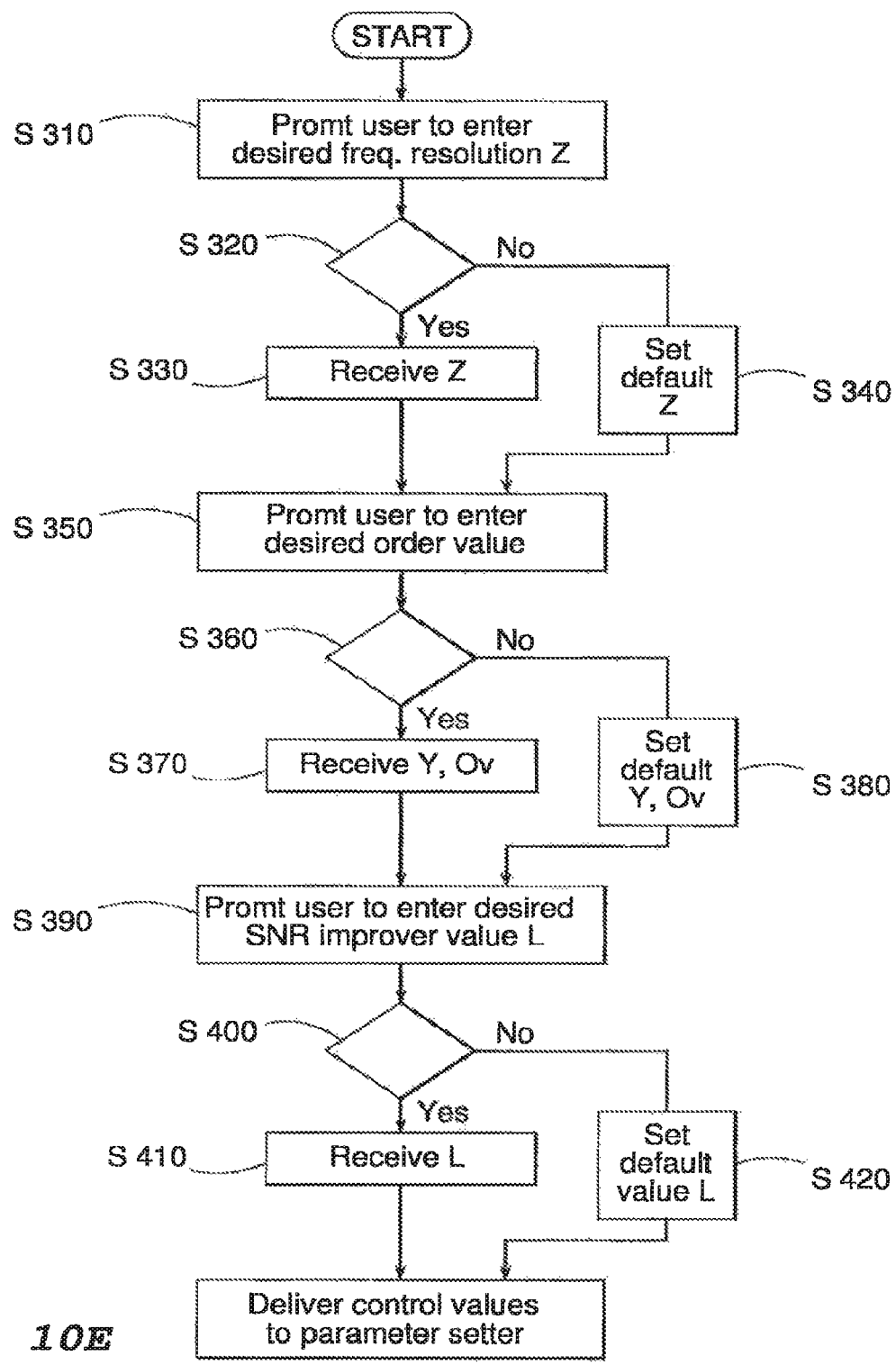
FIG. 10E illustrates an embodiment of a method of operating a user interface of the enhancer.

FIG. 10E illustrates an embodiment of a method of operating the enhancer 320.

In a step S310 the user interface 24B, 102, 104 prompts a user to enter enhancer setting values. According to an embodiment the user interface is adapted to request the user to indicate a desired frequency resolution Z; and a desired highest repetition frequency $f_{Dmax}$ to be detected, and information indicative of a desired Signal Noise Ratio improvement. The information indicative of desired SNR improvement may be entered in the form of SNR improver value L. The desired highest repetition frequency may be entered in the form of an order number $O_{VHigh}$, Y. In this context the order number $O_{VHigh}$, Y is equal to the relation (Y, $O_V$, $O_{VHIGH}$) between a highest repetition frequency ($f_{Dmax}$) to be detectable and said speed of rotation ($f_{ROT}$):

$$O_{VHIGH}=Y=f_{Dmax}/f_{ROT}$$

According to an embodiment of the invention, the user interface 24B, 102, 104 prompts the user to input a desired frequency resolution Z (step S310), and thereafter it is adapted to await input (step S320) in the form of data indicative of a desired frequency resolution Z or input in the form of data instructing the enhancer 320 to set the frequency resolution Z automatically. If data indicative of a desired frequency resolution Z is entered by the user, then the entered data will be delivered to the parameter setter 330 (step S330). If the user enters data indicating desire to let the frequency resolution Z be automatically set, the user interface will indicate (Step S340) to the parameter setter 330 to set the frequency resolution Z to a default value.

Thereafter, the user interface 24B, 102, 104 prompts (S350) the user to input a desired highest repetition frequency to be detected. The user interface 24B, 102, 104 is then adapted to await input (step S360) indicative of a desired highest repetition frequency or input in the form of data instructing the enhancer 320 to set the highest repetition frequency automatically. If data indicative of a desired highest repetition frequency is entered by the user, then the entered data will be received and delivered to the parameter setter 330 (step S370). If the user enters data indicating desire to let the highest repetition frequency be automatically set, the user interface will indicate (Step S380) to the parameter setter 330 to set the highest repetition frequency to a default value. The highest repetition frequency may be entered and/or set in the form of an order number $O_{VHigh}$, Y. As discussed above, the order value $O_{VHigh}$, Y is a setting of the highest repetition frequency to be detectable in the output signal Os to be generated. When, for example the interesting bearing signals may occur about y times per revolution of the monitored shaft 8, 801A, 801B, 801C, 803 the order value $O_{VHigh}$, Y should be set to at least y. Using numbers, this means that when the interesting bearing signals may occur about 100 times per revolution of the monitored shaft 8, 801A, 801B, 801C, 803 the order value $O_{VHigh}$, Y should be set to at least 100.

Thereafter, the user interface 24B, 102, 104 prompts (S390) the user to input a desired SNR improvement. The user interface 24B, 102, 104 is then adapted to await input (step S400) indicative of a desired SNR improvement or input in the form of data instructing the enhancer 320 to set the SNR improvement automatically. If data indicative of SNR improvement is entered by the user, then the entered data will be received and delivered to the parameter setter 330 (step S410). If the user enters data indicating desire to let the SNR improvement be automatically set, the user interface will indicate (Step S420) to the parameter setter 330 to set the SNR improvement to a default value. The SNR improvement may be entered in the form of SNR improver value L.

The control values are delivered to the parameter setter 320 on ports 335 (FIGS. 10C & 10E).

The parameter setter 330 includes a revolution calculator 340 coupled to receive the control values Z and Y. The revolution calculator 340 operates to calculate a value $X_E$. The value $X_E$ indicates how many "enhanced revolutions" of the monitored shaft 8, 801A, 801B, 801C, 803 the samples in the output signal $O_{S1}$ (See FIG. 10D and/or FIG. 12 and/or FIG. 13) should correspond to. For example, when the frequency resolution Z is set to 1600 and the order value is set to Y=100, then according to an embodiment of the invention the samples in the output signal $O_{S1}$ should correspond to $X_E=Z/Y=16$ "enhanced revolutions" of the monitored shaft 8, 801A, 801B, 801C, 803. Hence, the revolution calculator 340 has inputs for receiving data indicative of a frequency resolution setting value Z and data indicative of a set order value Y. The revolution calculator 340 generates a data value $X_E$ in response to the frequency resolution setting value Z and the data indicative of a set order value Y.

The revolution calculator 340 delivers the data value $X_E$ to an Output Signal Length Calculator 345.

Figure 30:
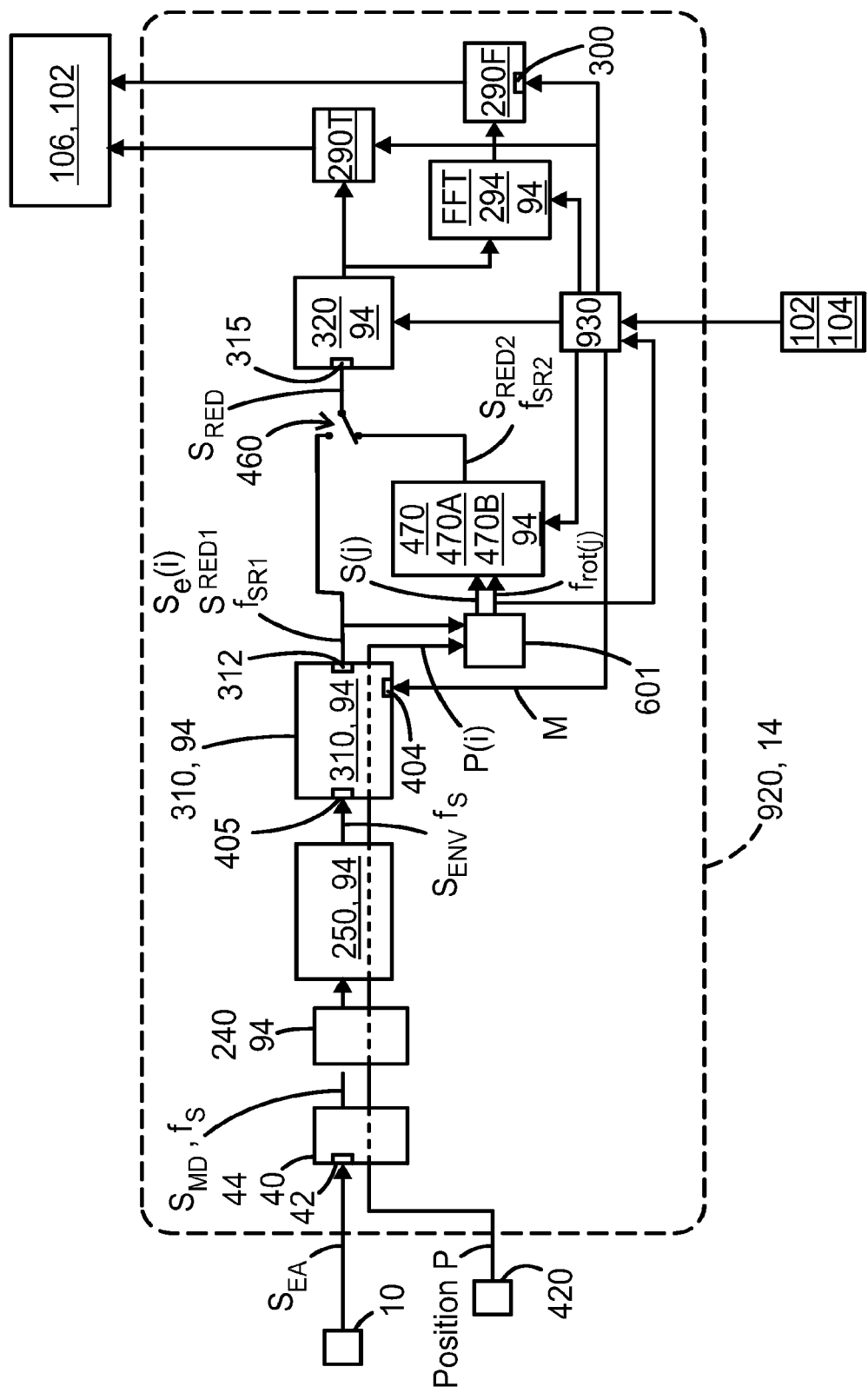
FIG. 30 is a block diagram illustrating the parts of the signal processing arrangement of FIG. 29 together with the user interface and the display.

As illustrated in FIG. 10C, the enhancer has an input 350 for receiving data indicative of the sample rate $f_{SR}$ of the signal $S_{RED}$ received on input 315. With reference to FIG. 9, FIG. 16 and FIG. 30, the sample rate value $f_{SR}$ may correspond to the value $f_{SR1}$ or $f_{SR2}$.

The enhancer 320 may also have an input 360 for receiving data indicative of a rotational speed $f_{ROT}$. For some machines the speed of rotation is preset to a constant value, and in such a case that speed value may be provided to input 360.

Alternatively a speed detector 420 (See FIG. 1 & FIG. 5 & FIG. 29) may be provided to deliver a signal indicative of the speed of rotation $f_{ROT}$ of the shaft 8. The speed of rotation $f_{ROT}$ of the shaft 8 may be provided in terms of revolutions per second, rps, i.e. Hertz (Hz). As discussed below in connection with FIG. 19B and FIG. 30 the speed of rotation values $f_{ROT}(j)$ may be generated by a speed value generator 601 in dependence on a position signal, according to embodiments of the invention.

The Output Signal Length Calculator 345 operates to calculate a value $O_L$ indicative of the number of sample values $O_{LENGTH}$ needed in the output signal $O_{S1}$ (See FIG. 10D) in response to the received data, i.e. in response to the shaft "enhanced revolutions" value $X_E$, the shaft rotational speed value $f_{ROT}$ and the sample rate value $f_{SR}$.

Hence, if $X_E=16$, the sample rate value $f_{SR}=30.72$ Hz and the shaft rotational speed value $f_{ROT}=0.12$ rps, then the number of sample values needed in the output signal $O_{S1}$ will be $O_L=X_E*f_{SR}/f_{ROT}=4096$.

Hence, according to an embodiment, the minimum number of sample values $O_L$ needed in the output signal $O_{S1}$, $S_{MDP}$ in order to enable a subsequent analysis of repetition frequencies up to order $O_{VHigh}$, Y with a frequency resolution Z can be calculated in dependence on the parameters Y, Z, $f_{ROT}$ and $f_{SR}$, wherein $f_{SR}$ is a sample rate value such that the number of samples per revolution of the monitored shaft 8, 801A, 801B, 801C, 803 is constant. The number of samples per revolution of the monitored shaft is constant when the rotational speed is constant, and/or when a fractional decimator is used for compensating for a variable shaft speed, as discussed in further detailed later in this document.

Accordingly the number of sample values $O_{LENGTH}$ to be generated must be $O_L$ or higher, wherein $O_L = X_E \cdot f_{SR}/f_{ROT}$.

The Output Signal Length Calculator 345 operates to calculate a value $O_L$ and to set the value $O_{LENGTH}$. The value $O_{LENGTH}$ is set to a value equal to or greater than the calculated value $O_L$.

The Output Signal Length Calculator 345 operates to deliver value $O_{LENGTH}$ to input 364 of an Input Signal Length Calculator 365. The Output Signal Length Calculator 345 also operates to deliver value $O_{LENGTH}$ to a stochastic signal frequency attenuator setting operator 370. The stochastic signal frequency attenuator setting operator 370 is arranged to set a variable $S_{START}$. The variable $S_{START}$ controls the frequency limit for attenuation of stochastic signals.

As can be seen from FIG. 10D, the value $S_{START}$ divided by the sample rate $f_{SR}$ corresponds to a time period Ts:

$$T_S = S_{START}/f_{SR} = S_{START} \cdot T_{SR}$$

Wherein $T_{SR}$ may represent the duration of time between two consecutive samples.

$S_{START}$ is the number of samples of delay or displacement between signals S1 and S2 to be correlated, as can also be seen in FIG. 10D.

When the variable $S_{START}$ is set to the same value as $O_{LENGTH}$ then stochastic signals with a corresponding frequency $f_{STOCHASTIC\_MAX} = 1/T_S$ and higher frequencies will be attenuated in the output signal O, $S_{MDP}$. Accordingly it is advantageous to set the variable $S_{START}$ to a value equal to $O_{LENGTH}$ or to a value higher than $O_{LENGTH}$. Hence, stochastic signal frequency attenuator setting operator 370 is arranged to set the variable $S_{START}$ to a value equal to $O_{LENGTH}$ or to a value higher than $O_{LENGTH}$.

The Input Signal Length Calculator 365 operates to calculate a value IL and to set the value $I_{LENGTH}$. The variable value IL is generated in dependence on the information indicative of desired SNR improvement which may be received on port 366, the value of the variable $S_{START}$ which may be received on port 367 and the value $O_{LENGTH}$ which may be received on port 364.

Hence, in order to be able to generate an output signal O, $S_{MDP}$ from the enhancer 320 having $O_{LENGTH}$ sample values, the enhancer must receive at least IL sample values on port 315. According to an embodiment the value of variable IL is:

$$I_L = O_{LENGTH} \cdot L + S_{START} + O_{LENGTH}$$

Accordingly it is advantageous to set the variable $I_{LENGTH}$ to a value equal to IL or to a value higher than $I_L$. Hence, Input Signal Length Calculator 365 is arranged to set the variable $I_{LENGTH}$ to a value equal to $I_L$ or to a value higher than $I_L$. The Input Signal Length Calculator 365 is arranged to deliver the control value TLENGTH on output 332 to the signal handler 325 (See FIG. 10C).

The Input Signal Length Calculator 365 is arranged to deliver the control value $I_{LENGTH}$ to an input of a Summing Determinator 375. The summing determinator 375 also has an input for receiving data indicative of the variable $S_{START}$. Moreover, the summing determinator 375 also has an input for receiving data indicative of the number of sample values $O_{LENGTH}$ to be generated in the form of output signal $O_{S1}$, $S_{MDP}$. Accordingly, the Stochastic Signal Frequency Attenuator Setting Operator 370 is arranged to deliver data indicative of the variable $S_{START}$ to the Summing Determinator 375, and Output Signal Length Calculator 345 is arranged to deliver data indicative of the value $O_{LENGTH}$ to the Summing Determinator 375.

The Summing Determinator 375 is arranged to generate a value $C_{LENGTH}$ in dependence on the values $I_{LENGTH}$, $O_{LENGTH}$ and $S_{START}$.

The value $C_{LENGTH}$ is set to a value substantially equal to the difference between the value $I_{LENGTH}$ and the sum of values $S_{START}$ and $O_{LENGTH}$ Hence, Summing Determinator 375 may deliver a value $C_{LENGTH} = I_{LENGTH} - S_{START} - O_{LENGTH}$.

The Summing Determinator 375 may be arranged to deliver the value $C_{LENGTH}$ on an output 377 of the parameter setting means 330.

FIG. 10G illustrates another embodiment of enhancer 320, wherein an embodiment 375B of the Summing Determinator has an input for receiving data indicative of the number of sample values $O_{LENGTH}$ to be generated, and another input for receiving the SNR improver value L. Summing Determinator 375B is adapted to generate a value $C_{LENGTH}$ in dependence on the values $O_{LENGTH}$ and the SNR improver value L. Summing Determinator 375B is adapted to set $C_{LENGTH} = L \cdot O_{LENGTH}$ The Summing Determinator 375B may be arranged to deliver the value $C_{LENGTH}$ on output 377 of the parameter setting means 330.

The Output Signal Length Calculator 345 also operates to deliver value $O_{LENGTH}$ on an output 379 of the parameter setting means 330.

As mentioned above, the signal handler 325 includes a port 326 for receiving the digital time domain signal $S_{RED}$, and a port 327 for receiving a control value indicative of the desired length $I_{LENGTH}$ of the input signal I.

Signal handler 325 cooperates with a memory 380 having plural memory portions. According to an embodiment the memory may include a memory portion 382 for storing at least $I_{LENGTH}$ consecutive sample values of the signal $S_{RED}$. Hence, Signal handler 325 may, in response to receiving an activation signal on an activation input 384 operate to read the value $I_{LENGTH}$ on input 327 and thereafter it operates to receive $I_{LENGTH}$ consecutive sample values on port 326. The Signal handler 325 may also, in response to receiving an activation signal on an activation input 384, in cooperation with memory 380 operate to store these sample values in memory portion 382.

Hence, the content of memory portion 382 represents input signal I, as depicted in FIG. 10D.

An output sample value generator 386 operates to generate a first signal portion S1 and a second signal portion S2 in dependence of input signal I.

In response to receiving the activation signal on activation input 388 the output sample value generator 386 may operate to read samples $I(i_0)$ to $I(i_0 + C_{LENGTH})$, and to store these samples in a second memory portion 390 as signal portion S1; and output sample value generator 386 may operate to read samples $I(i_0 + S_{START} + 1 + 1)$ to $I(Sstart+$ Clength+Olength)) and to store these samples in a third memory portion 392, wherein $i_0$ is a constant positive integer.

Hence, the content of memory portions 390 and 392, respectively, may represent first signal portion S1 and a second signal portion S2, as depicted in FIG. 10D. Thereafter output sample value generator 386 may operate to Cross correlate signals S1 and S2.

Figure 10F:
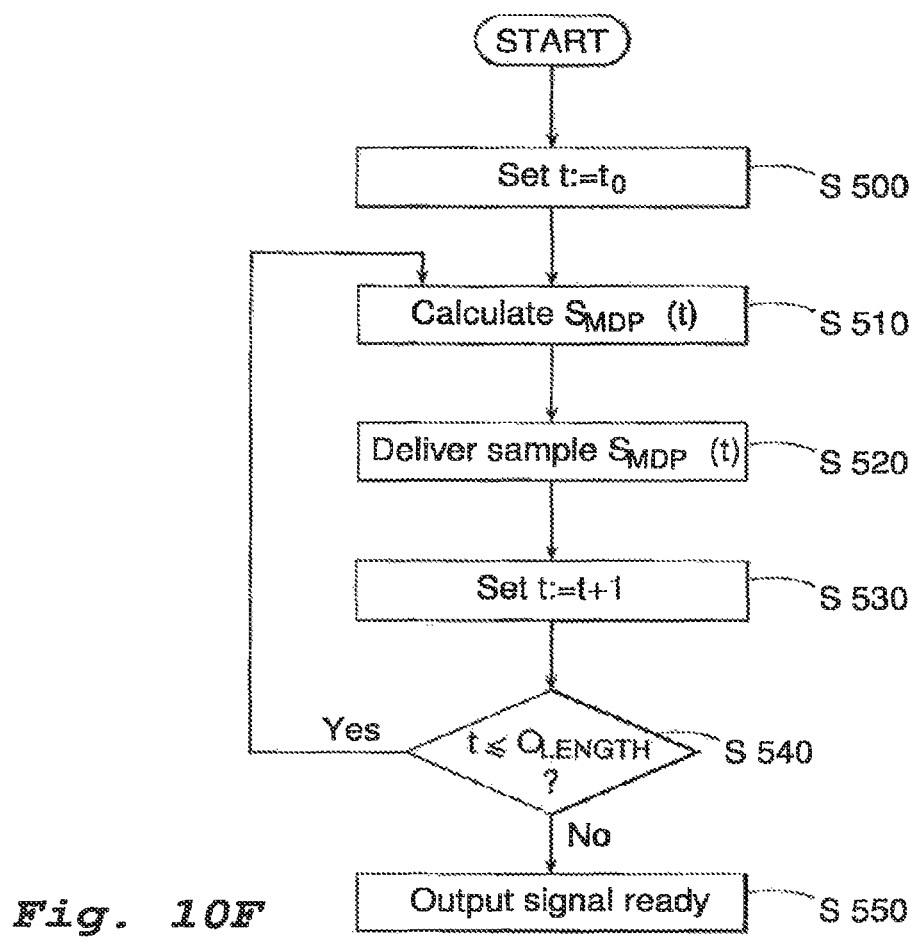
FIG. 10F illustrates an embodiment of a method of operating the enhancer.

Alternatively, the correlation involves reading the sample values of the input signal I as stored in memory portion 382, as schematically illustrated in FIG. 10C and at the top of FIG. 10D. With reference to FIG. 10F, the output sample value generator 386 may operate to perform the following steps:

Step S500: Set a variable t to a first value $t_0$. The first value $t_0$ may be $t_0=1$.

Step S510: Calculate an output sample value:

$$S_{MDP}(t) = \sum_{i=i0}^{i=i0+CLENGTH-1} I(i) * I(i + Sstart + t)$$

Step S520: Deliver the generated output sample value $S_{MDP}(t)$ on output port 394.

Step S530: Increase the counter value t, i.e. Set t:=t+1;

Step S540: Check if value t is greater than value $O_{LENGTH}+t_0-1$. If value t is greater than value $O_{LENGTH}+t_0-1$ then generate a signal to indicate that the complete output signal has been generated (Step S550). If value t is not greater than value $O_{LENGTH}+t_0-1$ then repeat step S510, using the increased t-value.

FIG. 10H is a table for illustrating an embodiment of a part of the calculation in step S510. The enhancer 320 is adapted to generate an output sample value $S_{MDP}(t)$ in dependence on a plurality $C_{LENGTH}$ of input signal products P(i,t). $C_{LENGTH}$ is a positive integer.

With reference to table 1 (See FIG. 10H) an input signal product P(i,t) for an output sample position t is obtained by multiplying a first input sample value I(i) at a first sample position i with a second input sample value $I(i+t+S_{START})$. The second input sample value is found at a second sample position $i+t+S_{START}$ in the input signal vector I (See FIG. 10D or FIG. 11). Hence, the second input sample value is separated from said first input sample value by a certain number $N_C$ of sample positions. That certain number of sample positions may be $N_C=(i+t+S_{START})-i=t+S_{START}$. Hence, the certain number $N_C$ may be equal to the sum of the output sample position value t and the certain value $S_{START}$.

As indicated above in connection with the description of FIG. 10D, the certain value $S_{START}$ is a number of sample positions which may correspond to a time period Ts. When the certain value $S_{START}$ is set to the same value as $O_{LENGTH}$ then stochastic signals with a corresponding frequency $f_{STOCHASTIC\_MAX}$ and higher frequencies will be attenuated in the output signal $S_{MDP}$. The value of this limit frequency value $f_{STOCHASTIC\_MAX}$ is:

$f_{STOCHASTIC\_MAX}=1/Ts$, wherein $Ts=S_{START}/f_{SR}$, wherein $f_{SR}$=the sample rate of the input signal I.

Hence, according to a preferred embodiment, the certain number $N_C$ is equal to, or larger than the certain value $S_{START}$. Hence, according to a preferred embodiment, the difference $N_C$ between the two index values of the two terms in an input signal product P(i,t) is equal to, or larger than, the certain value $S_{START}$.

In the above example, one term is first input sample value I(i) having index i, and the other term is second input sample value $I(i+t+S_{START})$ having index value $i+t+S_{START}$. In this connection it is of importance that the index values i, and $i+t+S_{START}$, respectively, are values associated with sample values within the input signal vector I. Hence, the range $I_{LENGTH}$ of input sample values and the index values i, and $i+t+S_{START}$, respectively, must be selected so that the index values are values within the input signal vector. With reference to the upper portion of FIG. 10D, which illustrates an embodiment of the input signal vector I, this means that the index values i, and $i+t+S_{START}$, respectively, must be values in the range from $i_{START}$ to $i_{START}+I_{LENGTH}-1$. Hence, if the constant $i_{START}$ is set to $i_{START}=1$, then the index values i, and $i+t+S_{START}$, respectively, must be values in the range from $i=1$ to $1=I_{LENGTH}$.

The input signal I may include $I_{LENGTH}$ sample values, as mentioned above.

The enhancer receives an input signal vector having a first plurality $I_{LENGTH}$ of input sample values. This first plurality $I_{LENGTH}$ of input sample values are processed so as to generate an output signal sequence $S_{MDP}$ having a second plurality $O_{LENGTH}$ of output sample values $S_{MDP}(t)$; said second plurality being a positive integer.

An output sample value $S_{MDP}(t)$ is calculated in dependence on a third plurality $C_{LENGTH}$ input signal products P(i,t); said third plurality ($C_{LENGTH}$) being a positive integer.

As indicated above in equations (1) and (3), the following relation may be used according to an embodiment:

$$I_{LENGTH}=O_{LENGTH}*L+S_{START}+O_{LENGTH} \quad (1)$$

and $$C_{LENGTH}=I_{LENGTH}-S_{START}-O_{LENGTH} \quad (3)$$

As an example, the following numerical values may be used:

L=10
$O_{LENGTH}=1024$
$S_{START}=1024$
$C_{LENGTH}=10240$
$I_{LENGTH}=12288$

Hence, if for example, $S_{START}=1024$, and t varies from $t=t_{MIN}=1$ to $t=t_{MAX}=O_{LENGTH}=1024$, and the below equation (8) is used:

$$S_{MDP}(t)=\sum_{i=i0}^{i=i0+CLENGTH-1} I(i)*I(i+Sstart+t) \quad (8)$$

then the difference $N_C$ between the two index values of the two terms will vary from $N_C=1025$ to $N_C=2048$. This is since the highest index value difference will be $N_{CMAX}=S_{START}+t_{MAX}=S_{START}+O_{LENGTH}=1024+1024=2048$; and the lowest index value difference will be $NC_{MIN}=S_{START}+t_{MIN}=1024+1=1025$.

Hence, if the constant $i_0=1$, the input signal vector I must then have index values ranging from $i=i_0=1$ to $i=I_{LENGTH}=12288$.

With reference to FIG. 10C, the output sample values $S_{MDP}(t)$ delivered on output port 394 may be delivered to a memory 396, and memory 396 may store the received sample values so that they are readable as a sequence of output sample values $O_{S1}$, $S_{MDP}$, as schematically illustrated in the lower left corner in FIG. 10D.

Alternatively, the output sample values $S_{MDP}(t)$ delivered on output port 394 of output sample value generator 386 may be delivered directly to output port 398 of enhancer 320.

According to another embodiment the equation for generating an output sample value $S_{MDP}(t)$ may be modified to read:

$$S_{MDP}(t)=\Sigma_{i=1+Sstart}^{i=Ilength-Olength} I(i-Sstart)*I(i+t) \quad (9)$$

The above equation (9) will provide an output signal sequence O, $S_{MDP}$ which is equivalent to the output signal sequence O, $S_{MDP}$ generated by equations (5) and (8) above. It can be shown that equation (9) is an alternative manner of expressing equation (5).

Hence, also according to the equation (9) embodiment for generating an individual output signal sample value $S_{MDP}(t)$, the number of sample positions Ne between the sample values to be multiplied will be $N_C=t+S_{START}$.

Decimation of Sampling Rate

It may be desirable to provide a decimator 310 to reduce the sampling frequency of the digital signal before delivery to the enhancer 320. Such a decimator 310 advantageously reduces the number of samples in the signal to be analyzed, thereby reducing the amount of memory space needed for storing the signal to be used. The decimation also enables a faster processing in the subsequent enhancer 320.

Figure 14A:
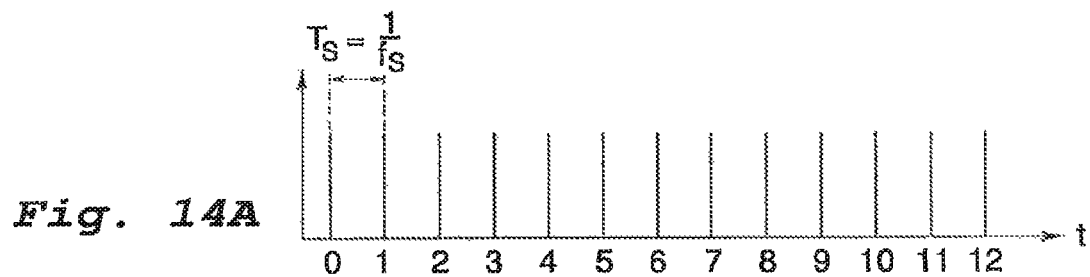
FIG. 14A illustrates a number of sample values in the signal delivered to the input of the decimator 310.
Figure 14B:
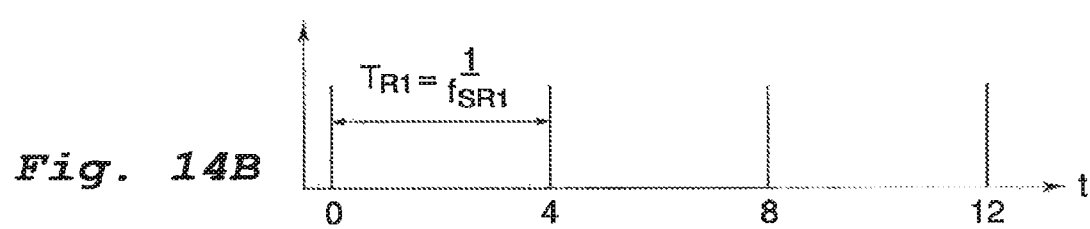
FIG. 14B illustrates output sample values of the corresponding time period.

FIG. 14A illustrates a number of sample values in the signal delivered to the input of the decimator 310, and FIG. 14B illustrates output sample values of the corresponding time period. The signal being input to decimator 310 may have a sampling frequency $f_S$. As can be seen the output signal is has a reduced sample frequency $f_{SR1}$. The decimator 310 is adapted to perform a decimation of the digitally enveloped signal $S_{ENV}$ so as to deliver a digital signal $S_{RED}$ having a reduced sample rate $f_{SR1}$ such that the output sample rate is reduced by an integer factor 1 as compared to the input sample rate $f_S$.

Hence, the output signal $S_{RED}$ includes only every M:th sample value present in the input signal $S_{ENV}$. FIG. 14B illustrates an example where M is 4, but M could be any positive integer. According to an embodiment of the invention the decimator may operate as described in U.S. Pat. No. 5,633,811, the content of which is hereby incorporated by reference.

Figure 15A:
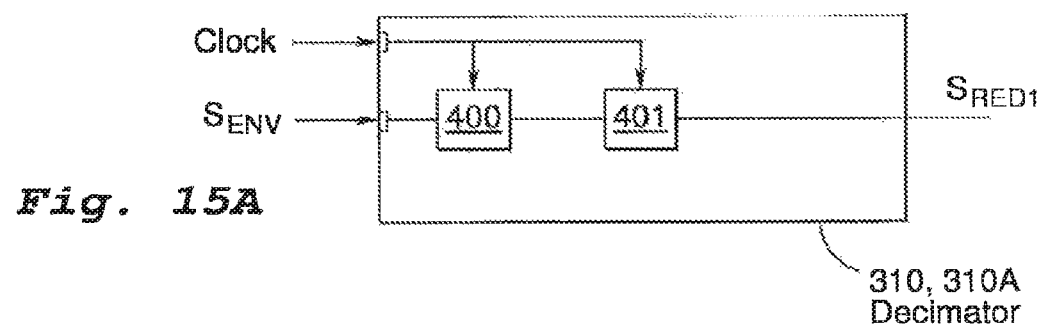
FIG. 15A illustrates a decimator according to an embodiment of the invention.

FIG. 15A illustrates a decimator 310 according to an embodiment of the invention. In the embodiment 310A of decimator 310 according to FIG. 15A, a comb filter 400 filters and decimates the incoming signal at a ratio of 16:1. That is, the output sampling rate is reduced by a first integer factor M1 of sixteen (M1=16) as compared to the input sampling rate. A finite impulse response (FIR) filter 401 receives the output of the comb filter 400 and provides another reduction of the sampling rate by a second integer factor M2. If integer factor M2=4, the FIR filter 401 renders a 4:1 reduction of the sampling rate, and therefore decimator 310A renders a total decimation of 64:1.

Figure 15B:
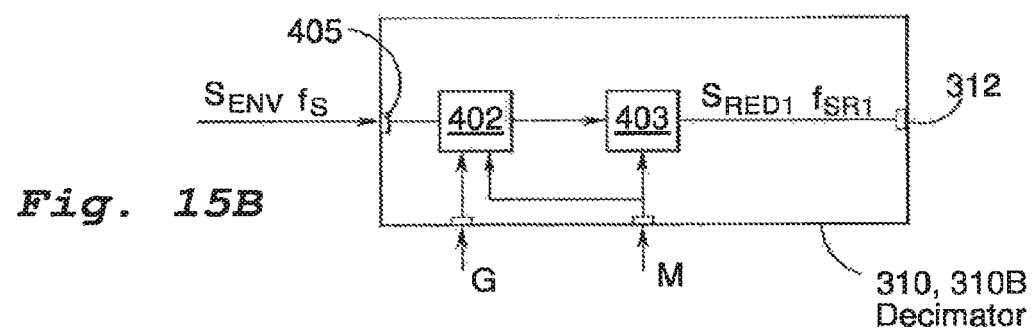
FIG. 15B illustrates another embodiment of the invention.

FIG. 15B illustrates another embodiment of the invention, wherein embodiment 310B of the decimator 310 includes a low pass filter 402, followed by a sample selector 403. The sample selector 403 is adapted to pick every M:th sample out of the signal received from the low pass filter 402. The resulting signal $S_{RED1}$ has a sample rate of $f_{SR1}=f_S/M$, where $f_S$ is the sample rate of received signal $S_{ENV}$. The cutoff frequency of the low pass filter 402 is controlled by the value M.

According to one embodiment the value M is preset to a certain value. According to another embodiment the value M may be settable. The decimator 310 may be settable to make a selected decimation M:1, wherein M is a positive integer. The value M may be received on a port 404 of decimator 310.

The cut-off frequency of low pass filter 402 is $f_{SR1}/(G*M)$ Hertz. The factor G may be selected to a value of two (2.0) or a value higher than two (2.0). According to an embodiment the value G is selected to a value between 2.5 and 3. This advantageously enables avoiding aliasing. The low pass filter 402 may be embodied by a FIR filter.

The signal delivered by low pass filter 402 is delivered to sample selector 403. The sample selector receives the value 1\1 on one port and the signal from low pass filter 402 on another port, and it generates a sequence of sample values in response to these inputs. The sample selector is adapted to pick every M:th sample out of the signal received from the low pass filter 402. The resulting signal $S_{RED1}$ has a sample rate of $f_{SR1}=1/M*f_S$, where $f_S$ is the sample rate of a signal $S_{ENV}$ received on a port 405 of the decimator 310.

A Method for Compensating for Variable Shaft Speed

As mentioned above, a repetitive signal signature being present in the input signal may advantageously be detected using the above described method, even when the repetitive signal signature is so weak as to generate an amplitude component smaller than that of the stochastic signal components.

However, in certain applications the shaft rotational speed may vary. Performing autocorrelation using an input measurement sequence wherein the speed of shaft rotation varies leads to deteriorated quality of the resulting output signal $S_{MDP}$.

Accordingly an object of an aspect of the invention is to achieve equally high quality of the output signal $S_{MDP}$ resulting from autocorrelation when the rotational speed of the shaft varies, as when the rotational speed of the shaft is constant during the complete measuring sequence, the data of which is autocorrelated.

FIG. 16 illustrates an embodiment of the invention including a decimator 310 and an enhancer 320, as described above, and a fractional decimator 470.

According to an embodiment of the invention, whereas the decimator 310 operates to decimate the sampling rate by M:1, wherein M is an integer, the FIG. 16 embodiment includes a fractional decimator 470 for decimating the sampling rate by U/N, wherein both U and N are positive integers. Hence, the fractional decimator 470 advantageously enables the decimation of the sampling rate by a fractional number. According to an embodiment the values for U and N may be selected to be in the range from 2 to 2000. According to an embodiment the values for U and N may be selected to be in the range from 500 to 1500. According to yet another embodiment the values for U and N may be selected to be in the range from 900 to 1100.

In the FIG. 16 embodiment the output signal from the decimator 310 is delivered to a selector 460. The selector enables a selection of the signal to be input to the enhancer 320. When condition monitoring is made on a rotating part having a constant speed of rotation, the selector 460 may be set in the position to deliver the signal $S_{RED}$ having sample frequency $f_{SR1}$ to the input 315 of enhancer 320, and fractional decimator 470 may be disabled. When condition monitoring is made on a rotating part having a variable speed of rotation, the fractional decimator 470 may be enabled and the selector 460 is set in the position to deliver the signal $S_{RED2}$ having sample frequency $f_{SR2}$ to the input 315 of enhancer 320.

The fractional decimator 470 has an input 480. The input 480 may be coupled to receive the signal output from decimator 310. The fractional decimator 470 also has an input 490 for receiving information indicative of the rotational speed of the shaft 8.

A speed detector 420 (See FIG. 5 & FIG. 1 & FIG. 29) may be provided to deliver a signal indicative of the speed of rotation $f_{ROT}$ of the shaft 8. The speed signal may be received on a port 430 of the processing means 180, thereby enabling the processing means 180 to deliver that speed signal to input 490 of fractional decimator 470. The speed of rotation $f_{ROT}$ of the shaft 8 may be provided in terms of rotations per second, i.e. Hertz (Hz).

Figure 17:
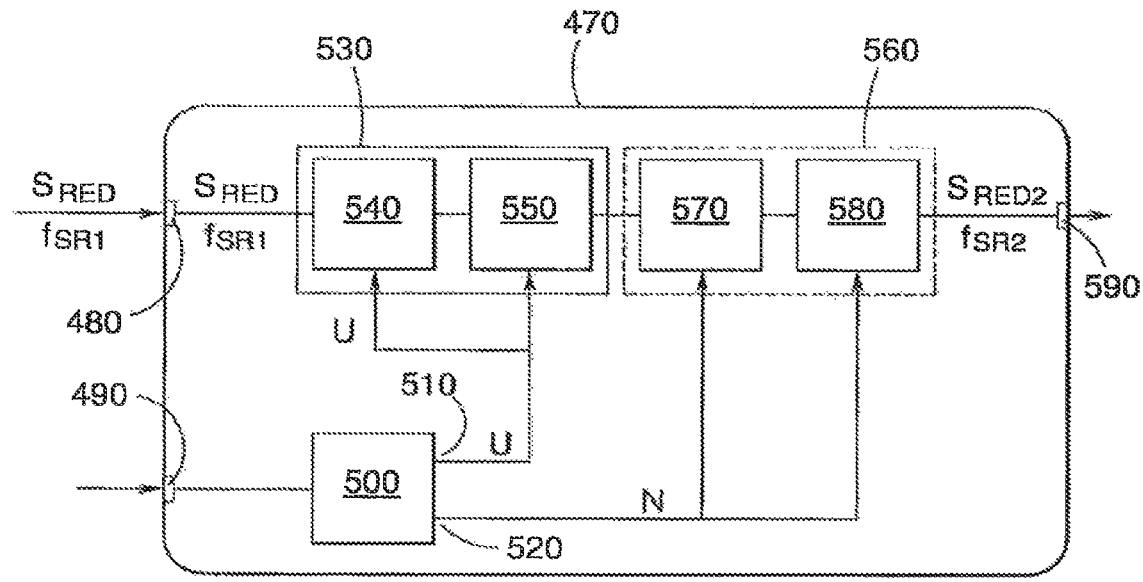
FIG. 17 illustrates an embodiment of the fractional decimator.

FIG. 17 illustrates an embodiment of the fractional decimator 470 enabling the alteration of the sample rate by a fractional number U/N, wherein U and N are positive integers. This enables a very accurate control of the sample rate $f_{SR2}$ to be delivered to the enhancer 320, thereby enabling a very good detection of weak repetitive signal signatures even when the shaft speed varies.

The speed signal, received on input 490 of fractional decimator 470, is delivered to a Fractional Number generator 500. The Fractional Number generator 500 generates integer number outputs U and N on outputs 510 and 520, respectively. The U output is delivered to an upsampler 530. The upsampler 530 receives the signal $S_{RED}$ (See FIG. 16) via input 480. The upsampler 530 includes a sample introductor 540 for introducing U−1 sample values between each sample value received on port 480. Each such added sample value is provided with an amplitude value. According to an embodiment each such added sample value is a zero (0) amplitude.

The resulting signal is delivered to a low pass filter 550 whose cut-off frequency is controlled by the value U delivered by Fractional Number generator 500. The cut-off frequency of low pass filter 550 is $f_{SR2}/(K*U)$ Hertz. The factor K may be selected to a value of two (2) or a value higher than two (2).

The resulting signal is delivered to a Decimator 560. The Decimator 560 includes a low pass filter 570 whose cutoff frequency is controlled by the value N delivered by Fractional Number generator 500. The cut-off frequency of low pass filter 570 is $f_{SR2}/(K*N)$ Hertz. The factor K may be selected to a value of two (2) or a value higher than two (2).

The signal delivered by low pass filter 570 is delivered to sample selector 580. The sample selector receives the value N on one port and the signal from low pass filter 570 on another port, and it generates a sequence of sample values in response to these inputs. The sample selector is adapted to pick every N:th sample out of the signal received from the low pass filter 570. The resulting signal $S_{RED2}$ has a sample rate of $f_{SR2}=U/N*f_{SR1}$, where $f_{SR1}$ is the sample rate of a signal $S_{RED}$ received on pmt 480. The resulting signal $S_{RED2}$ is delivered on an output port 590.

The low pass filters 550 and 570 may be embodied by FIR filters. This advantageously eliminates the need to perform multiplications with the zero-amplitude values introduced by sample introductor 540.

Figure 18:
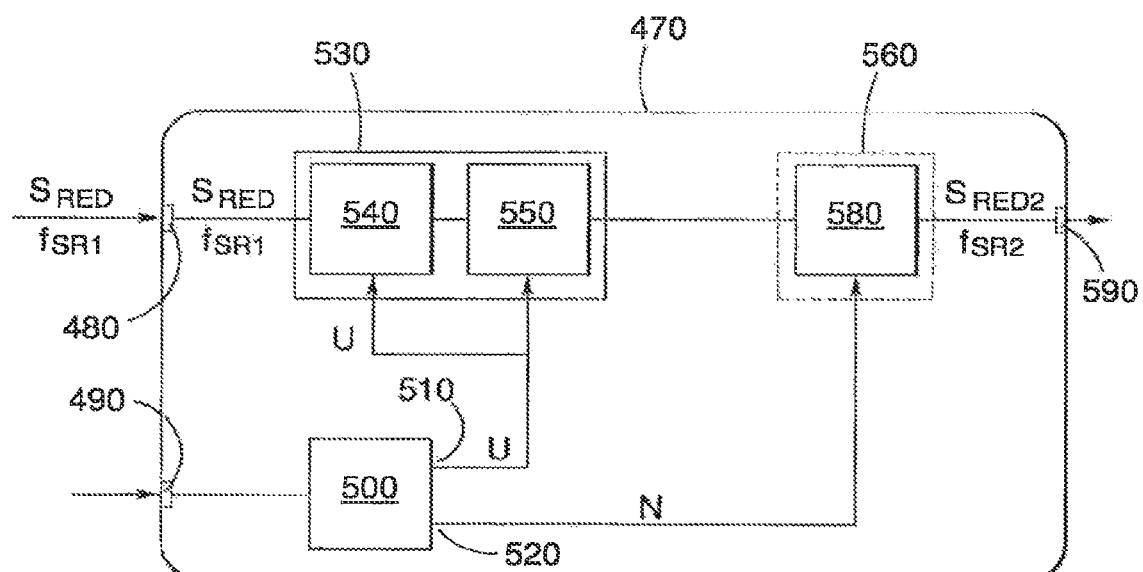
FIG. 18 illustrates another embodiment of the fractional decimator.

FIG. 18 illustrates another embodiment of the fractional decimator 470. The FIG. 18 embodiment advantageously reduces the amount of calculation needed for producing the signal $S_{RED2}$.

In the FIG. 18 embodiment the low pass filter 570 has been eliminated, so that the signal delivered by low pass filter 550 is delivered directly to sample selector 580. When the fractional decimator 470 is embodied by hardware the FIG. 18 embodiment advantageously reduces an amount of hardware, thereby reducing the cost of production.

When the fractional decimator 470 is embodied by software the FIG. 18 embodiment advantageously reduces an amount of program code that need to be executed, thereby reducing the load on the processor and increasing the execution speed.

With reference to FIGS. 17 and 18, the resulting signal $S_{RED2}$, which is delivered on the output port of fractional decimator 470, has a sample rate of $f_{SR2}=U/N*f_{SR1}$, where $f_{SR1}$ is the sample rate of a signal $S_{RED}$ received on port 480. The fractional value U/N is dependent on a rate control signal received on input port 490. As mentioned above, the rate control signal may depend on a signal indicative of the speed of rotation of the shaft 8, which may be delivered by speed detector 420 (See FIG. 1 and/or FIG. 5). The speed detector 420 may be embodied by a device 420 providing a pulse signal with a suitably selected resolution so as to enable the desired accuracy of the speed signal. In one embodiment the device 420 is adapted to deliver a full revolution marker signal once per full revolution of the shaft 8. Such a revolution marker signal may be in the form of an electric pulse having an edge that can be accurately detected and indicative of a certain rotational position of the monitored shaft 8. According to another embodiment, the device 420 may deliver many pulse signals per revolution of the monitored shaft.

According to an embodiment, the Fractional Number generator 500 controls the values of U and N so that the reduced sample rate FSR2 has such a value as to provide a signal $S_{RED2}$ wherein the number of samples per revolution of the shaft 8 is substantially constant, irrespective of any speed variations of the shaft 8.

Accordingly: The higher the values of U and N, the better the ability of the fractional decimator 470 at keeping the number of sample values per revolution of the shaft 8 at a is substantially constant value.

Figure 19A:
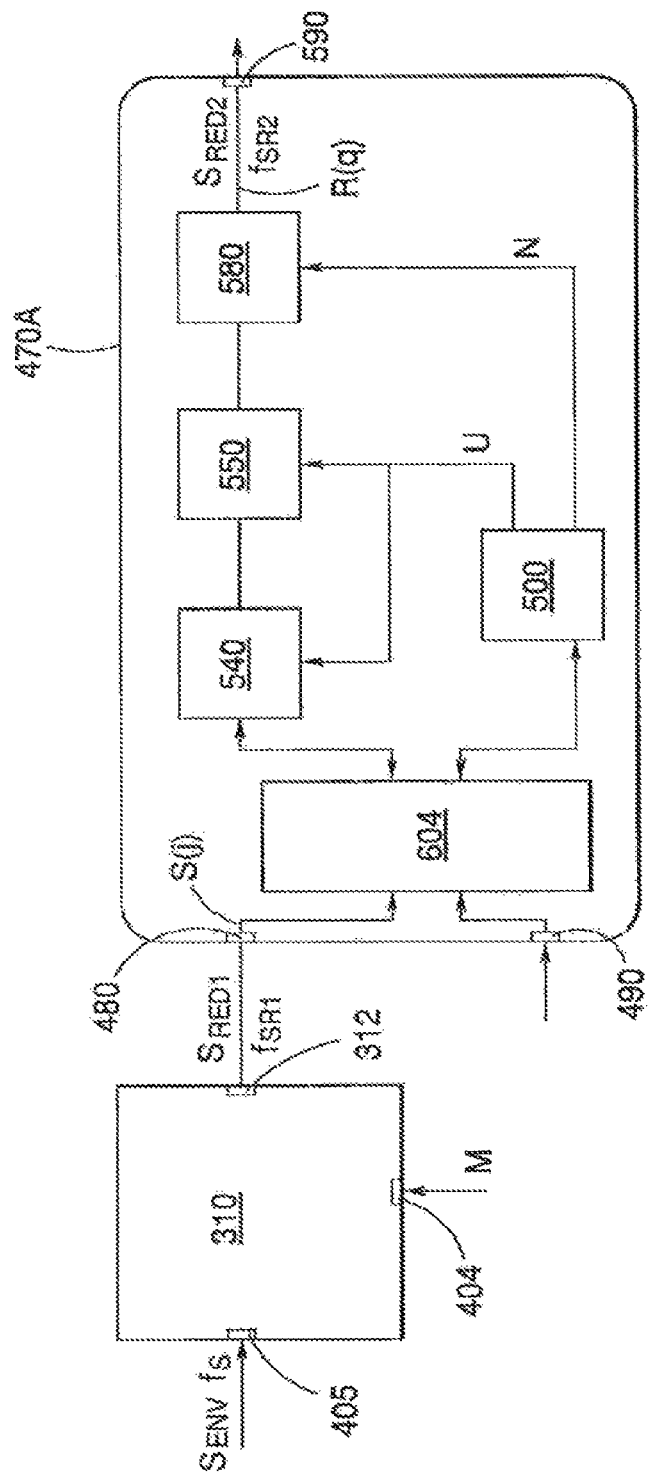
FIG. 19A illustrates decimator and another embodiment of fractional decimator.

FIG. 19A illustrates decimator 310 and another embodiment of fractional decimator 470. Decimator 310 receives the signal $S_{ENV}$ having a sampling frequency $f_S$ on a port 405, and an integer M on a port 404, as described above. Decimator 310 delivers a signal $S_{RED1}$ having a sampling frequency $F_{SR1}$ on output 312, which is coupled to input 480 of fractional decimator 470A. The output sampling frequency $f_{SR1}$ is $$f_{SR1}=f_S/M$$

wherein M is an integer.

Fractional decimator 470A receives the signal $S_{RED1}$, having a sampling frequency $f_{SR1}$, as a sequence of data values S(j), and it delivers an output signal $S_{RED2}$ as another sequence of data values R(q) on its output 590.

Fractional decimator 470A may include a memory 604 adapted to receive and store the data values S(j) as well as information indicative of the corresponding speed of rotation $f_{ROT}$ of the monitored rotating part. Hence the memory 604 may store each data value S(j) so that it is associated with a value indicative of the speed of rotation of the monitored shaft at time of detection of the sensor signal $S_{EA}$ value corresponding to the data value S(j).

Establishing an improved speed value

When Generating Output Data Values R(q) the Fractional Decimator 470A is adapted to read data values S(j) as well as information indicative of the corresponding speed of rotation $f_{ROT}$ from the memory 604.

With reference to FIGS. 17 and 18, the resulting signal $S_{RED2}$, which is delivered on the output port of fractional decimator 470, has a sample rate of $$f_{SR2}=U/N*f_{SR1}$$

where $f_{SR1}$ is the sample rate of a signal $S_{RED}$ received on port 480.

The fractional value U/N is dependent on a rate control signal received on input port 490. As mentioned above, the rate control signal may be a signal indicative of the speed of rotation of the shaft 8, which may be delivered by speed detector 420 (See FIG. 1 and/or FIG. 5).

As mentioned above, the rate control signal may depend on a signal indicative of the speed of rotation of the shaft 8, which may be delivered by speed detector 420 (See FIG. 1 and/or FIG. 5). The speed detector 420 may be embodied by a device 420 providing a pulse signal with a suitably selected resolution so as to enable the desired accuracy of the speed signal. In one embodiment the device 420 is adapted to deliver a full revolution marker signal once per full revolution of the shaft 8. Such a revolution marker signal may be in the form of an electric pulse having an edge that can be accurately detected and indicative of a certain rotational position of the monitored shaft 8. According to another embodiment, the device 420 may deliver many pulse signals per revolution of the monitored shaft 8.

The position signal, which may be referred to as an index pulse, can be produced on an output of the device 420 in response to detection of a zero angle pattern on an encoding disc that rotates when the monitored shaft rotates. This can be achieved in several ways, as is well known to the person skilled in the art. The encoding disc may e.g. be provided with a zero angle pattern which will produce a zero angle signal with each revolution of the disc. Correct interpretation of the position signal may also require gear ratio information. The gear ratio information may be indicative of about the rear ratio between the monitored part 8 and the rotating part of the device 420 that generates the position signal.

The speed variations may be detected e.g. by registering a "full revolution marker" in the memory 604 each time the monitored shaft passes the certain rotational position, and by associating the "full revolution marker" with a sample value s(j) received at the same instant. In this manner the memory 604 will store a larger number of samples between two consecutive full revolution markers when the shaft rotates slower, since the A/D converter delivers a constant number, $f_S$ or $f_{RED1}$, of samples per second.

In effect, the condition analysis apparatus 14, 920 may be adapted to record measurement data values S(j), encoder pulse signals Pi and time information such that each measurement data value S(j) can be associated with data indicative of time and angular position. This, in turn, makes it possible to associate a very accurate speed value with each measurement data value S(j).

According to an embodiment, the information about the positive edges of encoder signal Pi s processed in parallel with the filtering 240, enveloping 250 and decimation 310 in a manner so as to maintain the time relation between positive edges of the encoder signal P and corresponding vibration sample values Se(i) and S(j). This signal processing is schematically illustrated by FIG. 30.

Figure 19B:
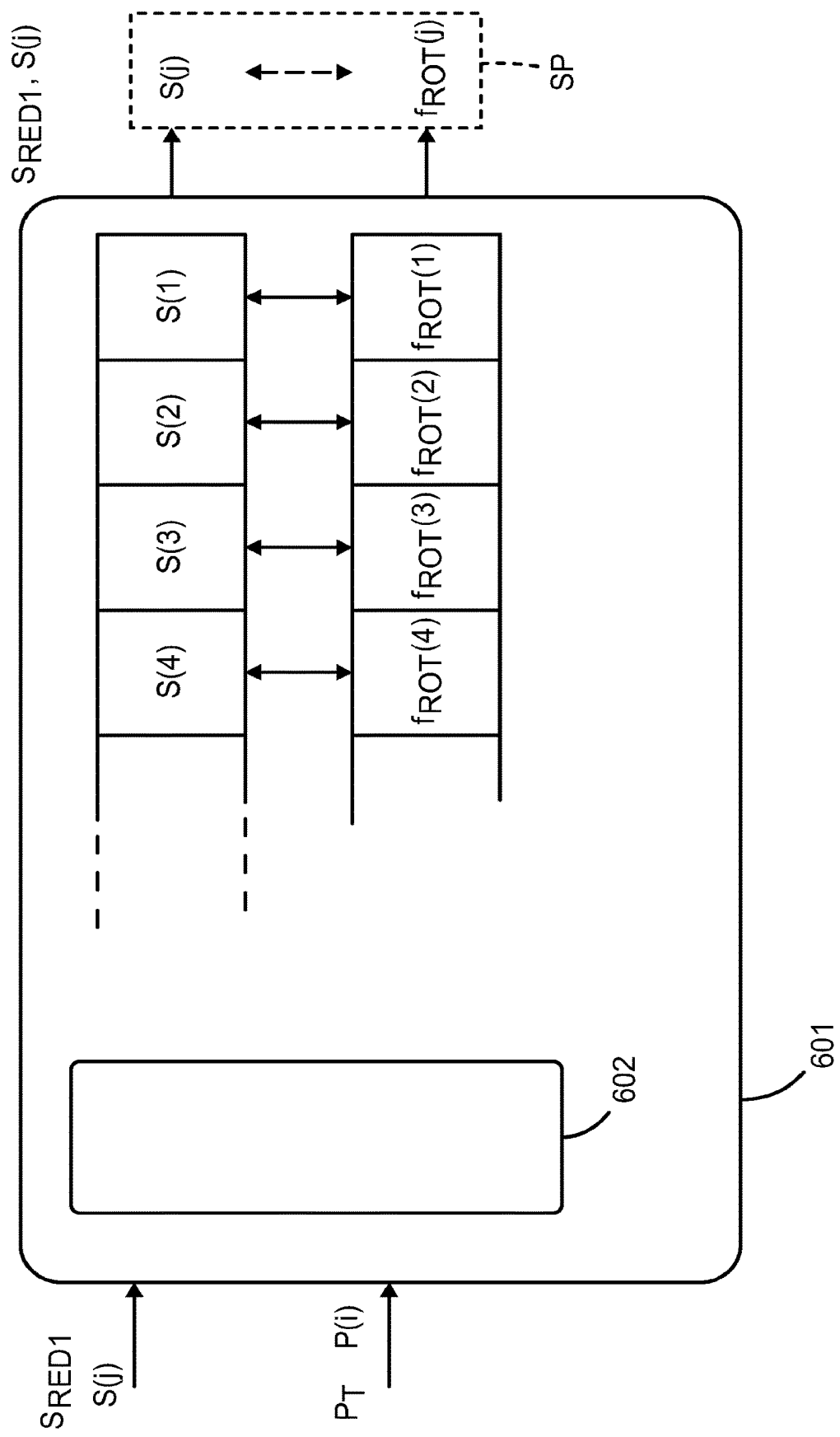
FIG. 19B is a block diagram of an embodiment of a speed value generator 601.

FIG. 19B is a block diagram of an embodiment of a speed value generator 601. According to an embodiment the speed value generator 601 comprises a memory 602. The speed value generator 601 is adapted to receive a sequence of measurement values S(j) and a sequence of positional signals, together with temporal relations there-between, and the speed value generator 601 is adapted to provide, on its output, a sequence of pairs SP of measurement values S(j) associated with corresponding speed values $f_{ROT}(j)$. This is described in detail below.

FIG. 19C is a simplified illustration of an embodiment of the memory 602 and its contents, and columns #01, #02, #03, #04 and #05, on the left hand side of the memory 602 illustration, provide an explanatory image intended to illustrate the temporal relation between the time of detection of the encoder pulse signals Pi (See column #02) and the corresponding vibration measurement values S(j) (See column #05).

As mentioned above, the analogue-to-digital converter 40, 44 samples the analogue electric measurement signal $S_{EA}$ at an initial sampling frequency $f_S$ so as to generate a digital measurement data signal $S_{MD}$. The encoder signal P may also be detected with substantially the same initial temporal resolution $f_S$, as illustrated in the column #02 of FIG. 19C. This signal processing is also illustrated in FIG. 30, as discussed in detail in connection with the description of FIG. 30 below. Column #01 illustrates the progression of time as a series of time slots, each time slot having a duration $dt=1/f_{sample}$; wherein $f_{sample}$ is a sample frequency having an integer relation to the initial sample frequency $f_S$ with which the analogue electric measurement signal $S_{EA}$ is sampled. According to a preferred embodiment, the sample frequency $f_{sample}$ is the initial sample frequency $f_S$. According to another embodiment the sample frequency $f_{sample}$ is the first reduced sampling frequency $f_{SR1}$, which is reduced by an integer factor M as compared to the initial sampling frequency $f_S$.

In column #02 of FIG. 19B each positive edge of the encoder signal P is indicated by a figure "1". In this example a positive edge of the encoder signal P is detected in the 3:rd, the 45:th, the 78:th time slot and in the 98:th time slot, as indicated in column #02. According to another embodiment, the negative edges of the positional signal are detected, which provides an equivalent result to detecting the positive edges. According to yet another embodiment both the positive and the negative edges of the positional signal are detected, so as to obtain redundancy by enabling the later selection of whether to use the positive or the negative edge.

Column #03 illustrates a sequence of vibration sample values Se(i), as generated by the analogue-to-digital converter 40, 44, and column #05 illustrates the corresponding sequence of vibration sample values S(j), as generated by the integer decimator 310. Hence, when the integer decimator is set up to provide a total decimation factor M=10, there will be provided one vibration sample value S(j) by decimator 310 for every ten samples Se(i) fed into the integer decimator 310.

According to an embodiment, a very accurate position and time information PT, relating to the decimated vibration sample value S(j), is maintained by setting the amplitude of the PositionTime signal in column #04 to value PT=3, so as to indicate that the positive edge (see col #02) was detected in time slot #03. Hence, the amplitude value of the PositionTime signal, after the integer decimation stage 310 is indicative of the time of detection of the position signal edge P in relation to sample value S(1).

In the example of FIG. 19B, the amplitude value of the PositionTime signal at sample i=3 is PT=3, and since decimation factor M=10 so that the sample S(1) is delivered in time slot 10, this means that the edge was detected M-PT=10−3=7 slots before the slot of sample S(1).

Accordingly, as illustrated in FIG. 30, the apparatus 14, 920 may operate to process the information about the positive edges of encoder signal P in parallel with the filtering 240, enveloping 250 and decimation 310 of the vibration samples in a manner so as to maintain the time relation between positive edges of the encoder signal P and corresponding vibration sample values Se(i) and S(j) through the above mentioned signal processing from detection of the analogue signals to the establishing of the speed values to be used by the fractional decimator.

Figure 19D:
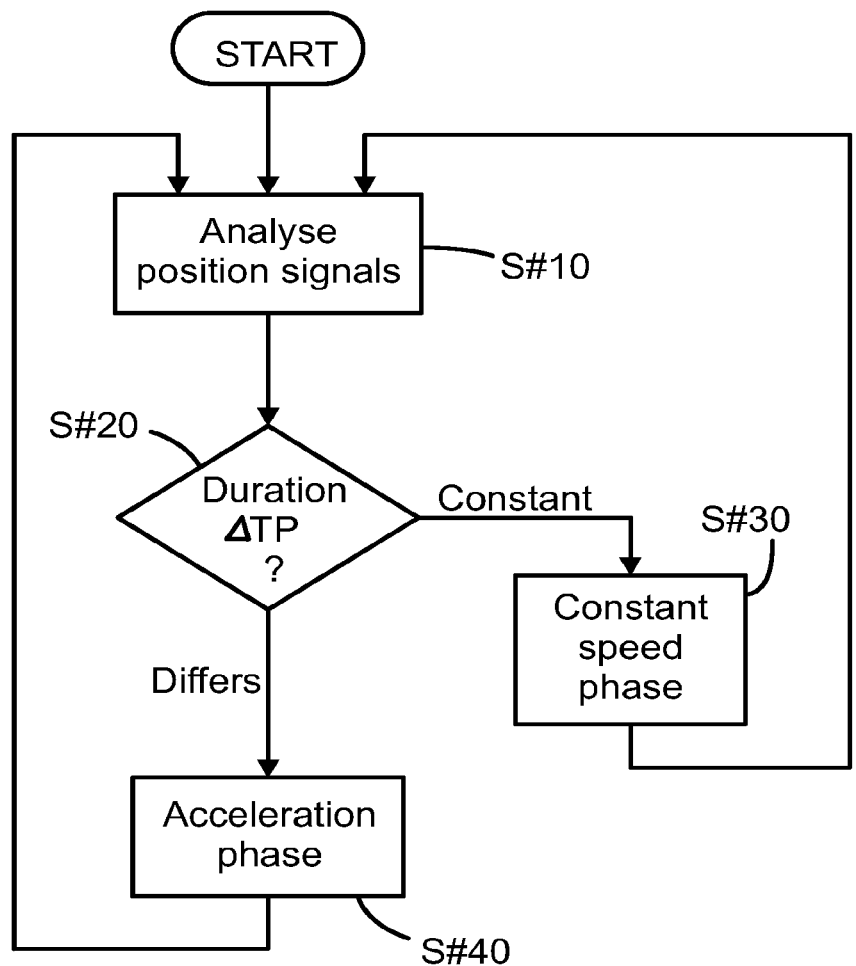
FIG. 19D is a flow chart illustrating an embodiment of a method of operating the speed value generator 601 of FIG. 19B.

FIG. 19D is a flow chart illustrating an embodiment of a method of operating the speed value generator 601 of FIG. 19B.

According to an embodiment, the speed value generator 601 analyses (Step S #10) the temporal relation between three successively received position signals, in order to establish whether the monitored rotational part 8 is in a constant speed phase or in an acceleration phase. This analysis may be performed on the basis of information in memory 602, as described above (See FIG. 19C).

If the analysis reveals that there is an identical number of time slots between the position signals, speed value generator concludes (in step #20) that the speed is constant, in which case step S #30 is performed.

In step #30, the speed value generator may calculate the duration between two successive position signals, by multiplication of the duration of a time slot $dt=1/f_S$ with the number of time slots between the two successive position signals. When the position signal is provided once per full revolution of the monitored part 8, the speed of revolution may be calculated as $$V=1/(n_{diff}*dt),$$

wherein $n_{diff}$=the number of time slots between the two successive position signals. During constant speed phase, all of the sample values S(j) (see column #05 in FIG. 19C) associated with the three analyzed position signals may be assigned the same speed value $V=1/(n_{diff}*dt)$, as defined above. Thereafter, step S #10 may be performed again on the next three successively received position signals.

Alternatively, when step S #10 is repeated, the previously third position signal P3 will be used a the first position signal P1 (i.e. P1:=P3), so that it is ascertained whether any change of speed is at hand.

If the analysis (Step S #10) reveals that the number of time slots between the 1:st and the 2:nd position signals differs from the number of time slots between the 2:nd and 3:rd position signals, the speed value generator concludes, in step S #20) that the monitored rotational part 8 is in an acceleration phase.

In a next step S #40, the speed value generator 601 operates to establish momentary speed values during acceleration phase, and to associate each one of at the measurement data values S(j) with a momentary speed value Vp which is indicative of the speed of rotation of the monitored part at the time of detection of the sensor signal ($S_{EA}$) value corresponding to that data value S(j).

Figure 19E:
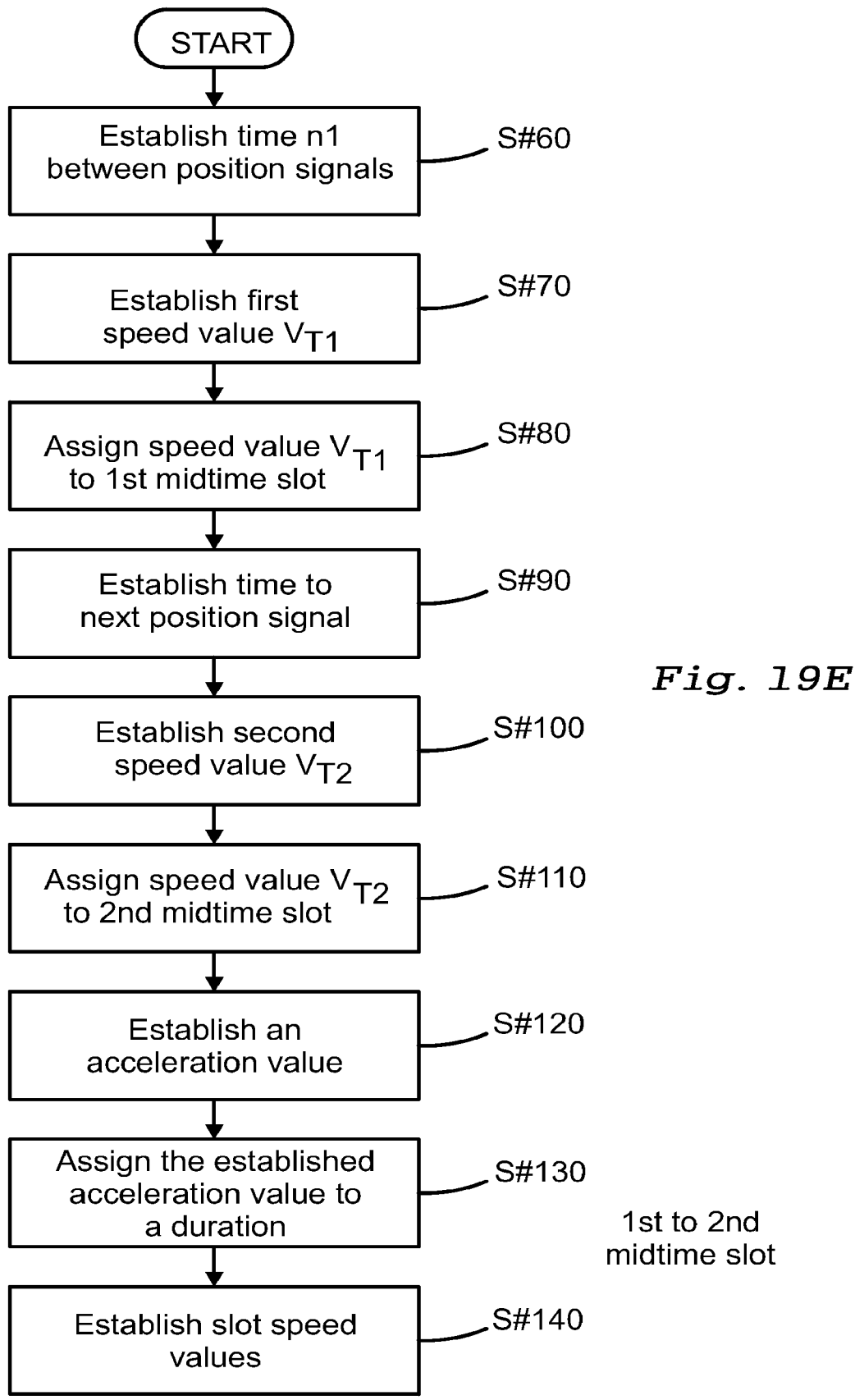
FIG. 19E is a flow chart illustrating an embodiment of a method for performing step S #40 of FIG. 19D.

FIG. 19E is a flow chart illustrating an embodiment of a method for performing step S #40 of FIG. 19D. According to an embodiment, the acceleration is assumed to have a constant value for the duration between two mutually adjacent position indicators P (See column #02 in FIG. 19C). Hence, when the position indicator P is delivered once per revolution, and
the gear ratio is 1/1: then
the angular distance travelled between two mutually adjacent position indicators P is 1 revolution, which may also be expressed as 360 degrees, and
the duration is $T=n_{diff}*dt$,
  where $n_{diff}$ is the number of slots of duration dt between the two mutually adjacent position indicators P.

With reference to FIG. 19C, a first position indicator P was detected in slot i1=#03 and the next position indicator P was detected in slot i2=#45. Hence, the duration was $n_{diff1}$=i2−i1=45−3=42 time slots.

Hence, in step S #60 (See FIG. 19E in conjunction with FIG. 19C), the speed value generator 601 operates to establish a first number of slots $n_{diff1}$ between the first two successive position signals P1 and P2, i.e. between position signal P(i=3) and position signal P(i=45).

In step S #70, the speed value generator 601 operates to calculate a first speed of revolution value VT1. The first speed of revolution value VT1 may be calculated as $$VT1=1/(n_{diff1}*dt),$$

wherein VT1 is the speed expressed as revolutions per second,
$n_{diff1}$=the number of time slots between the two successive position signals; and
dt is the duration of a time slot, expressed in seconds.

Since the acceleration is assumed to have a constant value for the duration between two mutually adjacent position indicators P, the calculated first speed value VT1 is assigned to the time slot in the middle between the two successive position signals (step S #80).

Hence, in this example wherein first position indicator P1 was detected in slot $i_{P1}$=#03 and the next position indicator P2 was detected in slot $i_{P2}$=#45; the first mid time slot is $$\text{slot } i_{P1-2}=i_{P1}+(1_{P2}-i_{P1})/2=3+(45-3)/2=3+21)=24.$$

Hence, in step S #80 the first speed of revolution value VT1 may be assigned to a time slot (e.g. time slot i=24) representing a time point which is earlier than the time point of detection of the second position signal edge P(i=45), see FIG. 19C.

The retro-active assigning of a speed value to a time slot representing a point in time between two successive position signals advantageously enables a significant reduction of the inaccuracy of the speed value. Whereas state of the art methods of attaining a momentary speed value have been satisfactory for establishing constant speed values at several mutually different speeds of rotation, the state of the art solutions have proven unsatisfactory when used for establishing speed values for a rotating part during an acceleration phase.

By contrast, the methods according to embodiments of the invention enable the establishment of speed values with an advantageously small level of inaccuracy even during an acceleration phase.

In a subsequent step S #90, the speed value generator 601 operates to establish a second number of slots $n_{diff2}$ between the next two successive position signals. In the example of FIG. 19C, that is the number of slots $n_{diff2}$ between slot 45 and slot 78, i.e. $n_{diff2}$=78−45=33.

In step S #100, the speed value generator 601 operates to calculate a second speed of revolution value VT2. The second speed of revolution value VT2 may be calculated as $$VT2=Vp61=1/(n_{diff2}*dt),$$

wherein $n_{diff2}$=the number of time slots between the next two successive position signals P2 and P3. Hence, in the example of FIG. 19C, $n_{diff2}$=33 i.e. the number of time slots between slot 45 and slot 78.

Since the acceleration may be assumed to have a constant value for the duration between two mutually adjacent position indicators P, the calculated second speed value VT2 is assigned (Step S #110) to the time slot in the middle between the two successive position signals.

Hence, in the example of FIG. 19C, the calculated second speed value VT2 is assigned to slot 61. Hence the speed at slot 61 is set to $$V(61):=VT2.$$

Hence, in step S #110 the second speed value VT2 may be assigned to a time slot (e.g. time slot i=61) representing a time point which is earlier than the time point of detection of the third position signal edge P(i=78), see FIG. 19C.

Hence, in this example wherein one position indicator P was detected in slot i2=#45 and the next position indicator P was detected in slot i3=#78; the second mid time slot is the integer part of:

$$i_{P2-3}=i_{P2}+(i_{P3}-i_{P2})/2=45+(78-45)/2=45+33/2=61,5$$

Hence, slot 61 is the second mid time slot $i_{P2-3}$.

In the next step S #120, a first acceleration value is calculated for the relevant time period. The first acceleration value may be calculated as:

$$a12=(VT2-VT1)/((i_{VT2}-i_{VT1})*dt)$$

In the example of FIG. 19C, the second speed value VT2 was assigned to slot 61, so $i_{VT2}$=61 and first speed value VT1 was assigned to slot 24, so $i_{VT1}$=24.

Hence, since $dt=1/f_S$, the acceleration value may be set to $$a12=f_S*(VT2-VT1)/(i_{VT2}-i_{VT1})$$

for the time period between slot 24 and slot 60, in the example of FIG. 19C.

In the next step S #130, the speed value generator 601 operates to associate the established first acceleration value a12 with the time slots for which the established acceleration value a12 is valid. This may be all the time slots between the slot of the first speed value VT1 and the slot of the second speed value VT2. Hence, the established first acceleration value a12 may be associated with each time slot of the duration between the slot of the first speed value VT1 and the slot of the second speed value VT2. In the example of FIG. 19C it is slots 25 to 60. This is illustrated in column #07 of FIG. 19C.

In the next step S #140, the speed value generator 601 operates to establish speed values for measurement values s(j) associated with the duration for which the established acceleration value is valid. Hence speed values are established for each time slot which is associated with a measurement value s(j), and
associated with the established first acceleration value a12.

During linear acceleration, i.e. when the acceleration a is constant, the speed at any given point in time is given by the equation:

$$V(i)=V(i-1)+a*dt,$$

wherein
V(i) is the momentary speed at the point of time of slot i
V(i−1) is the momentary speed at the point of time of the slot immediately preceding slot i
a is the acceleration
dt is the duration of a time slot According to an embodiment, the speed for each slot from slot 25 to slot 60 may be calculated successively in this manner, as illustrated in column #08 in FIG. 19C. Hence, the momentary speed values to be associated with the detected measurement values S(3), S(4), S(5), and S(6) associated with the acceleration value a12 may be established in this manner.

According to another embodiment, the momentary speed for the slot 30 relating to the first measurement value s(j)=S(3) may be calculated as:

$$V(i=30)=Vp30=VT1+a*(30-24)*dt=Vp24+a*6*dt$$

The momentary speed for the slot 40 relating to the first measurement value s(j)=S(4) may be calculated as:

$$V(i=40)=Vp40=VT1+a*(40-24)*dt=Vp40+a*16*dt$$

or as:

$$V(i=40)=Vp40=V(30)+(40-30)*dt=Vp30+a*10*dt$$

The momentary speed for the slot 50 relating to the first measurement value s(j)=S(5) may then subsequently be calculated as:

$$V(i=50)=Vp50=V(40)+(50-40)*dt=Vp40+a*10*dt$$

and the momentary speed for the slot 60 relating to the first measurement value s(j)=S(6) may then subsequently be calculated as:

$$V(i=60)=Vp50+a*10*dt$$

When the measurement sample values S(j) associated with the established acceleration value have been associated with a momentary speed value, as described above, an array of data including a time sequence of measurement sample values S(j), each value being associated with a speed value V(j), $f_{ROT}$(j), is delivered on an output of said speed value generator 601.

The time sequence of measurement sample values S(j), with associated speed values V(j), $f_{ROT}$(j) maybe used by the fractional decimator 470, 470B of FIG. 17, 18 or 19A, e.g. when performing the method described with reference to FIGS. 21 and 22.

Figure 19F:
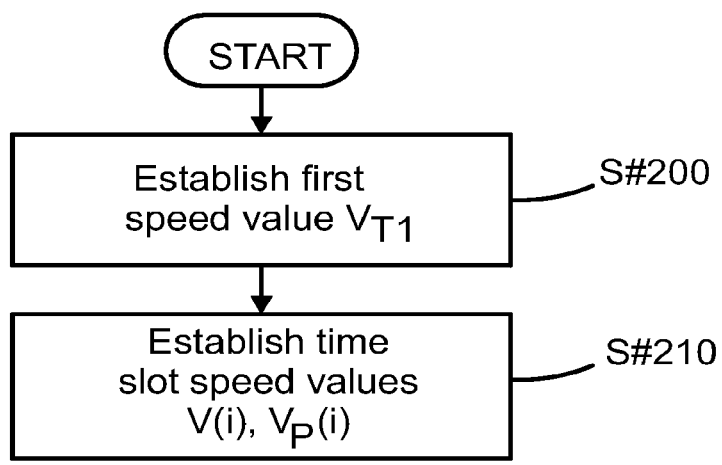
FIG. 19F is a flow chart illustrating another embodiment of a method for performing step S #40 of FIG. 19D.
Figure 19H:
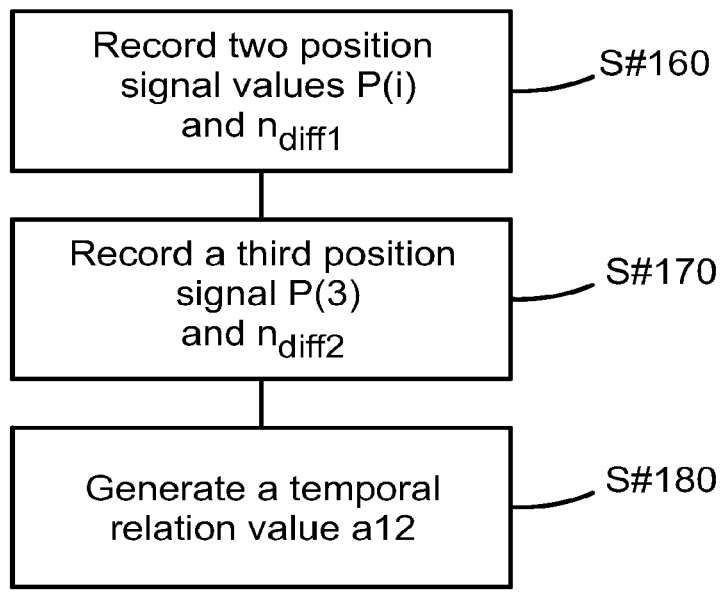
FIG. 19C is a simplified illustration of an embodiment of the memory 602 and its contents.
FIG. 19G is a graph illustrating a series of temporally consecutive position signals and advantageous effects of the method according to an embodiment of a speed value generator.

With reference to FIG. 19H, another embodiment of a method is described. According to this embodiment, the speed value generator operates to record (see step S #160 in FIG. 19H) a time sequence of position signal values $P_{(i)}$ of said position signal (Ep) such that there is a first temporal relation $n_{diff1}$ between at least some of the recorded position signal values ($P_{(i)}$), such as e.g. between a first position signal value $P1_{(i)}$ and a second position signal value $P2_{(i)}$. According to an embodiment, the second position signal value $P2_{(i)}$ is received and recorded in a time slot (i) which arrives ndiff1 slots after the reception of the first position signal value $P1_{(i)}$ (see step S #160 in FIG. 19H). Then the third position signal value $P1_{(i)}$ is received and recorded (see step S #170 in FIG. 19H) in a time slot (i) which arrives ndiff2 slots after the reception of the second position signal value $P2_{(i)}$.

As illustrated by step S #160 in FIG. 19H, the speed value generator may operate to calculate the relation value $$a12=ndiff1/ndiff2$$

If the relation value equals unity, or substantially unity, then the speed value generator operates to establish that the speed is constant, and it may proceed with calculation of speed according to a constant speed phase method.

If the relation value a12 is higher than unity, the relation value is indicative of a percentual speed increase.

If the relation value a12 is lower than unity, the relation value is indicative of a percentual speed decrease.

FIG. 19F is a flow chart illustrating an embodiment of a method for performing step S #40 of FIG. 19D. According to an embodiment, the acceleration is assumed to have a constant value for the duration between two mutually adjacent position indicators P (See column #02 in FIG. 19C). Hence, when the position indicator P is delivered once per revolution, and
the gear ratio is 1/1: then
the angular distance travelled between two mutually adjacent position indicators P is 1 revolution, which may also be expressed as 360 degrees, and
the duration is T=n*dt,
where n is the number of slots of duration dt between the first two mutually adjacent position indicators P1 and P2.

In a step S #200, the first speed of revolution value VT1 may be calculated as $$VT1=1/(ndiff1*dt),$$

wherein VT1 is the speed expressed as revolutions per second,
ndiff1=the number of time slots between the two successive position signals; and
dt is the duration of a time slot, expressed in seconds. The value of dt may e.g be the inverse of the initial sample frequency $f_S$.

Since the acceleration is assumed to have a constant value for the duration between two mutually adjacent position indicators P, the calculated first speed value VT1 is assigned to the first mid time slot in the middle between the two successive position signals P1 and P2.

In a step S #210, a second speed value VT2 may be calculated as $$VT2=1/(ndiff2*dt),$$

wherein VT2 is the speed expressed as revolutions per second, ndiff2=the number of time slots between the two successive position signals; and
dt is the duration of a time slot, expressed in seconds. The value of dt may e.g be the inverse of the initial sample frequency $f_S$.

Since the acceleration is assumed to have a constant value for the duration between two mutually adjacent position indicators P, the calculated second speed value VT2 is assigned to the second mid time slot in the middle between the two successive position signals P2 and P3.

Thereafter, the speed difference $V_{Delta}$ may calculated as $$V_{Delta}=VT2-VT1$$

This differential speed $V_{Delta}$ value may be divided by the number of time slots between the second mid time slot and the first mid time slot. The resulting value is indicative of a speed difference dV between adjacent slots.

The momentary speed value to be associated with selected time slots may then be calculated in dependence on said first speed of revolution value VT1, and the value indicative of the speed difference between adjacent slots.

When the measurement sample values S(j), associated with time slots between the first mid time slot and the second mid time slot, have been associated with a momentary speed value, as described above, an array of data including a time sequence of measurement sample values S(j), each value being associated with a speed value V(j) is delivered on an output of said speed value generator 601. The momentary speed value V(j) may also be referred to as $f_{ROT}(j)$.

The time sequence of measurement sample values S(j), with associated speed values V(j), $f_{ROT}(j)$ may be used by the fractional decimator 470, 470B, e.g. when performing the method described with reference to FIGS. 21 and 22.

In summary, according to embodiments of the invention, a first momentary speed value VT1 may be established in dependence of the angular distance delta-$FI_{p1-p2}$ between a first positional signal P1 and a second positional signal P2, and in dependence of
the corresponding duration delta-$T_{p1-p2}=t_{P2}-t_{P1}$.

Thereafter, a second momentary speed value VT2 may be established in dependence of the angular distance delta-$FI_{p1-p3}$ between the second positional signal P2 and a third positional signal P3, and in dependence of
the corresponding duration delta-$T_{p2-p3}=t_{P2}-t_{p1}$.

Thereafter, momentary speed values for the rotational part 8 may be established by interpolation between the first momentary speed value VT1 and the second momentary speed value VT2.

In other words, according to embodiments of the invention, two momentary speed values VT1 and VT2 may be established based on the angular. distances delta-$FI_{p1-p2}$, delta-$FI_{p2-p3}$ and the corresponding durations between three consecutive position signals, and thereafter momentary speed values for the rotational part 8 may be established by interpolation between the first momentary speed value VT1 and the second momentary speed value VT2.

Figure 19G:
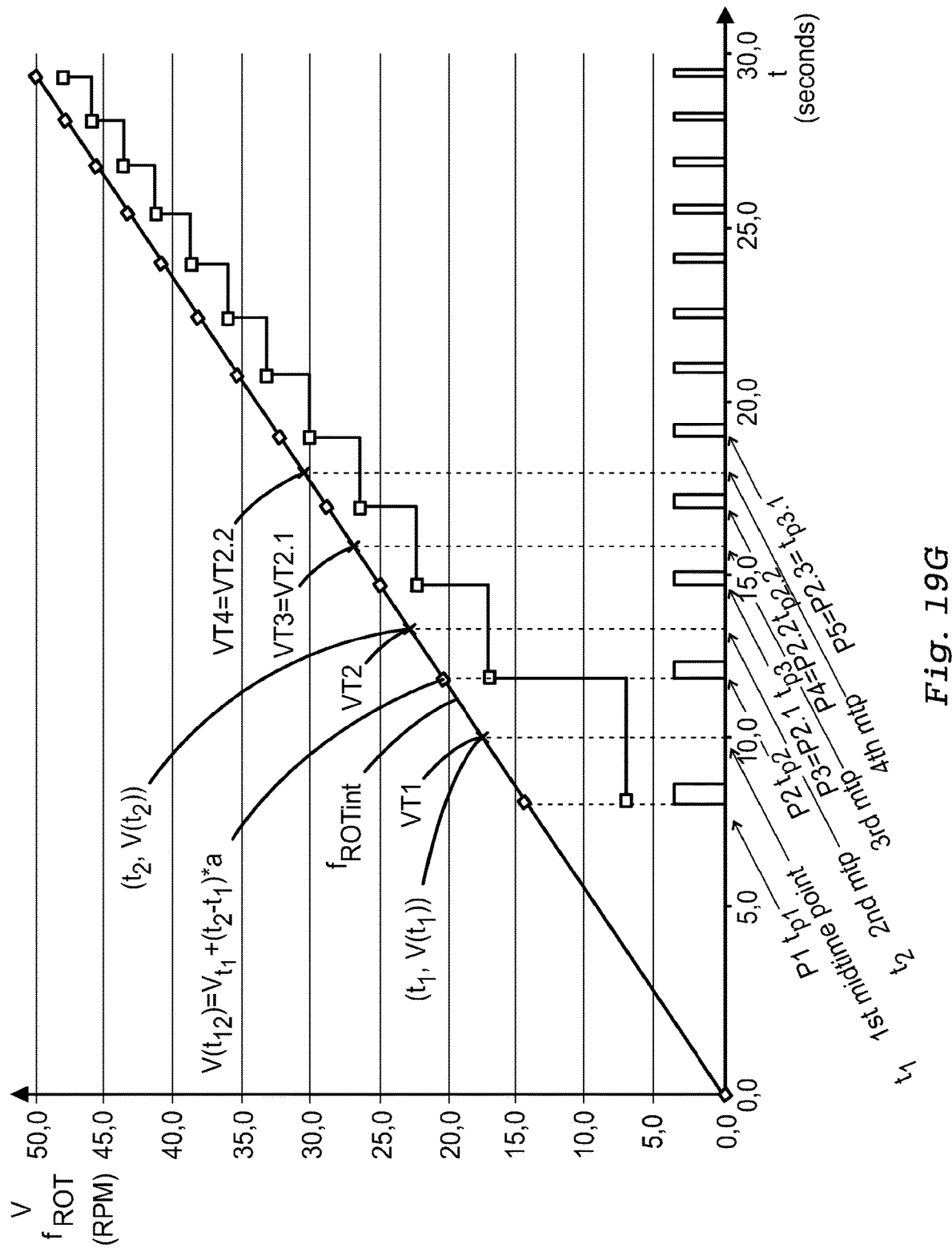

FIG. 19G is a graph illustrating a series of temporally consecutive position signals P1, P2, P3, . . . , each position signal P being indicative of a full revolution of the monitored part 8. Hence, the time value, counted in seconds, increases along the horizontal axis towards the right.

The vertical axis is indicative of speed of rotation, graded in revolutions per minute (RPTv1).

With reference to FIG. 19G, effects of the method according to an embodiment of the invention are illustrated. A first momentary speed value $V(t_1)$=VT1 may be established in dependence of the angular distance delta-$FI_{p1-p2}$ between the first positional signal P1 and the second positional signal P2, and in dependence of
the corresponding duration delta-$T_{1-2}=t_{P2}-t_{P1}$. The speed value attained by dividing the angular distance delta-$FI_{p1-p2}$ by the corresponding duration ($t_{P2}-t_{P1}$) represents the speed V(t1) of the rotational part 8 at the first mid time point $t_1$, also referred to as mtp (mid time point), as illustrated in FIG. 19G.

Thereafter, a second momentary speed value $V(t_2)$=VT2 may be established in dependence of the angular distance delta-FI between the second positional signal P2 and a third positional signal P3, and in dependence of
the corresponding duration delta-$T2-3=t_{P3}-t_{P2}$.

The speed value attained by dividing the angular distance delta-FI by the corresponding duration ($t_{P3}-t_{P2}$) represents the speed V(t2) of the rotational part 8 at the 2:nd mid time point $t_2$(2:nd mtp), as illustrated in FIG. 19G.

Thereafter, momentary speed values for time values between the first mid time point and the 2:nd mid time point may be established by interpolation between the first momentary speed value VT1 and the second momentary speed value VT2, as illustrated by the curve $f_{ROTint}$.

Mathematically, this may be expressed by the following equation:

$$V(t12)=V(t1)+a*(t12-t1)$$

Hence, if the speed of the shaft 8 can be detected at two points of time (t1 and t2), and the acceleration a is constant, then the momentary speed at any point of time can be calculated. In particular, the speed V(t12) of the shaft at time t12, being a point in time after $t_1$ and before $t_2$, can be calculated by $$V(t12)=V(t_1)+a*(t12-t_1)$$

wherein
a is the acceleration, and
$t_1$ is the first mid time point $t_1$ (See FIG. 19G).

The establishing of a speed value as described above, as well as the fractional decimation as described with reference to FIGS. 17, 18, 19A, 21 and 22 may be attained by performing the corresponding method steps, and this may be achieved by means of a computer program 94 stored in memory 60, as described above. The computer program may be executed by a DSP 50. Alternatively the computer program may be executed by a Field Programmable Gate Array circuit (FPGA).

The establishing of a speed value as described above, as well as the fractional decimation as described with reference to FIGS. 17, 18, 19A, 21 and 22 may be performed by the analysis apparatus 14 when the processor 50 executes the corresponding program code 94, as discussed in conjunction with FIG. 4 above. The data processor 50 may include a central processing unit 50 for controlling the operation of the analysis apparatus 14. Alternatively, the processor 50 may be embodied by a Digital Signal Processor (DSP) 50B. The DSP 50B may be arranged to actually run the program code 90 for causing the analysis apparatus 14 to execute the program 94 causing the processes described above to be executed. According to another embodiment the processor 50B is a Field programmable Gate Array circuit (FPGA).

Fractional Decimation

The data values S(j) read from the memory 604 are delivered to sample introductor 540 for introducing U−1 sample values between each sample value received on port 480. Each such added sample value is provided with an amplitude value. According to an embodiment each such added sample value is a zero (0) amplitude.

The resulting signal is delivered to a low pass filter 550 whose cut-off frequency is controlled by the value U delivered by Fractional Number generator 500, as described above.

The resulting signal is delivered to the sample selector 580. The sample selector receives the value N on one port and the signal from low pass filter 550 on another port, and it generates a sequence of sample values in response to these inputs. The sample selector is adapted to pick every N:th sample out of the signal received from the low pass filter 550. The resulting signal $S_{RED2}$ has a sample rate of $f_{SR}2=U/N*f_{SR1}$, where $f_{SR1}$ is the sample rate of a signal $S_{RED}$ received on port 480. The resulting signal $S_{RED2}$ is delivered on output port 590.

Hence, the sampling frequency $f_{SR2}$ for the output data values R(q) is lower than input sampling frequency $f_{SR1}$ by a factor D. D can be set to an arbitrary number larger than 1, and it may be a fractional number. According to preferred embodiments the factor D is settable to values between 1.0 to 20.0. In a preferred embodiment the factor D is a fractional number settable to a value between about 1.3 and about 3.0. The factor D may be obtained by setting the integers U and N to suitable values. The factor D equals N divided by U:

$$D=N/U$$

According to an embodiment of the invention the integers U and N are settable to large integers in order to enable the factor D=N/U to follow speed variations with a minimum of inaccuracy. Selection of variables U and N to be integers larger than 1000 renders an advantageously high accuracy in adapting the output sample frequency to tracking changes in the rotational speed of the monitored shaft. So, for example, setting N to 500 and U to 1001 renders D=2, 002.

The variable D is set to a suitable value at the beginning of a measurement and that value is associated with a certain speed of rotation of a rotating part to be monitored. Thereafter, during the condition monitoring session, the fractional value D is automatically adjusted in response to the speed of rotation of the rotating part to be monitored so that the signal outputted on port 590 provides a substantially constant number of sample values per revolution of the monitored rotating part.

As mentioned above, the encoder 420 may deliver a full revolution marker signal once per full revolution of the shaft 8. Such a full revolution marker signal may be in the form of an electric pulse having an edge that can be accurately detected and indicative of a certain rotational position of the monitored shaft 8. The full revolution marker signal, which may be referred to as an index pulse, can be produced on an output of the encoder 420 in response to detection of a zero angle pattern on an encoding disc that rotates when the monitored shaft rotates. This can be achieved in several ways, as is well known to the person skilled in this art. The encoding disc may e.g. be provided with a zero angle pattern which will produce a zero angle signal with each revolution of the disc. The speed variations may be detected e.g. by registering a "full revolution marker" in the memory 604 each time the monitored shaft passes the certain rotational position, and by associating the "full revolution marker" with a sample value s(j) received at the same instant. In this manner the memory 604 will store a larger number of samples between two consecutive full revolution markers when the shaft rotates slower, since the A/D converter delivers a constant number of samples $f_S$ per second.

Figure 20:
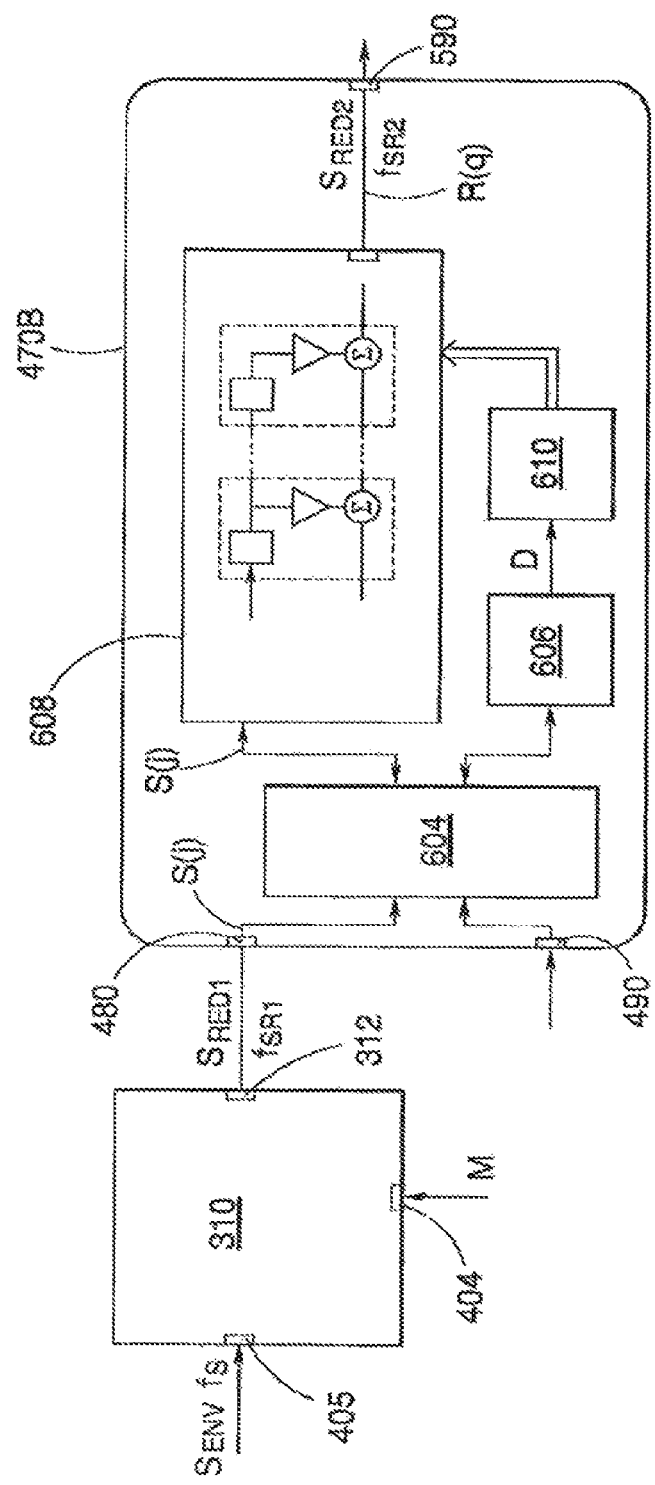
FIG. 20 is a block diagram of decimator and yet another embodiment of fractional decimator.

FIG. 20 is a block diagram of decimator 310 and yet another embodiment of fractional decimator 470. This fractional decimator embodiment is denoted 470B. Fractional decimator 470B may include a memory 604 adapted to receive and store the data values S(j) as well as information indicative of the corresponding speed of rotation $f_{ROT}$ of the monitored rotating part. Hence the memory 604 may store each data value S(j) so that it is associated with a value indicative of the speed of rotation $f_{ROT}(i)$ of the monitored shaft at time of detection of the sensor signal $S_{EA}$ value corresponding to the data value S(j). The provision of data values S(j) associated with corresponding speed of rotation values $f_{ROT}(j)$ is described with reference to FIGS. 19A-19G above.

Fractional decimator 470B receives the signal $S_{RED1}$, having a sampling frequency $f_{SR1}$, as a sequence of data values S(j), and it delivers an output signal $S_{RED2}$, having a sampling frequency $f_{SR2}$, as another sequence of data values R(q) on its output 590.

Fractional decimator 470B may include a memory 604 adapted to receive and store the data values S(J) as well as information indicative of the corresponding speed of rotation $f_{ROT}$ of the monitored rotating part. Memory 604 may store data values S(j) in blocks so that each block is associated with a value indicative of a relevant speed of rotation of the monitored shaft, as described below in connection with FIG. 21.

Fractional decimator 470B may also include a fractional decimation variable generator 606, which is adapted to generate a fractional value D. The fractional value D may be a floating number. Hence, the fractional number can be controlled to a floating number value in response to a received speed value $f_{ROT}$ so that the floating number value is indicative of the speed value $f_{ROT}$ with a certain inaccuracy. When implemented by a suitably programmed DSP, as mentioned above, the inaccuracy of floating number value may depend on the ability of the DSP to generate floating number values.

Moreover, fractional decimator 470B may also include a FIR filter 608. The FIR filter 608 is a low pass FIR filter having a certain low pass cut off frequency adapted for decimation by a factor $D_{MAX}$. The factor $D_{MAX}$ may be set to a suitable value, e.g. 20,000. Moreover, fractional decimator 470B may also include a filter parameter generator 610.

Operation of fractional decimator 470B is described with reference to FIGS. 21 and 22 below.

Figure 21:
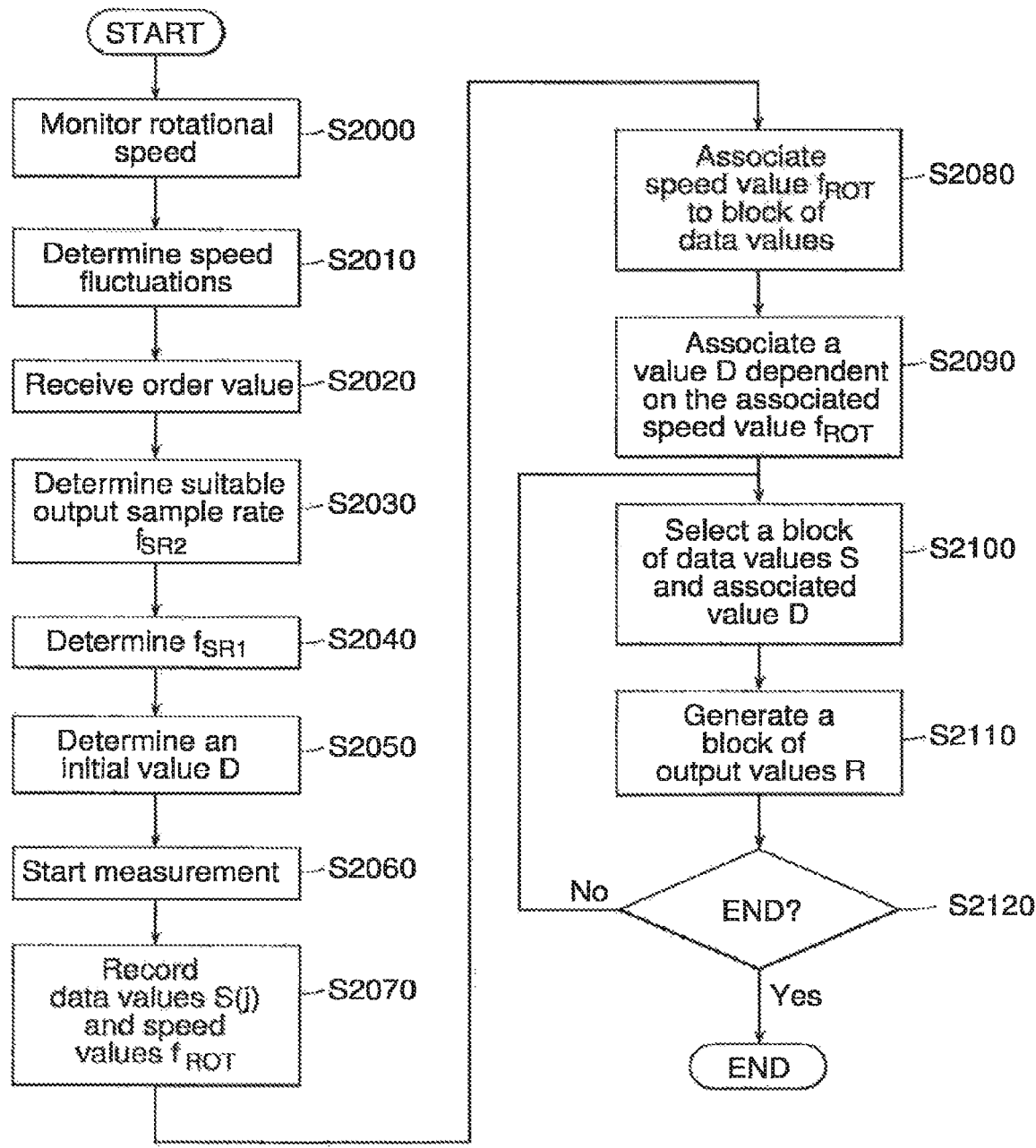
FIG. 21 is a flow chart illustrating an embodiment of a method of operating the decimator and the fractional decimator of FIG. 20.

FIG. 21 is a flow chart illustrating an embodiment of a method of operating the decimator 310 and the fractional decimator 470B of FIG. 20.

In a first step S2000, the speed of rotation $F_{ROT}$ of the part to be condition monitored is recorded in memory 604 (FIGS. 20 & 21), and this may be done at substantially the same time as measurement of vibrations or shock pulses begin. According to another embodiment the speed of rotation of the part to be condition monitored is surveyed for a period of time. The highest detected speed $F_{ROTmax}$ and the lowest detected speed $F_{ROTmin}$ may be recorded, e.g. in memory 604 (FIGS. 20 & 21).

In step S2010, the recorded speed values are analysed, for the purpose of establishing whether the speed of rotation varies. If the speed is determined to be constant, the selector 460 (FIG. 16) may be automatically set in the position to deliver the signal $S_{RED}$ having sample frequency $f_{SR1}$ to the input 315 of enhancer 320, and fractional decimator 470, 470B may be disabled. If the speed is determined to be variable, the fractional decimator 470, 470B may be automatically enabled and the selector 460 is automatically set in the position to deliver the signal $S_{RED2}$ having sample frequency $f_{SR2}$ to the input 315 of enhancer 320.

In step S2020, the user interface 102,106 displays the recorded speed value $f_{ROT}$ or speed values $f_{ROTmin}$, $f_{ROTmax}$, and requests a user to enter a desired order value $O_V$. As mentioned above, the shaft rotation frequency $f_{ROT}$ is often referred to as "order 1". The interesting signals may occur about ten times per shaft revolution (Order 10). Moreover, it may be interesting to analyse overtones of some signals, so it may be interesting to measure up to order 100, or order 500, or even higher. Hence, a user may enter an order number $O_V$ using user interface 102.

In step S2030, a suitable output sample rate $f_{SR2}$ is determined. According to an embodiment output sample rate $f_{SR2}$ is set to $f_{SR2} = C \cdot O_V \cdot f_{ROTmin}$ wherein C is a constant having a value higher than 2.0

$O_V$ is a number indicative of the relation between the speed of rotation of the monitored part and the repetition frequency of the signal to be analysed.

$f_{ROTmin}$ is a lowest speed of rotation of the monitored part to expected during a forthcoming measurement session. According to an embodiment the value $f_{ROTmin}$ is a lowest speed of rotation detected in step S2020, as described above.

The constant C may be selected to a value of 2.00 (two) or higher in view of the sampling theorem. According to embodiments of the invention the Constant C may be preset to a value between 2.40 and 2.70.

wherein k is a factor having a value higher than 2.0

Accordingly the factor k may be selected to a value higher than 2.0. According to an embodiment the factor C is advantageously selected such that $100 \cdot C/2$ renders an integer. According to an embodiment the factor C may be set to 2.56. Selecting C to 2.56 renders $100 \cdot C = 256 = 2$ raised to 8.

In step S2040, the integer value M is selected dependent on the detected speed of rotation $f_{ROT}$ of the part to be monitored. The value of M may be automatically selected dependent on the detected speed of rotation of the part to be monitored such that the intermediate reduced sampling frequency $f_{SR1}$ will be higher than the desired output signal sampling frequency $f_{SR2}$. The value of the reduced sampling frequency $f_{SR1}$ is also selected depending on how much of a variation of rotational speed there is expected to be during the measuring session. According to an embodiment the sample rate $f_S$ of the A/D converter may be 102.4 kHz. According to an embodiment, the integer value M may be settable to a value between 100 and 512 so as to render intermediate reduced sampling frequency $f_{SR1}$ values between 1024 Hz and 100 Hz.

In step S2050, a fractional decimation variable value D is determined. When the speed of rotation of the part to be condition monitored varies, the fractional decimation variable value D will vary in dependence on momentary detected speed value.

According to another embodiment of steps S2040 and S2050, the integer value M is set such that intermediate reduced sampling frequency $f_{SR1}$ is at least as many percent higher than $f_{SR2}$ (as determined in step S2030 above) as the relation between highest detected speed value $f_{ROTmax}$ divided by the lowest detected speed value $f_{ROTmin}$. According to this embodiment, a maximum fractional decimation variable value DMAX is set to a value of $D_{MAX} = f_{ROTmax} / f_{ROTmin}$, and a minimum fractional decimation variable value DMIN is set to 1.0. Thereafter a momentary real time measurement of the actual speed value fROT is made and a momentary fractional value D is set accordingly.

$f_{ROT}$ is value indicative of a measured speed of rotation of the rotating part to be monitored In step S2060, the actual measurement is started, and a desired total duration of the measurement may be determined. This duration may be determined in dependence on the degree of attenuation of stochastic signals needed in the enhancer. Hence, the desired total duration of the measurement may be set so that it corresponds to, or so that it exceeds, the duration needed for obtaining the input signal $I_{LENGTH}$, as discussed above in connection with FIGS. 10A to 13. As mentioned above in connection with FIGS. 10A to 13, a longer input signal $I_{LENGTH}$ renders the effect of better attenuation of stochastic signals in relation to the repetitive signal patterns in the output signal.

The total duration of the measurement may also be determined in dependence on a desired number of revolutions of the monitored part.

When measurement is started, decimator 310 receives the digital signal $S_{ENV}$ at a rate fs and it delivers a digital signal $S_{RED1}$ at a reduced rate $f_{SR1} = f_S / M$ to input 480 of the fractional decimator. In the following the signal $S_{RED1}$ is discussed in terms of a signal having sample values S(j), where j is an integer.

In step S2070, record data values S(i) in memory 604, and associate each data value with a speed of rotation value $f_{ROT}$. According to an embodiment of the invention the speed of rotation value $f_{ROT}$ is read and recorded at a rate $f_{RR} = 1000$ times per second. The read & record rate $f_{RR}$ may be set to other values, dependent on how much the speed $f_{ROT}$ of the monitored rotating part varies.

In a subsequent step S2080, analyze the recorded speed of rotation values, and divide the recorded data values S(j) into blocks of data dependent on the speed of rotation values. In this manner a number of blocks of block of data values S(j) may be generated, each block of data values S(j) being associated with a speed of rotation value. The speed of rotation value indicates the speed of rotation of the monitored part, when this particular block data values S(j) was recorded. The individual blocks of data may be of mutually different size, i.e. individual blocks may hold mutually different numbers of data values S(j).

If, for example, the monitored rotating part first rotated at a first speed $f_{ROT1}$ during a first time period, and it thereafter changed speed to rotate at a second speed $f_{ROT2}$ during a second, shorter, time period, the recorded data values S(j) may be divided into two blocks of data, the first block of data values being associated with the first speed value $f_{ROT1}$, and the second block of data values being associated with the second speed value $f_{ROT2}$. In this case the second block of data would contain fewer data values than the first block of data since the second time period was shorter.

According to an embodiment, when all the recorded data values S(j) have been divided into blocks, and all blocks have been associated with a speed of rotation value, then the method proceeds to execute step S2090.

In step S2090, select a first block of data values S(j), and determine a fractional decimation value D corresponding to the associated speed of rotation value $f_{ROT}$. Associate this fractional decimation value D with the first block of data values S(j).

According to an embodiment, when all blocks have been associated with a corresponding fractional decimation value D, then the method proceeds to execute step S2090. Hence, the value of the fractional decimation value D is adapted in dependence on the speed $f_{ROT}$.

In step S2100, select a block of data values S(j) and the associated fractional decimation value D, as described in step S2090 above.

In step S2110, generate a block of output values R in response to the selected block of input values S and the associated fractional decimation value D. This may be done as described with reference to FIG. 22.

In step S2120, Check if there is any remaining input data values to be processed. If there is another block of input data values to be processed, then repeat step S2100. If there is no remaining block of input data values to be processed then the measurement session is completed.

Figure 22A:
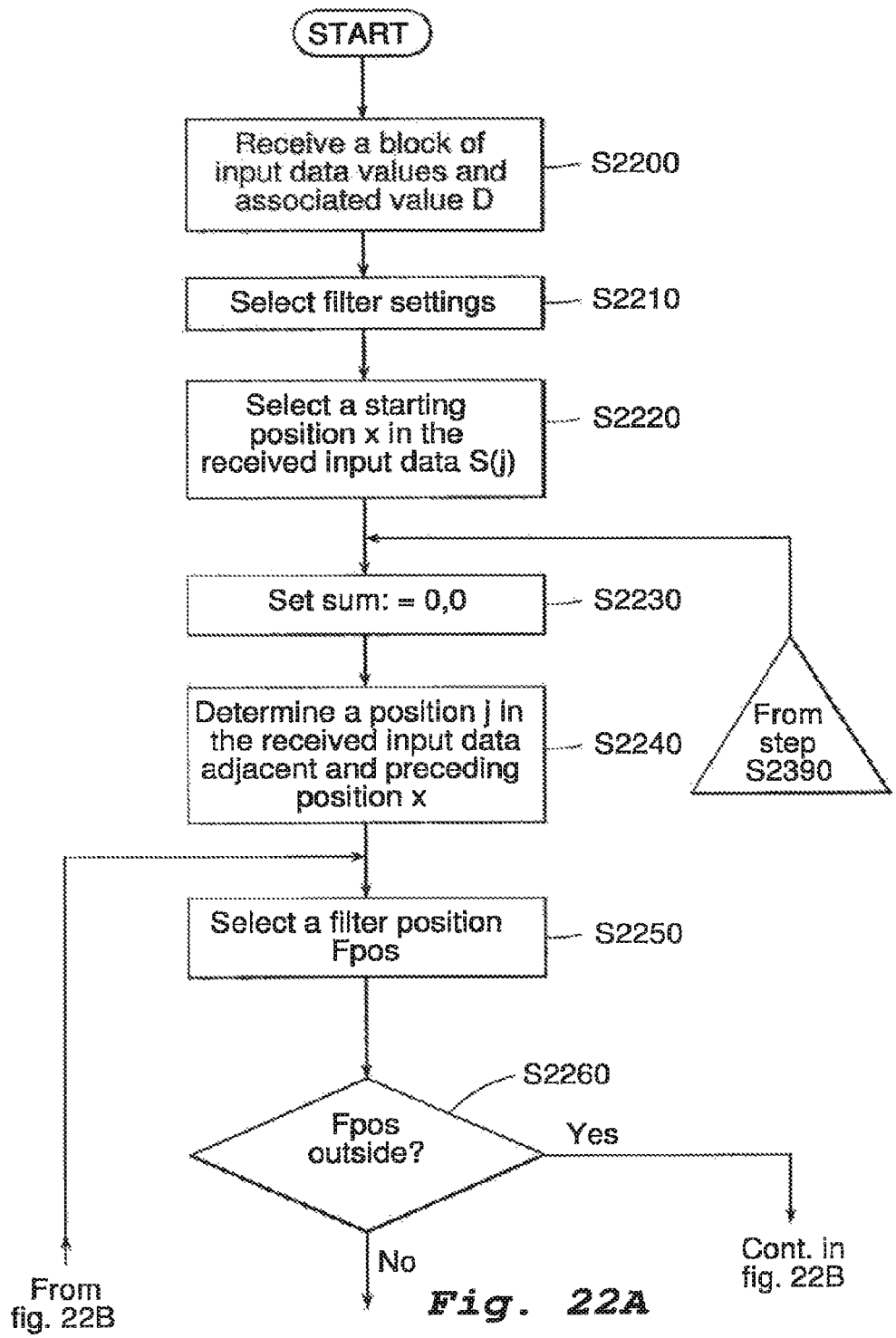
FIGS. 22A, 22B & 22C describe a method which may be implemented as a computer program.
Figure 22B:
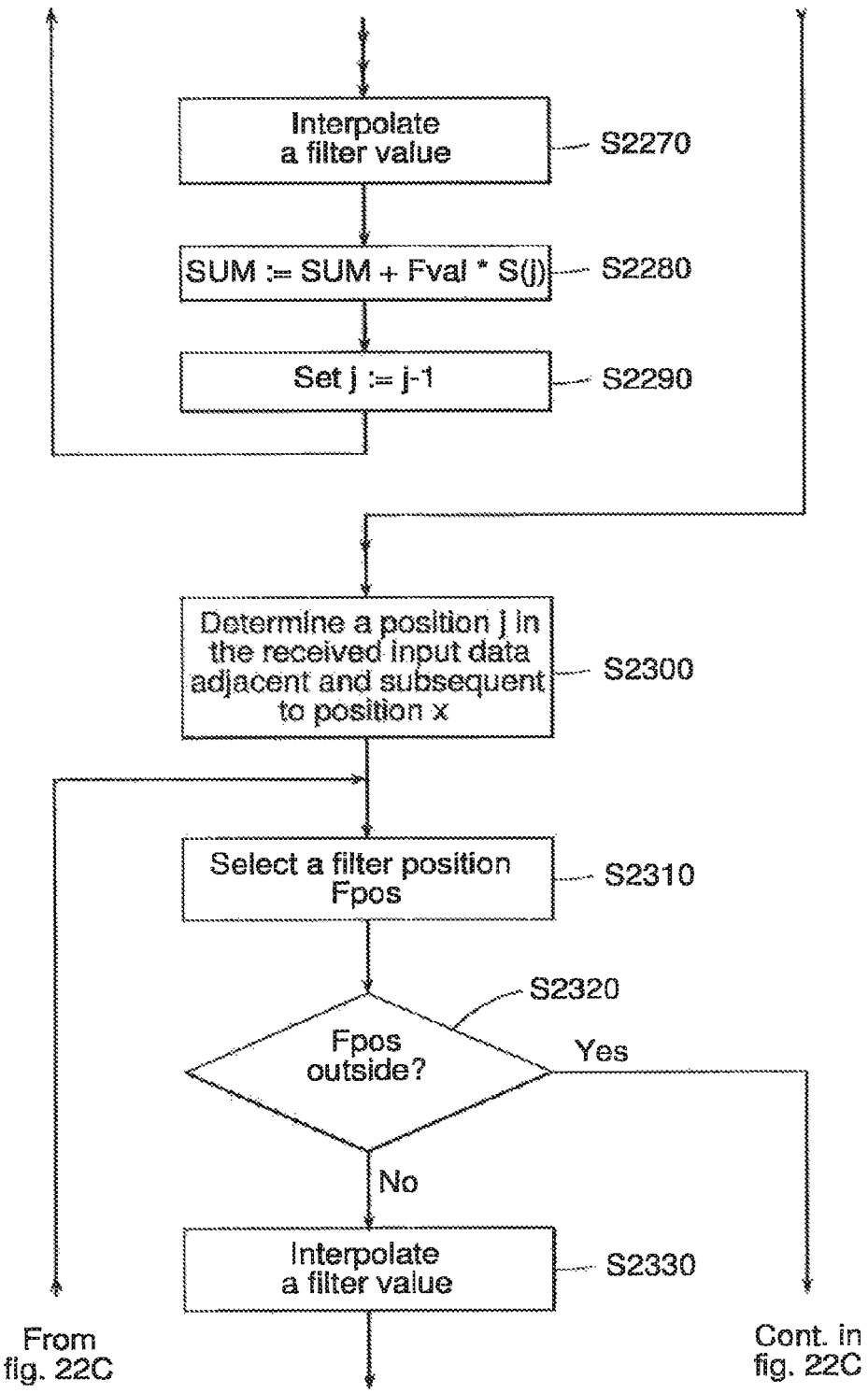
Figure 22C:
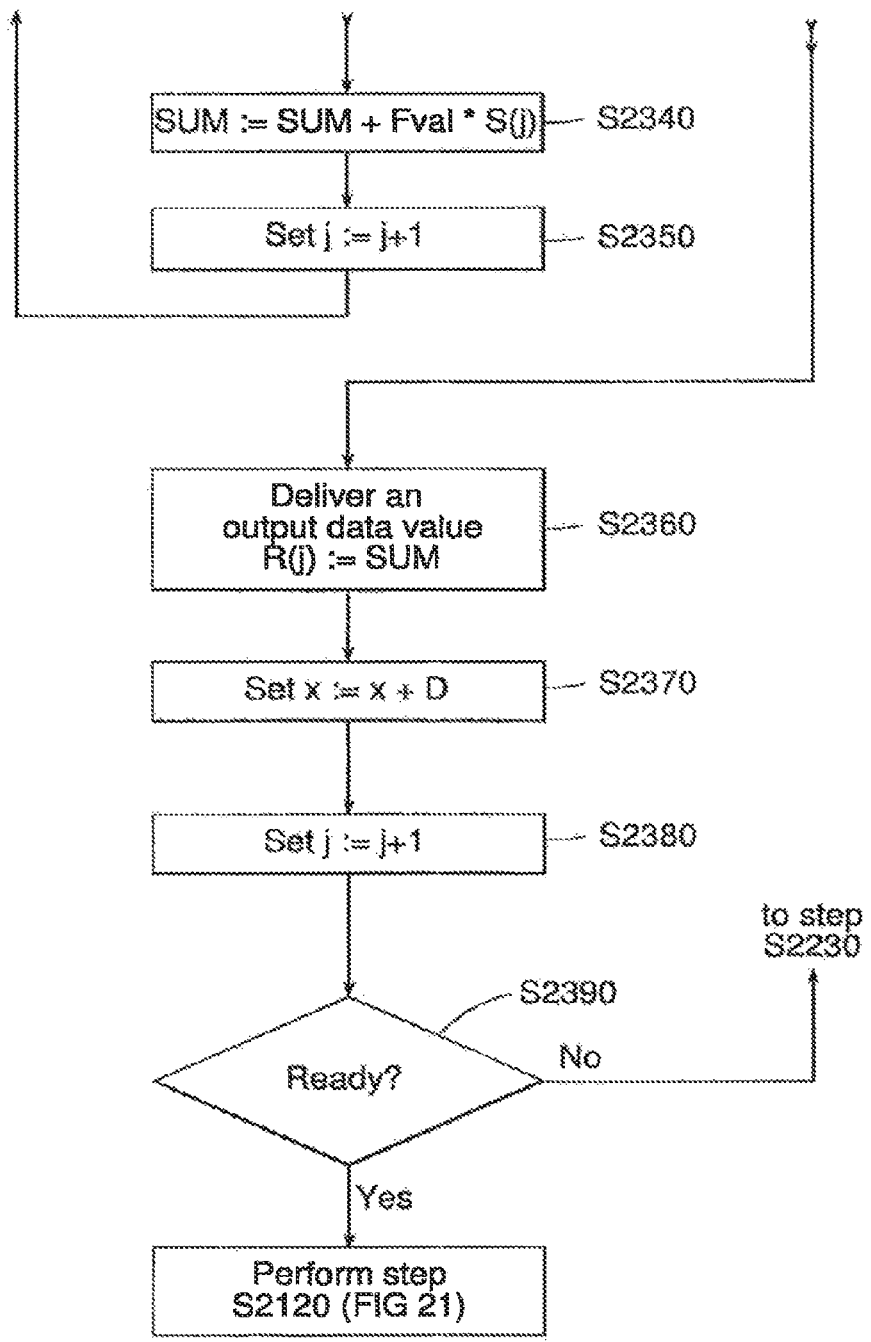

FIGS. 22A, 22B and 22C illustrate a flow chart of an embodiment of a method of operating the fractional decimator 470B of FIG. 20.

In a step S2200, receive a block of input data values S(j) and an associated specific fractional decimation value D. According to an embodiment, the received data is as described in step S2100 for FIG. 21 above. The input data values S(j) in the received block of input data values S are all associated with the specific fractional decimation value D.

In steps S2210 to S2390 the FIR-filter 608 is adapted for the specific fractional decimation value D as received in step S2200, and a set of corresponding output signal values R(q) are generated. This is described more specifically below.

In a step S2210, filter settings suitable for the specific fractional decimation value D are selected. As mentioned in connection with FIG. 20 above, the FIR filter 608 is a low pass FIR filter having a certain low pass cut off frequency adapted for decimation by a factor $D_{MAX}$. The factor $D_{MAX}$ may be set to a suitable value, e.g. 20.

A filter ratio value FR is set to a value dependent on factor $D_{MAX}$ and the specific fractional decimation value Das received in step S2200. Step S2210 may be performed by filter parameter generator 610 (FIG. 20).

In a step S2220, select a starting position value x in the received input data block s(j). It is to be noted that the starting position value x does not need to be an integer. The FIR filter 608 has a length $F_{LENGTH}$ and the starting position value x will then be selected in dependence of the filter length $F_{LENGTH}$ and the filter ratio value FR. The filter ratio value FR is as set in step S2210 above. According to an embodiment, the starting position value x may be set to $x:=F_{LENGTH}/F_R$.

In a step S2230 a filter sum value SUM is prepared, and set to an initial value, such as e.g. SUM:=0.0

In a step S2240 a position j in the received input data adjacent and preceding position x is selected. The position j may be selected as the integer portion of x.

In a step S2250 select a position Fpos in the FIR filter that corresponds to the selected position j in the received input data. The position Fpos may be a fractional number. The filter position Fpos, in relation to the middle position of the filter, may be determined to be $Fpos=[(x-j)*F_R]$ wherein $F_R$ is the filter ratio value.

In step S2260, check if the determined filter position value Fpos is outside of allowable limit values, i.e. points at a position outside of the filter. If that happens, then proceed with step S2300 below. Otherwise proceed with step S2270.

In a step S2270, a filter value is calculated by means of interpolation. It is noted that adjacent filter coefficient values in a FIR low pass filter generally have similar numerical values. Hence, an interpolation value will be advantageously accurate.

First an integer position value IFpos is calculated:

IFpos:=Integer portion of $F$pos

The filter value Fval for the position Fpos will be:

$Fval=A(IFpos)+[A(IFpos+1)-A(IFpos)]*[Fpos-Ifpos]$ wherein A(IFpos) and A(IFpos+1) are values in a reference filter, and the filter position Fpos is a position between these values.

In a step S2280, calculate an update of the filter sum value SUM in response to signal position j:

SUM:=SUM+$F$val*$S(J)$

In a step S2290 move to another signal position:

Setj:=$j-1$

Thereafter, go to step S2250.

In a step 2300, a position j in the received input data adjacent and subsequent to position x is selected. This position j may be selected as the integer portion of x. plus I (one), i.e j:=1+Integer portion of x In a step S2310 select a position in the FIR filter that corresponds to the selected position j in the received input data. The position Fpos may be a fractional number. The filter position Fpos, in relation to the middle position of the filter, may be determined to be $Fpos=[(j-x)*F_R]$ wherein $F_R$ is the filter ratio value.

In step S2320, check if the determined filter position value Fpos is outside of allowable limit values, i.e. points at a position outside of the filter. If that happens, then proceed with step S2360 below. Otherwise proceed with step S2330.

In a step S2330, a filter value is calculated by means of interpolation. It is noted that adjacent filter coefficient values in a FIR low pass filter generally have similar numerical values. Hence, an interpolation value will be advantageously accurate.

First an integer position value IFpos is calculated:

$$IFpos := \text{Integer portion of } Fpos$$

The filter value for the position Fpos will be:

$$Fval(Fpos) = A(IFpos) + [A(IFpos+1) - A(IFpos)] * [Fpos - Ifpos]$$

wherein A(IFpos) and A(IFpos+1) are values in a reference filter, and the filter position Fpos is a position between these values.

In a step S2340, calculate an update of the filter sum value SUM in response to signal position j:

$$SUM := SUM + Fval * S(J)$$

In a step S2350 move to another signal position:

$$Set j := j+1$$

Thereafter, go to step S2310.

In a step S2360, deliver an output data value R(j). The output data value R(j) may be delivered to a memory so that consecutive output data values are stored in consecutive memory positions. The numerical value of output data value R(j) is:

$$R(j) := SUM$$

In a step S2370, update position value x:

$$x := x + D$$

In a step S2380, update position value j $$j := j+1$$

In a step S2390, check if desired number of output data values have been generated. If the desired number of output data values have not been generated, then go to step S2230. If the desired number of output data values have been generated, then go to step S2120 in the method described in relation to FIG. 21.

In effect, step S2390 is designed to ensure that a block of output signal values R(q), corresponding to the block of input data values S received in step S2200, is generated, and that when output signal values R corresponding to the input data values S have been generated, then step S2120 in FIG. 21 should be executed.

The method described with reference to FIG. 22 may be implemented as a computer program subroutine, and the steps S2100 and S2110 may be implemented as a mam program.

Monitoring Condition of Gear Systems

It should be noted that embodiments of the invention may also be used to survey, monitor and detect the condition of gear systems. Some embodiments provide particularly advantageous effects when monitoring epicyclic gear systems comprising epicyclic transmissions, gears and/or gear boxes. This will be described more in detail below. Epicyclic transmissions, gears and/or gear boxes may also be referred to as planetary transmissions, gears and/or gear boxes.

Figure 23:
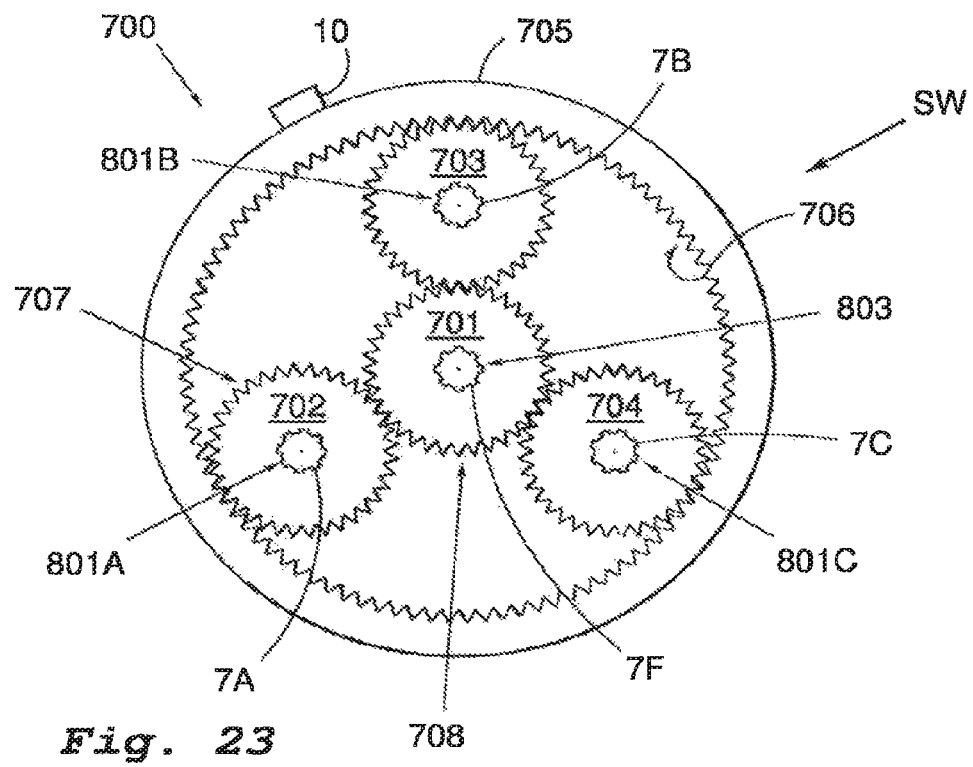
FIG. 23 is a front view illustrating an epicyclic gear system.

FIG. 23 is a front view illustrating an epicyclic gear system 700. The epicyclic gear system 700 comprises at least one or more outer gears 702, 703, 704 revolving around a central gear 701. The outer gears 702, 703, 704 are commonly referred to as planet gears, and the central gear 701 is commonly referred to as a sun gear. The epicyclic gear system 700 may also incorporate the use of an outer ring gear 705, commonly also referred to as an annulus. The planet gears 702, 703, 704 may comprise P number of teeth 707, the sun gear 701 may comprise S number of teeth 708, and the annulus 705 may comprise A number of teeth 706. The A number of teeth on the annulus 705 are arranged to mesh with the P number of teeth on the planet gears 702, 703, 704, which in turn are also arranged to mesh with the S number of teeth on the sun gear 701. It should however be noted that the sun gear 701 is normally larger than the planet gears 702, 703, 704, whereby the illustration shown in FIG. 23 should not be construed as limiting in this respect. When there are different sizes on the sun gear 701 and the planet gears 702, 703, 704, the analysis apparatus 14 may also distinguish between detected conditions of different shafts and gears of the epicyclic gear system 700, as will become apparent from the following.

In many epicyclic gear systems, one of these three basic components, that is, the sun gear 701, the planet gears 702, 703, 704 or the annulus 705, is held stationary. One of the two remaining components may then serve as an input and provide power to the epicyclic gear system 700. The last remaining component may then serve as an output and receive power from the epicyclic gear system 700. The ratio of input rotation to output rotation is dependent upon the number of teeth in each gear, and upon which component is held stationary.

Figure 24:
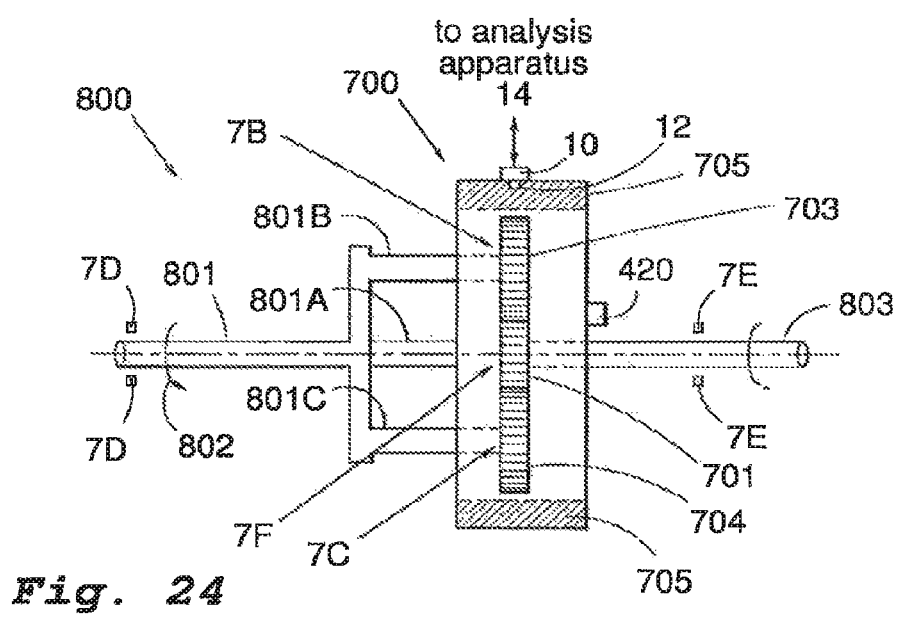
FIG. 24 is a schematic side view of the epicyclic gear system 700 of FIG. 23, as seen in the direction of the arrow SW in FIG. 23.

FIG. 24 is a schematic side view of the epicyclic gear system 700 of FIG. 23, as seen in the direction of the arrow SW in FIG. 23. An exemplary arrangement 800, including the epicyclic gear system 700, may comprise at least one sensor 10 and at least one analysis apparatus 14 according to the invention as described above. The arrangement 800 may, for example, be used as gear box for wind turbines.

In an embodiment of the arrangement 800, the annulus 705 is held fixed. A rotatable shaft 801 has plural movable arms or carriers 801A, 801B, 801C arranged to engage the planet gears 702, 703, 704. Upon providing an input rotation 802 to the rotatable shaft 801, the rotatable shaft 801 and the movable arms 801A, 801B, 801C and the planet gears 702, 703, 704 may serve as an input and provide power to the epicyclic gear system 700. The rotatable shaft 801 and the planet gears 702, 703, 704 may then rotate relative to the sun gear 701. The sun gear 701, which may be mounted on a rotary shaft 803, may thus serve as an output and receive power from the epicyclic gear system 700. This configuration will produce an increase in gear ratio $$G = 1 + \frac{A}{S}.$$

As an example, the gear ratio G when used as a gear box in a wind turbine may be arranged such that the output rotation is about 5-6 times the input rotation. The planet gears 702, 703, 704 may be mounted, via bearings 7A, 7B and 7C, respectively, on the movable arms or carriers 801A, 801B and 801C (as shown in both FIGS. 23-24). The rotatable shaft 801 may be mounted in bearings 7D. Similarly, the rotary shaft 803 may be mounted in bearings 7E, and the sun gear 701 may be mounted, via bearings 7F, on the rotary shaft 803.

According to one embodiment of the invention, the at least one sensor 10 may be attached on or at a measuring point 12 of the fixed annulus 705 of the epicyclic gear system 700. The sensor 10 may also be arranged to communicate with the analysis apparatus 14. The analysis apparatus 14 may be arranged to analyse the condition of the epicyclic gear system 700 on the basis of measurement data or signal values delivered by the sensor 10 as described above in this document. The analysis apparatus 14 may include an evaluator 230 as above.

Figure 25:
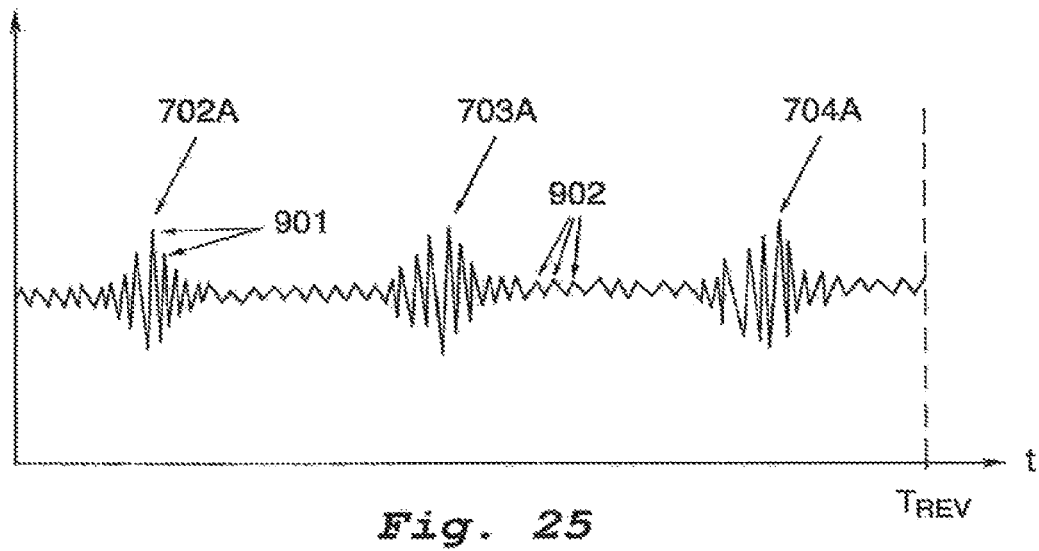
FIG. 25 illustrates an analogue version of an exemplary signal produced by and outputted by the pre-processor 200 (see FIG. 5 or FIG. 16) in response to signals detected by the at least one sensor 10 upon rotation of the epicyclic gear system.

FIG. 25 illustrates an analogue version of an exemplary signal produced by and outputted by the pre-processor 200 (see FIG. 5 or FIG. 16) in response to signals detected by the at least one sensor 10 upon rotation of the epicyclic gear system 700 in the arrangement 800. The signal is shown for a duration of $T_{REV}$, which represents signal values detected during one revolution of the rotatable shaft 801. It is to be understood that the signal delivered by the pre-processor 200 on port 260 (see FIG. 5 and FIG. 16) may be delivered to input 220 of the evaluator 230 (see FIG. 8 or FIG. 7).

As can be seen from the signal in FIG. 25, the amplitude or signal output of the signal increases as each of the planet gears 702, 703, 704 passes the measuring point 12 of the sensor 10 in the arrangement 800. These portions of the signal are referred to in the following as the high amplitude regions 702A, 703A, 704A, which may comprise high amplitude spikes 901. It can also be shown that the total amount of spikes 901, 902 in the signal over one revolution of the rotatable shaft 801, i.e. during the time period $T_{REV}$, directly correlates to the amount of teeth on the annulus 705. For example, if number of teeth on the annulus 705 is A=73, the total number of spikes in the signal during a time period $T_{REV}$ will be 73; or if number of teeth on the annulus 705 is A=75, the total number of spikes in the signal during a time period $T_{REV}$ will be 75, etc. This has been shown to be true provided that there are no errors or faults in the gears 702, 703, 704, 705 of the arrangement 800.

Figure 26:
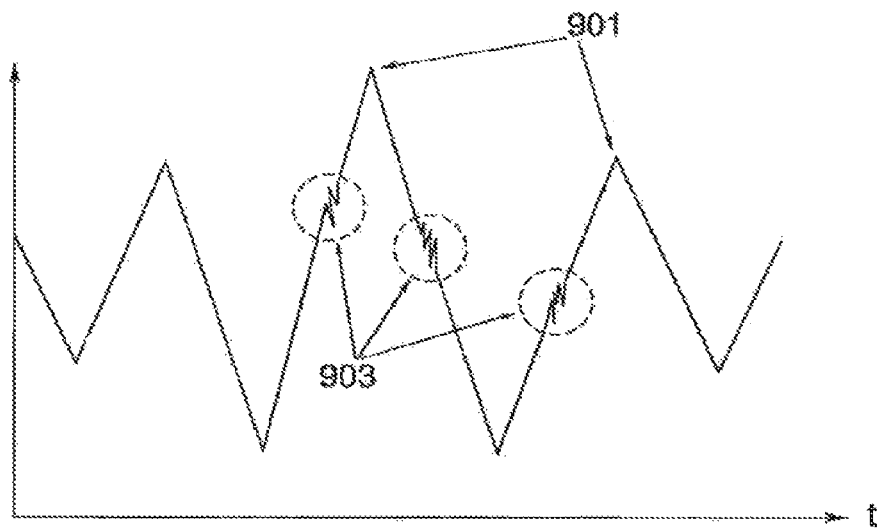
FIG. 26 illustrates an example of a portion of the high amplitude region 702A of the signal shown in FIG. 25.

FIG. 26 illustrates an example of a portion of the high amplitude region 702A of the signal shown in FIG. 25. This signal portion may be generated when the planet gear 702 passes its mechanically nearest position to the measuring point 12 and the sensor 10 (see FIGS. 23-24). It has been noted that small periodic disturbances or vibrations 903, which are illustrated in FIG. 26, may sometimes occur. Here, the small periodic disturbances 903 have been linked to the occurrence of errors, faults or tears in the bearings 7A, as shown in FIGS. 23-24, which may be mounted to one of the movable arms 801A. The small periodic disturbances 903 may thus propagate (or translate) from a bearing 7A through the planet gear 702 of the epicyclic gear system 700, to the annulus 705 where the small periodic disturbances 903 may be picked up by the sensor 10 as described above e.g. in connection with FIGS. 1-24. Similarly, errors, faults or tears in the bearings 7B or 7C mounted to one of the movable arms 801B or 801C may also generate such small periodic disturbances 903 which in the same manner as above may be picked up by the sensor 10. It should also be noted that the small periodic disturbances 903 may also emanate from errors, faults or tears in the bearings 7F which may be mounted to the rotary shaft 803. The detection of these small periodic disturbances in the signal may be indicative of the bearings 7A, 7B, 7C and/or 7F beginning to deteriorate, or indicative of their being on the limit of their active lifespan. This may, for example, be important since it may help predict when the epicyclic gear system 700 and/or the arrangement 800 are in need of maintenance or replacement.

According to an embodiment of the invention, the condition analyser 290 in the evaluator 230 of the analysis apparatus 14 may be arranged to detect these small periodic disturbances 903 in the received signal from the sensor 10. This is made possible by the previously described embodiments of the invention. The small periodic disturbances 903 may also be referred to as shock pulses 903 or vibrations 903. According to an embodiment of the invention, the analysis apparatus 14 employing an enhancer 320 as described above enables the detection of these shock pulses 903 or vibrations 903 originating from bearings 7A (or 7B, 7C or 7F) using a sensor 10 mounted on the annulus 705 as described above. Although the mechanical shock pulse or vibration signal as picked up by the sensor 10 attached to annulus 705 may be weak, the provision of an enhancer 320 as described above makes it possible to monitor the condition of bearings 7A (or 7B, 7C or 7F) even though the mechanical shock pulse or vibration signal has propagated via one or several of the planet gears 702, 703 or 704.

As previously mentioned and shown in FIGS. 7-9, the condition analyser 290 may be arranged to perform suitable analysis by operating on a signal in the time domain, or a signal in the frequency domain. However, the detection of the small periodic disturbances 903 in the received signal from the sensor 10 is most fittingly described in frequency domain, as shown in FIG. 27.

Figure 27:
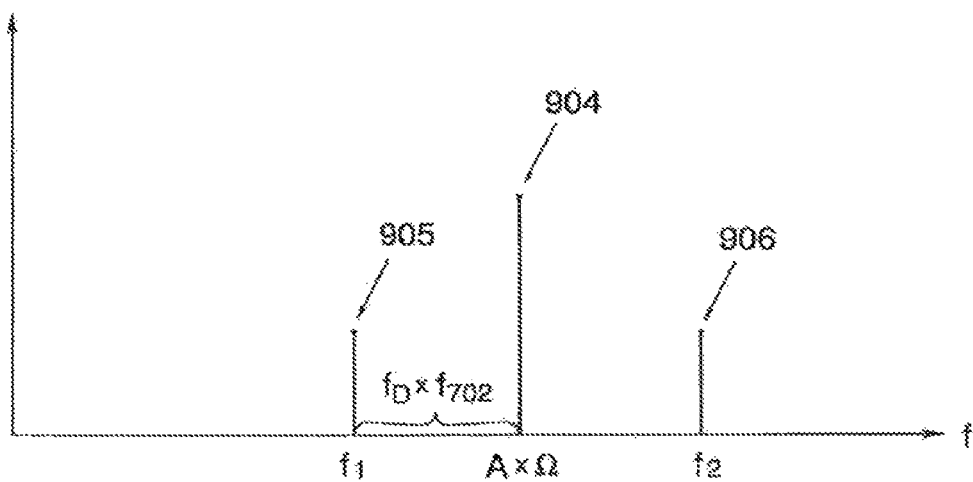
FIG. 27 illustrates an exemplary frequency spectrum of a signal comprising a small periodic disturbance 903 as illustrated in FIG. 26.

FIG. 27 illustrates an exemplary frequency spectrum of a signal comprising a small periodic disturbance 903 as illustrated in FIG. 26. The frequency spectrum of the signal comprises a peak 904 at a frequency which is directly correlated with the engagement or meshing of the teeth of the planet gears 702, 703, 704 and the annulus 705. In fact, the frequency of the peak 904 in the frequency spectrum will be located at A×Ω, where A is the total number of teeth of the annulus 705, and Ω is the number of revolutions per second by the rotatable shaft 801, when rotation 802 occurs at a constant speed of rotation.

In addition to the peak 904 in the frequency spectrum, the small periodic disturbance 903 as illustrated in FIG. 26 may generate peaks 905, 906 at the frequencies $f_1$, f2 centered about the peak 904 in the frequency spectrum. The peaks 905, 906 at the frequencies $f_1$, f2 may thus also be referred to as a symmetrical sideband about the centre peak 904. According to an exemplary embodiment of the invention, the condition analyser 290 may be arranged to detect the one or several peaks in the frequency spectrum, and thus be arranged to detect small periodic disturbances in the signal received from the sensor 10. It can also be shown that the peaks 905, 906 at the frequencies $f_1$, f2 relate to the centre peak 904 according to the equations Eq.1-2:

$$f_1 = (A \times \Omega) - (f_D \times f_{702}) \qquad \text{(Eq. 1)}$$

$$f_2 = (A \times \Omega) - (f_D \times f_{702}) \qquad \text{(Eq. 2)}$$

wherein

A is the total number of teeth of the annulus 705;

Ω is the number of revolutions per second by the rotatable shaft 801;

and $f_D$ is a repetition frequency of the repetitive signal signature which may be indicative of a deteriorated condition; and $f_{702}$ is the number of revolutions per second by the planet 702 around its own centre.

The repetition frequency $f_D$ of the repetitive signal signature is indicative of the one of the rotating parts which is the origin of the repetitive signal signature. The repetition frequency $f_D$ of the repetitive signal signature can also be used to distinguish between different types of deteriorated conditions, as discussed above e.g. in connection with FIG. 8. Accordingly, a detected repetition frequency $f_D$ of the repetitive signal signature may be indicative of a Fundamental train frequency (FTF), a Ball spin (BS) frequency, an Outer Race (OR) frequency, or an Inner Race (IR) frequency relating to a bearing 7A, 7B, 7C or 7F in the epicyclic gear system 700 in the arrangement 800 in FIG. 24.

Hence, as described above, a data signal representing mechanical vibrations emanating from rotation of one or several shafts, such as, rotatable shaft 801 and/or rotary shaft 803 (see FIGS. 23-24), may include several repetitive signal signatures, and a certain signal signature may thus be repeated a certain number of times per revolution of one of the monitored shafts. Moreover, several mutually different repetitive signal signatures may occur, wherein the mutually different repetitive signal signatures may have mutually different repetition frequencies. The method for enhancing repetitive signal signatures in signals, as described above, advantageously enables simultaneous detection of many repetitive signal signatures having mutually different repetition frequencies. This advantageously enables the simultaneous monitoring of several bearings 7A, 7B, 7C, 7F associated with different shafts 801, 803 using a single detector 10. The simultaneous monitoring may also use the fact that the size of the sun gear 701 and the planet gears 702, 703, 704 normally are of different sizes, which further may enable an easy detection of which of the bearings 7A, 7B, 7C, 7F in FIGS. 23-24 it is that is generating the small periodic disturbance 903, and thus which of the bearings 7A, 7B, 7C, 7F in FIGS. 23-24 may be in need of maintenance or replacement. The method for enhancing repetitive signal signatures in signals, as described above, also advantageously makes it possible to distinguish between e.g. a Bearing Inner Race damage signature and a Bearing Outer Race damage signature in a single measuring and analysis session.

The relevant value for Ω representing the speed of rotation of the planet gears 702, 703, 704, can be indicated by a sensor 420 (see FIG. 24). The sensor 420 may be adapted to generate a signal indicative of rotation of the shaft 803 in relation to the annulus 705, and from this signal the relevant value for Ω can be calculated when the number of teeth of the annulus 705, the planet gears 702, 703, 704 and the sun gear 701 are known.

Figure 28:
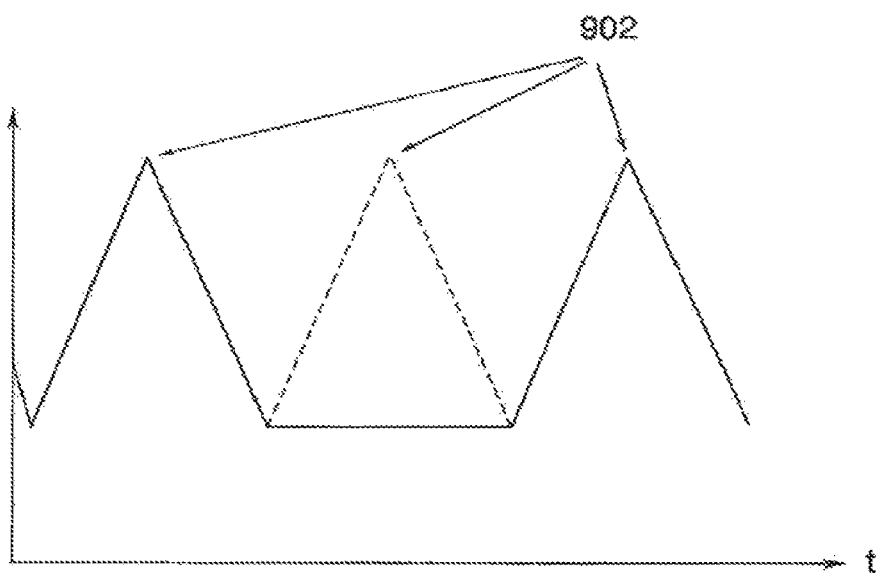
FIG. 28 illustrates an example of a portion of the exemplary signal shown in FIG. 25.

FIG. 28 illustrates an example of a portion of the exemplary signal shown in FIG. 25. This exemplary portion demonstrates another example of an error or fault which the condition analyser 290 also may be arranged to detect in a similar manner as described above. If a tooth in the one or several of the gears 701, 702, 703, 704, 705 should break or be substantially worn down, the condition analyser 290 may be arranged detect that a tooth is broken or worn down since this will also generate a periodic disturbance, i.e. due to the lack of tooth engagement or meshing of the missing or worn down tooth. This may be detectable by the condition analyser 290 in, for example, the frequency spectrum of the signal received from the sensor 10. It should also be noted that this type of error or fault may be detected by the condition analyser 290 in any type of gear and/or gear system. The frequency of this type of teeth engagement error, or meshing error, in a gear and/or gear system is often located at significantly higher frequency than, for example, the frequencies $f_1$, $f2$ in FIG. 27.

Figure 29:
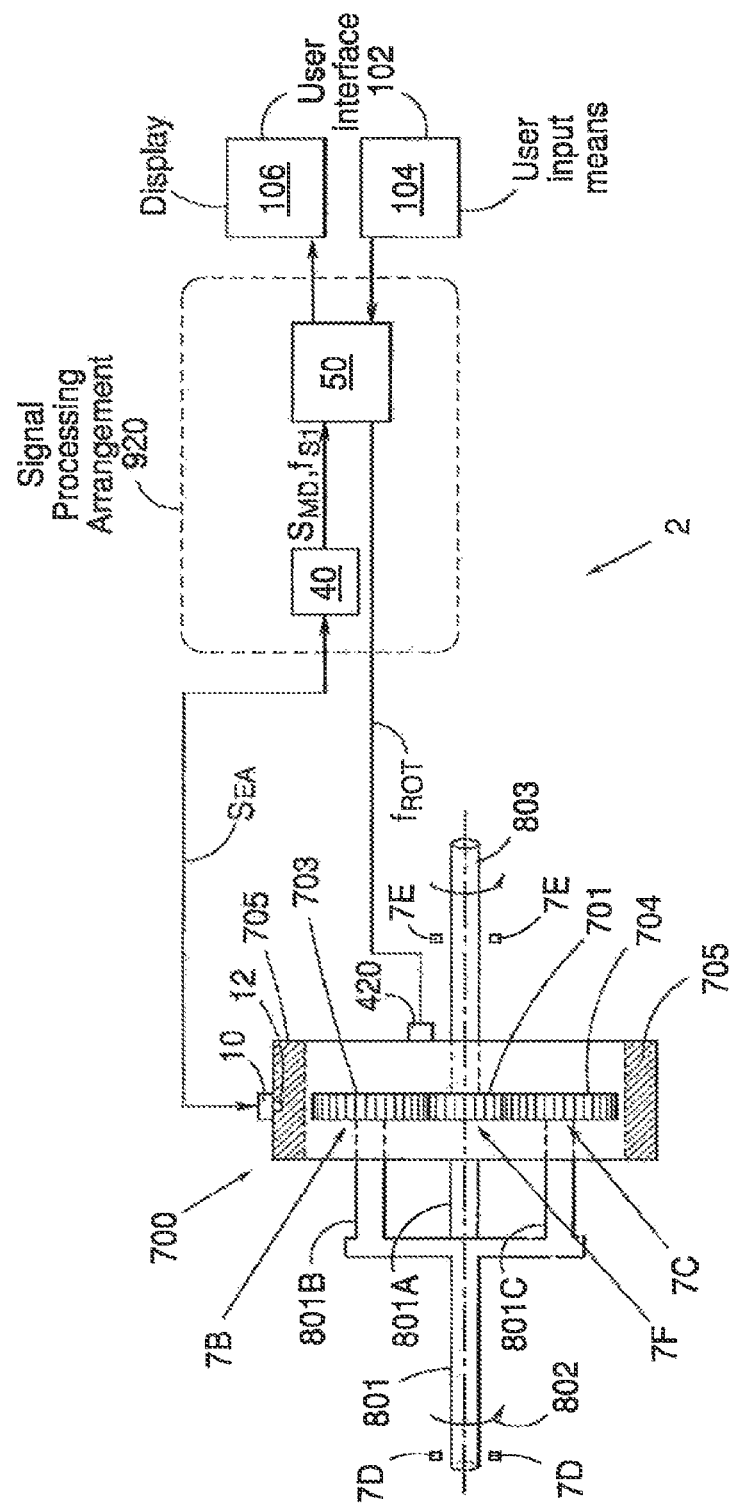
FIG. 29 illustrates yet an embodiment of a condition analyzing system according to an embodiment of the invention.

FIG. 29 illustrates yet an embodiment of a condition analyzing system 2 according to an embodiment of the invention. The sensor 10 is physically associated with a machine 6 which may include a gear system 700 having plural rotational parts (See FIG. 1 & FIG. 29). The gear system of FIG. 29 may be the epicyclic gear system 700 of FIG. 24. The epicyclic gear system 700 may, for example, be used as gear box for wind turbines.

The sensor unit 10 may be a Shock Pulse Measurement Sensor adapted to produce an analogue signal $S_{EA}$ including a vibration signal component dependent on a vibrational movement of a rotationally movable part in the gear system 700. The sensor 10 is delivers the analogue signal $S_{EA}$ to a signal processing arrangement 920.

Signal processing arrangement 920 may include a sensor interface 40 and a data processing means 50. The sensor interface 40 includes an A/D converter 44 (FIG. 2A, FIG. 2B) generating the digital measurement signal $S_{MD}$. The A/D converter 44 is coupled to the data processing means 50 so as to deliver the digital measurement data signal $S_{MD}$ to the data processing means 50.

The data processing means 50 is coupled to a user interface 102. The user interface 102 may include user input means 104 enabling a user to provide user input. Such user input may include selection of a desired analysis function 105, 290, 290T, 290F (FIG. 4, FIG. 7, FIG. 8), and/or settings for signal processing functions 94, 250, 310, 470, 470A, 470B, 320, 294 (See FIG. 4, FIG. 30).

The user interface 102 may also include a display unit 106, as described e.g. in connection with FIG. 2A an FIG. 5.

FIG. 30 is a block diagram illustrating the parts of the signal processing arrangement 920 of FIG. 29 together with the user interface 102, 104 and the display 106.

The sensor interface 40 comprises an input 42 for receiving an analogue signal $S_{EA}$ from a sensor 10, and an A/D converter 44. A signal conditioner 43 (FIG. 2B) may optionally also be provided. The sensor may be a Shock Pulse Measurement Sensor. The A/D converter 44 samples the received analogue signal with a certain sampling frequency $f_S$ so as to deliver a digital measurement data signal $S_{MD}$ having said certain sampling frequency $f_S$.

The sampling frequency $f_S$ may be set to $$f_S = k \cdot f_{SEAmax}$$

wherein k is a factor having a value higher than 2.0

Accordingly the factor k may be selected to a value higher than 2.0. Preferably factor k may be selected to a value between 2.0 and 2.9 in order to avoid aliasing effects. Selecting factor k to a value higher than 2.2 provides a safety margin in respect of aliasing effects, as mentioned above in this document. Factor k may be selected to a value between 2.2 and 2.9 so as to provide said safety margin while avoiding to generate unnecessarily many sample values. According to an embodiment the factor k is advantageously selected such that 100*k/2 renders an integer. According to an embodiment the factor k may be set to 2.56. Selecting k to 2.56 renders 100*k=256=2 raised to 8.

According to an embodiment the sampling frequency $f_S$ of the digital measurement data signal $S_{MD}$ may be fixed to a certain value $f_S$, such as e.g. $f_S$=102.4 kHz Hence, when the sampling frequency $f_S$ is fixed to a certain value $f_S$, the frequency $f_{SEAmax}$ of the analogue signal $S_{EA}$ will be:

$$f_{SEAmax} = f_S / k$$

wherein $f_{SEAmax}$ is the highest frequency to be analyzed in the sampled signal.

Hence, when the sampling frequency $f_S$ is fixed to a certain value $f_S$=102.4 kHz, and the factor k is set to 2.56, the maximum frequency $f_{SEAmax}$ of the analogue signal $S_{EA}$ will be:

$$f_{SEAmax} = f_S/k = 102\ 400/2{,}56 = 40\ \text{kHz}$$

The digital measurement data signal $S_{MD}$ having sampling frequency $f_S$ is received by a filter 240. According to an embodiment, the filter 240 is a high pass filter having a cut-off frequency $f_{LC}$. This embodiment simplifies the design by replacing the band-pass filter, described in connection with FIG. 6, with a high-pass filter 240. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RMU}$ is somewhere in the range from 30 kHz to 35 kHz, the high pass filter 240 may be designed to having a lower cutoff frequency $f_{LC}$=30 kHz. The high-pass filtered signal is then passed to the rectifier 270 and on to the low pass filter 280.

According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}$=20 kHz.

The output signal from the digital filter 240 is delivered to a digital enveloper 250.

Whereas prior art analogue devices for generating an envelope signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital filter 240 leads to a high signal amplitude. Moreover, the signal processing being performed in the digital domain eliminates addition of noise and eliminates addition of biasing errors.

According an embodiment of the invention the optional low pass filter 2801n enveloper 250 may be eliminated. In effect, the optional low pass filter 2801n enveloper 250 is eliminated since decimator 310 includes a low pass filter function. Hence, the enveloper 250 of FIG. 30 effectively comprises a digital rectifier 270, and the signal produced by the digital rectifier 270 is delivered to integer decimator 310, which includes low pass filtering.

The Integer decimator 310 is adapted to perform a decimation of the digitally enveloped signal $S_{ENV}$ so as to deliver a digital signal $S_{RED}$ having a reduced sample rate $f_{SR1}$ such that the output sample rate is reduced by an integer factor M as compared to the input sample rate $f_S$.

The value M may be settable in dependence on a detected speed of rotation $f_{ROT}$. The decimator 310 may be settable to make a selected decimation M:1, wherein M is a positive integer. The value M may be received on a port 404 of decimator 310. The integer decimation is advantageously performed in plural steps using Low pass Finite Impulse Response Filters, wherein each FIR Filter is settable to a desired degree of decimation. An advantage associated with performing the decimation in plural filters is that only the last filter will need to have a steep slope. A steep slope FIR filter inherently must have many taps, i.e. a steep FIR filter must be a long filter. The number of FIR taps, is an indication of 1) the amount of memory required to implement the filter,
2) the number of calculations required, and
3) the amount of "filtering" the filter can do; in effect, more taps means more stopband attenuation, less ripple, narrower filters, etc. Hence the shorter the filter the faster it can be executed by the DSP 50. The length of a FIR filter is also proportional to the degree of achievable decimation. Therefore, according to an embodiment of the integer decimator, the decimation is performed in more than two steps.

According to a preferred embodiment the integer decimation is performed in four steps: M1, M2, M3 & M4. The total decimation M equals M1*M2*M3*M4 This may achieved by providing a bank of different FIR filters, which may be combined in several combinations to achieve a desired total decimation M. According to an embodiment there are eight different FIR filters in the bank.

Advantageously, the maximum degree of decimation in the last, 4:th, step is five (M4=5), rendering a reasonably short filter having just 201 taps. In this manner the FIR filters in steps 1, 2 and 3 can be allowed to have an even lower number of taps. In fact this allows for the filters in steps 1, 2 and 3 to have 71 taps each or less. In order to achieve a total decimation of M=4000, it is possible to select the three FIR-filters providing decimation M1=10, M2=10 and M3=10, and the FIR filter providing decimation M4=4. This renders an output sample rate $f_{SR1}$=25.6, when $f_S$=102400 Hz. and a frequency range of 10 Hz. These four FIR filters will have a total of 414 taps, and yet the resulting stopband attenuation is very good. In fact, if the decimation of M=4000 were to be made in just one single step it would have required about 160 000 taps to achieve an equally good stop band attenuation.

Output 312 of integer Decimator 310 is coupled to the speed value generator 610 (See FIG. 30 in conjunction with FIG. 19B).

As illustrated by FIG. 30, the position indicator signal P, generated by the position signal generator 420, may be processed in parallel with the filtering 240, enveloping 250 and decimation 310 in a manner so as to substantially maintain an initial time relation between positive edges of the position indicator signal P and corresponding vibration sample values Se(i) and S(j). This parallel processing of the position indicator signal P originating from position signal generator 420 and the vibration sample values originating from the vibration signal sensor 10 advantageously ensures that any delay due to signal processing will affect the position indicator signal values P(i) and the corresponding vibration sample values Se(i) in a substantially equal degree. In effect, the apparatus 14, 920 is adapted to process the position indicator signal P so as to maintain an initial time relation between the position indicator signal values P(i) and corresponding vibration sample values Se(i) from the time of detection by the respective sensors 420 and 10, respectively, up to the time of delivery of the time sequence of measurement sample values Se(i) of said digital measurement data signal $S_{RED1}$ (See FIG. 30 in conjunction with FIG. 19C).

Hence, the speed value generator 610 may be adapted to receive vibration sample values Se(i) and corresponding position indicator signal values P(i) from the integer Decimator 310. As discussed in connection with FIGS. 19B and 19C, the speed value generator 601 is adapted to receive a sequence of measurement values Se(i) and a sequence of positional signals P(i), together with temporal relations there-between, and the speed value generator 601 is adapted to provide, on its output, a sequence of pairs SP of measurement values S(j) associated with corresponding speed values $f_{ROT}(j)$.

These pairs SP of measurement values S(j) and corresponding speed values $f_{ROT}(j)$ may be delivered to inputs of the fractional decimator 470, 470B, 94 as illustrated in FIG. 30.

The output 312 of integer Decimator 310 may also be coupled to an input of a selector 460. The selector enables a selection of the signal to be input to the enhancer 320.

When condition monitoring is made on a rotating part having a constant speed of rotation, the selector 460 may be set in the position to deliver the signal $S_{RED}$ having sample frequency $f_{SR1}$ to the input 315 of enhancer 320, and fractional decimator 470 may be disabled. When condition monitoring is made on a rotating part having a variable speed of rotation, the fractional decimator 470 may be enabled and the selector 460 is set in the position to deliver the signal $S_{RED2}$ having sample frequency $f_{RED2}$ to the input 315 of enhancer 320.

The fractional decimator 470 may be embodied by fractional decimator 470B, 94 including an adaptable FIR filter 608, as described in connection with FIGS. 20, 21 and 22 and FIG. 4.

The fractional decimator 470 is coupled to deliver a decimated signal $S_{RED2}$ having the lower sample rate $f_{SR2}$ to the selector 460, so that when the condition analyzer is set to monitor a machine with variable speed of rotation, the output from fractional decimator 470B is delivered to enhancer 320.

Enhancer 320, 94 may be embodied as described in connection with FIGS. 10A, 10B, 11, 12 and 13 and FIG. 4. The measuring signal input to the enhancer 320 is the signal $S_{RED}$ (See FIG. 30), which is also illustrated in FIG. 11 as having $I_{LENGTH}$ sample values. The signal $S_{RED}$ is also referred to as I and 2060 in the description of FIG. 11. The Enhancer signal processing involves discrete autocorrelation for the discrete input signal $S_{RED}$. According to an embodiment the enhancer operates in the time domain so as to achieve discrete autocorrelation for the discrete input signal $S_{RED}$. Hence, according to that embodiment, the enhancer signal processing does not include Fourier transformation nor does it include any Fast Fourier Transform. The output signal O, also referred to as $S_{MDP}$, is illustrated in FIGS. 12 and 13.

The measurement signal $S_{RED}$, $S_{RED1}$, to be input to the enhancer, may include at least one vibration signal component SD dependent on a vibration movement of said rotationally movable part; wherein said vibration signal component has a repetition frequency $f_D$ which depends on the speed of rotation $f_{ROT}$ of said first part. The repetition frequency $f_D$ of signal component SD may be proportional to the speed of rotation $f_{ROT}$ of the monitored rotating part.

Two different damage signatures SD1, SD2 may have different frequencies fd1, fd2 and still be enhanced, i.e. SNR-improved, by the enhancer. Hence, the enhancer 320 is advantageously adapted to enhance different signatures $S_{D1}$ and $S_{D2}$ having mutually different repetition frequencies $f_{D1}$ and $f_{D2}$. Both of the repetition frequencies $f_{D1}$ and $f_{D2}$ are proportional to the speed of rotation $f_{ROT}$ of the monitored rotating part, while $f_{D1}$ is different from $f_{D2}$ ($f_{D1}$<>$f_{D1}$). This may be expressed mathematically in the following manner:

$$fD1 = k1 * f_{ROT}, \text{ and}$$

$$fD2 = k2 * f_{ROT}, \text{ wherein}$$

k1 and k2 are positive real values, and k1<>k2, and k1 greater than or equal to one (1), and k2 greater than or equal to one (1)

The enhancer delivers an output signal sequence to an input of time domain analyzer 290T, so that when a user selects, via user interface 102,104 to perform a time domain analysis, the time domain analyzer 290T, 105 (FIG. 30 & FIG. 4) will execute the selected function 105 and deliver relevant data to the display 106. An advantage with the enhancer 320 is that it delivers the output signal in the time domain. Hence, condition monitoring functions 105, 290T requiring an input signal in the time domain can be set to operate directly on the signal values of the signal output illustrated in FIGS. 12 and 13.

When a user selects, via user interface 102,104 to perform a frequency domain analysis, the enhancer will deliver the output signal sequence to Fast Fourier Transformer 294, and the FFTransformer will deliver the resulting frequency domain data to the frequency domain analyzer 290F, 105 (FIG. 30 & FIG. 4). The frequency domain analyzer 290F, 105 will execute the selected function 105 and deliver relevant data to the display 106.

Figure 31:
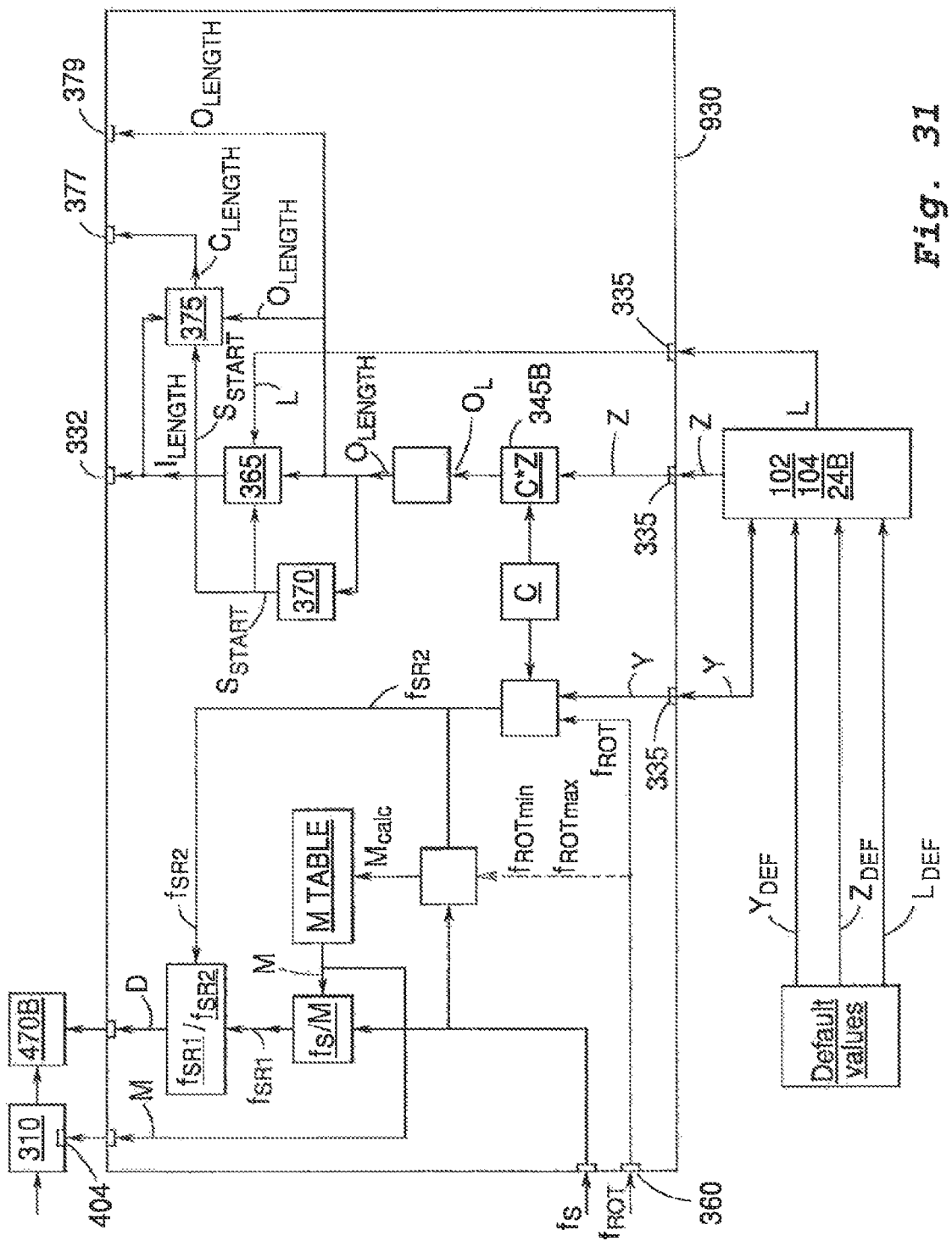
FIG. 31 is a schematic illustration of a parameter controller.

In the embodiment shown in FIGS. 29 and 30, it is advantageously easy for a user to do perform an analysis employing the enhancer and the fractional decimator. As illustrated in FIG. 30, the user interface 102, 104, 24B cooperates with a parameter controller 930 adapted to provide settings for the arrangement 920. FIG. 31 is a schematic illustration of the parameter controller 930.

The below is an example of parameter settings:

In order to perform an analysis in the frequency domain the user may input the following data via user interface 102,104 24B:

1) Information indicative of the highest repetition frequency $f_D$ of interest. The repetition frequency $f_D$ is repetition frequency a signature SD of interest. This information may be input in the form of a frequency or in the form an order number $O_{VHigh}$ indicative of the highest repetition frequency of damage signature SD of interest.

2) Information indicative of the desired improvement of the SNR value for repetitive signal signature SD. This information may be input in the form the SNR Improver value L. The SNR Improver value L is also discussed below, and in connection with FIG. 10A above.

3) Information indicative of the desired frequency resolution in the FFT 294, when it is desired to perform an FFT of the signal output from enhancer. This may be set as value Z frequency bins. According to an embodiment of the invention, the frequency resolution Z is settable by selecting one value Z from a group of values. The group of selectable values for the frequency resolution Z may include

Z=400

Z=800

Z=1600

Z=3200

Z=6400

Hence, although the signal processing is quite complex, the arrangement 920 has been designed to provide an advantageously simple user interface in terms of information required by the user. When the user inputs or selects values for the above three parameters, all the other values are automatically set or preset in the arrangement 920.

The SNR Improver Value L

The signal to be input to the enhancer may include a vibration signal component dependent on a vibration movement of the rotationally movable part; wherein said vibration signal component has a repetition frequency $f_D$ which depends on the speed of rotation $f_{ROT}$ of said first part; said measurement signal including noise as well as said vibration signal component so that said measurement signal has a first signal-to-noise ratio in respect of said vibration signal component. The enhancer produces an output signal sequence (O) having repetitive signal components corresponding to said at least one vibration signal component so that said output signal sequence (O) has a second signal-to-noise ratio value in respect of said vibration signal component. The inventor has established by measurements that the second signal-to-noise ratio value is significantly higher than the first signal-to-noise ratio when the SNR Improver value L is set to value one (1).

Moreover, the inventor has established by measurements that when the SNR Improver value L is increased to L=4, then the resulting SNR value in respect of said vibration signal component in the output signal is doubled as compared to the SNR value associated with L=1. Increasing the SNR Improver value L to L=10 appears to render an improvement of the associated SNR value by a factor 3 for the vibration signal component in the output signal, as compared to the SNR value for same input signal when L=1. Hence, when increasing SNR Improver value L from $L_1=1$ to $L_2$ the resulting SNR value may increase by the square root of $L_2$.

Additionally the user may input a setting to have the arrangement 920 keep repeating the measurement. The user may set it to repeat the measurement with a certain repetition period $T_{PM}$, i.e. to always start a new measurement when the time $T_{PM}$ has passed. $T_{PM}$ may be set to be a one week, or one hour or ten minutes. The value to select for this repetition frequency depends on the relevant measuring conditions.

Since the enhancer method requires a lot of data input values, i.e. the number of input sample values may be high, and it is suited for measuring on slowly rotating parts, the duration of the measurement will sometimes be quite long. Hence there is a risk that the user settings for the frequency of repetition of measurements is incompatible with the duration of measurements. Therefore, one of the steps performed by the arrangement 920, immediately after receiving the above user input, is to calculate an estimate of the expected duration of measurements $T_M$.

The duration $T_M$ is:

$$T_M = I_{Length}/f_{SR2},$$

Wherein $I_{Length}$ is the number of samples in the signal to be input into the enhancer in order to achieve measurements according to selected user settings as defined below, and $f_{SR2}$ is as defined below.

The arrangement 920 is also adapted to compare the duration of measurements $T_M$ with the repetition period value $T_{PM}$ as selected by the user. If the repetition period value $T_{PM}$ is shorter or about the same as the expected duration of measurements $T_M$, a parameter controller 930 is adapted to provide a warning indication via the user interface 102, 106 e.g. by a suitable text on the display. The warning may also include a sound, or a blinking light.

According to an embodiment the arrangement 920 is adapted to calculate a suggested minimum value for the repetition period value $T_{PM}$ is dependence on the calculated estimate of duration of measurements $T_M$.

Based on the above user settings, the parameter controller 930 of signal processing arrangement 920 is capable of setting all the parameters for the signal processing functions 94 (FIG. 4), i.e. integer decimator settings and enhancer settings.

Moreover the parameter controller 930 is capable of setting all the parameters for the fractional decimator when needed. The parameter controller 930 is capable of setting the parameter for the FFT 294 when a frequency analysis is desired.

The following parameter may be preset in the arrangement 920 (FIG. 30):

Sample frequency $f_S$ of A/D converter 40, 44.

The following parameter may be measured: $f_{ROT}$

As mentioned above, the parameter value $f_{ROT}$ may be measured and stored in association with the corresponding sample values of the signal $S_{RED1}$ whose sample values are fed into the fractional decimator 470B.

The following parameters may be automatically set in the arrangement 920:

Sample rate in the signal output from enhancer 320:

$$f_{SR2} = C \cdot O_V \cdot f_{ROT}$$

wherein

C is a constant of value higher than 2.0

$O_V$ is the order number input by the user, or calculated in response to a highest frequency value to be monitored as selected by the user $f_{ROT}$ is the momentary measured rotational speed of the rotating part during the actual condition monitoring;

M=The integer decimator value for use in decimator 310 is selected from a table including a set of predetermined values for the total integer decimation. In order to select the most suitable value M, the parameter controller 930 (FIG. 30) first calculates a fairly close value $$M\_calc = f_S / f_{SR2} \cdot f_{ROTmin}/f_{ROTmax}$$

wherein $f_S$ & $f_{SR2}$ are defined above, and $f_{ROTmin}/f_{ROTmax}$ is a value indicative of the relation between lowest and highest speed of rotation to be allowed during the measurement. Based on the value M_calc the selector then choses a suitable value M from a list of preset values. This may e.g be done by selecting the closest value M which is lower than M_calc from the table mentioned above.

$f_{SR1}$=the sample rate to be delivered from the integer decimator 310. $f_{SR1}$ is set to $$f_{SR1} = f_S/M$$

D is the fractional decimator value for fractional decimator. D may be set to D=fsr1/fsr2, wherein fsr1 and fsr2 are as defined above.

$$O_{LENGTH} = C \cdot z$$

wherein

C is a constant of value higher than 2.0, such as e.g. 2.56 as mentioned above Z is the selected number of frequency bins, i.e. information indicative of the desired frequency resolution in the FFT 294, when it is desired to perform an FFT of the signal output from enhancer.

$S_{START} = O_{LENGTH}$ or a value higher than $O_{LENGTH}$, wherein $O_{LENGTH}$ is as defined immediately above.

$$I_{Length} = O_{LENGTH} \cdot L + S_{START} + O_{LENGTH}$$

$$C_{Length} = I_{LENGTH} - S_{START} - O_{LENGTH}$$

$S_{MDP}(t)$=the values of the samples of the output signal, as defined in equation (5) (See FIG. 10A).

Hence, the parameter controller 930 is adapted to generate the corresponding setting values as defined above, and to deliver them to the relevant signal processing functions 94 (FIG. 30 & FIG. 4).

Once an output signal has been generated by enhancer 320, the condition analyser 290 can be controlled to perform a selected condition analysis function 105, 290, 290T, 290F by means of a selection signal delivered on a control input 300 (FIG. 30). The selection signal delivered on control input 300 may be generated by means of user interaction with the user interface 102 (See FIGS. 2A & 30). When the selected analysis function includes Fast Fourier Transform, the analyzer 290F will be set by the selection signal 300 to operate on an input signal in the frequency domain.

The FFTransformer 294 may be adapted to perform Fast Fourier Transform on a received input signal having a certain number of sample values. It is advantageous when the certain number of sample values is set to an even integer which may be divided by two (2) without rendering a fractional number.

According to an advantageous embodiment of the invention, the number of samples $O_{LENGTH}$ in the output signal from the enhancer is set in dependence on the frequency resolution Z. The relation between frequency resolution Z and the number of samples $O_{LENGTH}$ in the output signal from the enhancer is:

$$O\text{LENGTH}=k*z$$

Wherein $O_{LENGTH}$ is the samples number of sample values in the signal delivered from the enhancer 320.

k is a factor having a value higher than 2.0

Preferably factor k may be selected to a value between 2.0 and 2.9 in order to provide a good safety margin while avoiding to generate unnecessarily many sample values.

According to an embodiment the factor k is advantageously selected such that 100*k/2 renders an integer. This selection renders values for $O_{LENGTH}$ that are adapted to be suitable as input into the FFTransformer 294. According to an embodiment the factor k may be set to 2.56. Selecting k to 2.56 renders 100*k=256=2 raised to 8.

Table A indicates examples of user selectable Frequency resolution values Z and corresponding values for $O_{LENGTH}$.

TABLE A

| k | Z | $O_{LENGTH}$ |
|---|---|---|
| 2.56 | 400 | 1024 |
| 2.56 | 800 | 2048 |
| 2.56 | 1600 | 4096 |
| 2.56 | 3200 | 8192 |
| 2.56 | 6400 | 16384 |
| 2.56 | 12800 | 32768 |
| 2.56 | 25600 | 65536 |
| 2.56 | 51200 | 131072 |

An embodiment of the invention relates to an apparatus for analysing the condition of a machine having a first part which is rotationally movable at a speed of rotation in relation to a second machine part; said apparatus including:

a sensor for monitoring said movable part so as to generate at least one analogue measurement signal including at least one vibration signal component dependent on a vibration movement of said rotationally movable part; wherein said vibration signal component has a repetition frequency ($f_D$) which depends on the speed of rotation ($f_{ROT}$) of said first part; said measurement signal including noise as well as said vibration signal component so that said measurement signal has a first signal-to-noise ratio value in respect of said vibration signal component;

an A/D-converter (40,44) for generating a digital measurement data sequence ($S_{MD}$) in response to said measurement signal; said digital measurement data sequence ($S_{MD}$) having a first sample rate ($f_S$);

a first digital filter (240) for performing digital filtering of the digital measurement data sequence ($S_{MD}$) so as to obtain a filtered measurement signal ($S_F$);

an envelopper for generating a first digital signal ($S_{ENV}$, $S_{MDP}$) in response to the filtered measurement signal ($S_F$);

a decimator for performing a decimation of the first digital signal ($S_{ENV}$, $S_{MDP}$) so as to achieve a decimated digital signal ($S_{RED}$) having a reduced sampling frequency ($f_{SR1}$, $f_{SR2}$);

said decimator (470, 470A, 470B) having a first input for receiving said first digital signal ($S_{ENV}$, $S_{MDP}$); and a second input for receiving a signal indicative of said variable speed of rotation ($f_{ROT}$);

a third input for receiving a signal indicative of an output sample rate setting signal;

said decimator (470, 470A, 470B) being adapted to generate said decimated digital signal ($S_{RED}$) in dependence on said first digital signal ($S_{MD}$, $S_{ENV}$), said signal indicative of said speed of rotation ($f_{ROT}$), and said signal indicative of an output sample rate setting signal; wherein said decimator (470, 470A, 470B) is adapted to generate said decimated digital signal ($S_{RED}$) such that the number of sample values per revolution of said rotating part is kept at a substantially constant value when said speed of rotation varies; and an enhancer (320) having an input for receiving said decimated digital signal ($S_{RED}$); said enhancer being adapted to produce an output signal sequence (O) having repetitive signal components corresponding to said at least one vibration signal component so that said output signal sequence (O) has a second signal-to-noise ratio value in respect of said vibration signal component; said second signal-to-noise ratio value being higher than said first signal-to-noise ratio value; and an analyzer (105; 290; 290T; 294, 290F) for indicating a machine condition dependent on said vibration movement of said rotationally movable part in response to said output signal sequence (O). This solution advantageously provides a very lean solution by minimizing the complexity of filters while achieving significant performance improvement.

Various embodiments are disclosed below.

An embodiment E1 comprises: A method for analysing the condition of a machine having a rotating part, comprising:

generating a position signal (P, $P_{(i)}$; $P_{(1)}$, $P_{(2)}$, $P_{(3)}$, Ep) indicative of a rotational position of said rotating part;

generating an analogue measurement signal ($S_{EA}$) dependent on mechanical vibrations emanating from rotation of said part;

sampling said analogue measurement signal ($S_{EA}$) so as to generate a digital measurement data signal ($S_{MD}$), having a sampling frequency ($f_S$, $f_{SR1}$), in response to said analogue measurement signal ($S_{EA}$);

performing a decimation of the digital measurement data signal ($S_{MD}$) so as to achieve a digital signal ($S_{RED1}$, $S_{RED2}$) having a reduced sampling frequency ($f_{SR2}$);

performing a condition analysis function (F1, F2, Fn) for analysing the condition of the machine dependent on said digital signal ($S_{RED1}$, $S_{RED2}$, O) having a reduced sampling frequency ($f_{SR1}$, $f_{SR2}$); wherein
said decimation includes
recording a time sequence of measurement sample values (Se(i), $S_{(j)}$) of said digital measurement data signal ($S_{RED1}$, $S_{MD}$) and
recording a time sequence of position signal values ($P_{(i)}$) of said position signal (Ep) such that there is
a first temporal relation ($n_{diff}$, $n_{diff1}$, $n_{diff2}$) between at least some of the recorded position signal values ($P_{(i)}$), and such that there is
a second temporal relation between at least one of the recorded position signal values ($P_{(i)}$) and at least one of the recorded measurement sample values (Se(i), $S_{(j)}$);
generating a value indicative of an acceleration (a, $a_{1-2}$, $a_{2-3}$) of said rotational part (8) in dependence of said first temporal relation ($n_{diff}$, $n_{diff1}$, $n_{diff2}$);
generating a speed value (VT1, VT2, $f_{ROT}$) indicative of a momentaly speed of rotation of said of said rotational part (8) in dependence of
said value indicative of an acceleration (a, $a_{1-2}$, $a_{2-3}$) and
a certain time value
such that the speed value (VT 1, VT2, $f_{ROT}$) is indicative of the rotational speed at the moment of detection of at least one of said recorded measurement sample values (Se(i), $S_{(j)}$; and wherein
said decimation is performed dependent on said speed value (VT1, VT2, $f_{ROT}$)

Embodiment E2

The method according to embodiment E1, wherein Said certain time value depends on said second temporal relation.

Embodiment E3

The method according to embodiment E1, wherein Said certain time value is said second temporal relation.

Embodiment E4

A method for analysing the condition of a machine having a rotating part, comprising:
generating a position signal (Ep) indicative of a rotational position of said rotating part;
generating an analogue measurement signal ($S_{EA}$) dependent on mechanical vibrations emanating from rotation of said part;
sampling said analogue measurement signal ($S_{EA}$) so as to generate a digital measurement data signal ($S_{MD}$), having a sampling frequency ($f_S$, $f_{SR1}$), in response to said analogue measurement signal ($S_{EA}$);
performing a decimation of the digital measurement data signal ($S_{MD}$) so as to achieve a digital signal ($S_{RED2}$) having a reduced sampling frequency ($f_{SR2}$);
performing a condition analysis function (F1, F2, Fn) for analysing the condition of the machine dependent on said digital signal ($S_{RED}$, $S_{RED2}$, O) having a reduced sampling frequency ($f_{SR1}$, $f_{SR2}$); wherein
wherein said decimation includes
recording a time sequence of measurement sample values (Se(i), $S_{(j)}$) of said digital measurement data signal ($S_{MD}$) and
recording a time sequence of position signal values ($P_{(i)}$) of said position signal (Ep) such that there is
a first temporal relation ($n_{diff}$, $n_{diff1}$, $n_{diff2}$) between at least some of the recorded position signal values ($P_{(i)}$), and such that there is
a second temporal relation between at least one of the recorded position signal values ($P_{(i)}$) and at least one of the recorded measurement sample values (Se(i), $S_{(j)}$);
generating a value indicative of a speed change ($df_{ROT}$, a, $a_{1-2}$, $a_{2-3}$) of said rotational part (8) in dependence of said first temporal relation ($n_{diff}$, $n_{diff1}$, $n_{diff2}$);
generating a speed value indicative of a momentary speed of rotation of said of said rotational part (8) in dependence of
said value indicative of a speed change ($df_{ROT}$, a, $a_{1-2}$, $a_{2-3}$) and
a certain time value
such that the speed value is indicative of the rotational speed at the moment of detection of at least one of said recorded measurement sample values (Se(i), $S_{(j)}$); and wherein
said decimation is performed dependent on said speed value (VT1, VT2, Embodiment E5

The method according to embodiment E4, wherein
Said certain time value depends on said second temporal relation.

Embodiment E6

The method according to embodiment E4, wherein Said certain time value is said second temporal relation.

Embodiment E7

The method according to any preceding embodiment E1 to E6, wherein the step of
recording a time sequence of position signal values ($P_{(i)}$) of said position signal (Ep) comprises the steps of:
recording a first position signal value ($P1_{(i)}$) of said position signal (Ep) and information indicative of the time of occurrence of said first position signal value ($P1_{(i)}$);
recording a second position signal value ($P2_{(i)}$) of said position signal (Ep) and information indicative of the time of occurrence of said second position signal value ($P2_{(i)}$);
the method further including the step of:
establishing a first speed value (VT1) indicative of a momentary speed of rotation of said of said rotational part (8) at a first moment in time between the occurrence of said first position signal value ($P1_{(i)}$) and the occurrence of said second position signal value ($P2_{(i)}$).

Embodiment E8

The method according to embodiment E7,
identifying a selected recorded measurement data value (S(j)), and
identifying the moment of detection (i, j) of said selected recorded measurement data value (Se(i), S(j));
establishing a value (delta-t) indicative of a first duration of time from said first moment to said moment of detection (i, j) of said selected recorded measurement data value (Se(i), S(j));

Establishing a second speed value (Vp30, Vp40, Vp50, Vp60, $f_{ROT}$) indicative of a momentary speed of rotation of said rotational part at said moment of detection (i, j) in dependence on
said first speed value (VT1), said first duration and information indicative of a speed change during said first duration.

Embodiment E9

The method according to embodiment E8, wherein
Said information indicative of a speed change during said first duration is said value indicative of an acceleration (a, $a_{1-2}$, $a_{2-3}$).

Embodiment E10

The method according to embodiment E8, wherein
Said information indicative of a speed change during said first duration is said value indicative of a speed change ($df_{ROT}$, a, $a_{1-2}$, $a_{2-3}$).

Embodiment E11

The method according to any preceding embodiment E1 to E10, wherein the step of performing a condition analysis function (F1, F2, Fn) includes
performing an autocorrelation of said digital signal ($S_{RED}$, $S_{RED2}$) having a reduced sampling frequency ($f_{SR1}$, $f_{SR2}$) so as to obtain an autocorrelated digital signal (O) having a reduced sampling frequency ($f_{SR2}$); and
performing analysis function (F1, F2, Fn, 290T) using the autocorrelated digital signal (O) as input to the condition analyser (290T).

Embodiment E12

The method according to any preceding embodiment E1 to E11, wherein the step of performing a condition analysis function (F1, F2, Fn) includes
performing an autocorrelation of said digital signal ($S_{RED}$, $S_{RED2}$) having a reduced sampling frequency ($f_{SR1}$, $f_{SR2}$) so as to obtain an autocorrelated digital signal (O) having a reduced sampling frequency ($f_{SR2}$); and
performing a fast fourier transform (294, 94), using the autocorrelated digital signal (O) as input to the fast fourier transformer (294, 94), so as to obtain an autocorrelated digital signal in the frequency domain; and
performing analysis function (F1, F2, Fn, 290F) using the autocorrelated digital signal in the frequency domain as input to the condition analyser (290F).

Embodiment E13

An apparatus for analysing the condition of a machine having a part rotating with a speed of rotation ($f_{ROT}$), comprising:
a first sensor (10) adapted to generate an analogue electric measurement signal ($S_{EA}$) dependent on mechanical vibrations ($V_{MD}$) emanating from rotation of said part;
an analogue-to-digital converter (40, 44) adapted to sample said analogue electric measurement signal ($S_{EA}$) at an initial sampling frequency ($f_S$) so as to generate a digital measurement data signal ($S_{MD}$, $S_{ENV}$) in response to said received analogue electric measurement signal ($S_{EA}$);
a device (420) for generating a position signal (Ep) having a sequence of position signal values ($P_{(i)}$) for indicating momentary rotational positions of said rotating part;
a first decimator (310) for performing a decimation of the digital measurement data signal ($S_{MD}$, $S_{ENV}$) so as to achieve a first digital signal ($S_{RED1}$) having a first reduced sampling frequency ($f_{SR1}$) such that the first reduced sampling frequency ($f_{SR1}$) is reduced by an integer factor (M) as compared to the initial sampling frequency ($f_S$);
a second decimator (470, 470B) for generating a second digital signal ($S_{RED2}$, R), having a second reduced sampling frequency ($f_{SR2}$), in response to said first digital signal ($S_{RED1}$), and
an evaluator (230; 290, 290T; 294, 290, 290F) for performing a condition analysis function (F1, F2, Fn) for analysing the condition of the machine dependent on said second digital signal ($SRE_{O2}$) having a reduced sampling frequency ($f_{SR1}$, $f_{SR2}$); wherein
a speed value generator is adapted for recording a time sequence of measurement sample values (Se(i), $S_{(j)}$) of said digital measurement data signal ($S_{MD}$) and
said speed value generator being adapted for recording a time sequence of said position signal values ($P_{(i)}$) of said position signal (Ep) such that there is
a first temporal relation ($n_{diff}$, $n_{diff1}$, $n_{diff2}$) between at least some of the recorded position signal values ($P_{(i)}$), and such that there is
a second temporal relation between at least one of the recorded position signal values ($P_{(i)}$) and at least one of the recorded measurement sample values (Se(i), $S_{(j)}$);
said speed value generator being adapted for generating a value indicative of an acceleration (a, $a_{1-2}$, $a_{2-3}$) of said rotational part (8) in dependence of said first temporal relation ($n_{diff}$, $n_{diff1}$, $n_{diff2}$);
said speed value generator being adapted for generating a speed value (VT1, VT2, $f_{ROT}$) indicative of a momentary speed of rotation of said of said rotational part (8) in dependence of
said value indicative of an acceleration (a, $a_{1-2}$, $a_{2-3}$) and
a certain time value
such that the speed value (VT1, VT2, $f_{ROT}$) is indicative of the rotational speed at the moment of detection of at least one of said recorded measurement sample values (Se(i), $S_{(j)}$); and wherein
said second decimator (470, 470B) is adapted to perform said decimation dependent on said speed value (VT1, VT2, $f_{ROT}$).

Embodiment E14

An apparatus for analysing the condition of a machine having a part rotating with a speed of rotation ($f_{ROT}$), comprising:
a first sensor (10) adapted to generate an analogue electric measurement signal ($S_{EA}$) dependent on mechanical vibrations ($V_{MD}$) emanating from rotation of said part;
an analogue-to-digital converter (40, 44) adapted to sample said analogue electric measurement signal ($S_{EA}$) at an initial sampling frequency ($f_S$) so as to generate a digital measurement data signal ($S_{MD}$, $S_{ENV}$) in response to said received analogue electric measurement signal ($S_{EA}$);
a device (420) for generating a position signal (Ep) having a sequence of position signal values ($P_{(i)}$) for indicating momentary rotational positions of said rotating part;
a first decimator (310) for performing a decimation of the digital measurement data signal ($S_{MD}$, SENO so as to achieve a first digital signal ($S_{RED1}$) having a first reduced sampling frequency ($f_{SR1}$) such that the first reduced sampling frequency ($f_{SR1}$) is reduced by an integer factor (M) as compared to the initial sampling frequency ($f_S$);

a second decimator (470, 470B) for generating a second digital signal ($S_{RED2}$, R), having a second reduced sampling frequency ($f_{SR2}$), in response to said first digital signal ($S_{RED1}$), and an evaluator (230; 290, 290T; 294, 290, 290F) for performing a condition analysis function (F1, F2, Fn) for analysing the condition of the machine dependent on said second digital signal ($S_{RED2}$) having a reduced sampling frequency ($f_{SR1}$, $f_{SR2}$); wherein a speed value generator is adapted for recording a time sequence of measurement sample values (Se(i), $S_{(j)}$) of said digital measurement data signal ($S_{MD}$); wherein said speed value generator is adapted for recording a time sequence of position signal values ($P_{(i)}$) of said position signal (Ep) such that there is a first temporal relation ($n_{diff}$, $n_{diff1}$, $n_{diff2}$) between at least some of the recorded position signal values ($P_{(i)}$), and such that there is a second temporal relation between at least one of the recorded position signal values ($P_{(i)}$) and at least one of the recorded measurement sample values (Se(i), $S_{(j)}$); wherein said speed value generator is adapted for generating a value indicative of a speed change ($df_{ROT}$, a, $a_{1-2}$, $a_{2-3}$) of said rotational part (8) in dependence of said first temporal relation ($n_{diff}$, $n_{diff1}$, $n_{diff2}$); and said speed value generator is adapted for generating a speed value indicative of a momentary speed of rotation of said of said rotational part (8) in dependence of said value indicative of a speed change (dfROT, a, $a_{1-2}$, $a_{2-3}$) and a certain time value such that the speed value is indicative of the rotational speed at the moment of detection of at least one of said recorded measurement sample values (Se(i), $_{(j)}$); and wherein said second decimator (470, 470B) is adapted to perform said decimation dependent on said speed value (VT1, VT2, $f_{ROT}$).

Embodiment E15

An apparatus for analysing the condition of a machine having a part rotating with a speed of rotation ($f_{ROT}$), comprising:

a first sensor (10) adapted to generate an analogue electric measurement signal ($S_{EA}$) dependent on mechanical vibrations ($V_{MD}$) emanating from rotation of said part;

an analogue-to-digital converter (40, 44) adapted to sample said analogue electric measurement signal ($S_{EA}$) at an initial sampling frequency ($f_S$) so as to generate a digital measurement data signal ($S_{MD}$, $S_{ENV}$) in response to said received analogue electric measurement signal ($S_{EA}$);

a device (420) for generating a position signal (Ep) having a sequence of position signal values ($P_{(i)}$) for indicating momentary rotational positions of said rotating part;

a speed value generator (601) being adapted for recording a time sequence of measurement sample values (Se(i), $S_{(j)}$) of said digital measurement data signal ($S_{MD}$); wherein said speed value generator is adapted for recording a time sequence of position signal values ($P_{(i)}$) of said position signal (Ep) such that there is a first temporal relation ($n_{diff}$, $n_{diff1}$, $n_{diff2}$) between at least some of the recorded position signal values ($P_{(i)}$), and such that there is a second temporal relation between at least one of the recorded position signal values ($P_{(i)}$) and at least one of the recorded measurement sample values (Se(i), $S_{(j)}$); wherein said speed value generator is adapted for generating a value indicative of a speed change ($df_{ROT}$, a, $a_{1-2}$, $a_{2-3}$) of said rotational part (8) in dependence of said first temporal relation ($n_{diff}$, $n_{diff1}$, $n_{diff2}$); and said speed value generator is adapted for generating a speed value indicative of a momentary speed of rotation of said of said rotational part (8) in dependence of said value indicative of a speed change ($df_{ROT}$, a, $a_{1-2}$, $a_{2-3}$) and a certain time value such that the speed value is indicative of the rotational speed at the moment of detection of at least one of said recorded measurement sample values (Se(i), $S_{(j)}$).

Embodiment E16

An apparatus for analysing the condition of a machine having a part rotating with a speed of rotation ($f_{ROT}$), comprising:

a first sensor (10) adapted to generate an analogue electric measurement signal ($S_{EA}$) dependent on mechanical vibrations ($V_{MD}$) emanating from rotation of said part;

an analogue-to-digital converter (40, 44) adapted to sample said analogue electric measurement signal ($S_{EA}$) at an initial sampling frequency ($f_S$) so as to generate a digital measurement data signal ($S_{MD}$, $S_{ENV}$) in response to said received analogue electric measurement signal ($S_{EA}$);

a device (420) for generating a position signal (Ep) having a sequence of position signal values ($P_{(i)}$) for indicating momentary rotational positions of said rotating part; and a speed value generator (601) being adapted for recording a time sequence of said position signal values ($P_{(i)}$) such that there is a first temporal relation ($n_{diff}$, $n_{diff1}$, $n_{diff2}$) between at least some of the recorded position signal values ($P_{(i)}$); wherein said speed value generator comprises functionality adapted to distinguish between a constant speed phase (S #30) and an acceleration phase (S #40) in response to said a first temporal relation ($n_{diff}$, $n_{diff1}$, $n_{diff2}$) between at least some of the recorded position signal values ($P_{(i)}$).

Embodiment E17

An apparatus for analysing the condition of a machine having a part rotating with a speed of rotation ($f_{ROT}$), comprising:

a first sensor (10) adapted to generate an analogue electric measurement signal ($S_{EA}$) dependent on mechanical vibrations ($V_{MD}$) emanating from rotation of said part;

an analogue-to-digital converter (40, 44) adapted to sample said analogue electric measurement signal ($S_{EA}$) at an initial sampling frequency ($f_S$) so as to generate a digital measurement data signal ($S_{MD}$, $S_{ENV}$) in response to said received analogue electric measurement signal ($S_{EA}$);

a device (420) for generating a position signal (Ep) having a sequence of position signal values ($P_{(i)}$) for indicating momentary rotational positions of said rotating part; and a speed value generator (601) being adapted for recording a time sequence of said position signal values ($P_{(i)}$) such that there are angular distances (delta-FI$_{p1\text{-}p2}$, delta-FI$_{p2\text{-}p3}$) and corresponding durations (delta-T$_{p1\text{-}p2}$; delta-T$_{p2\text{-}p3}$) between at least three consecutive position signals (P1, P2, P3) wherein
the speed value generator (601) operates to establish at least two momentary speed values (VT1; VT2) based on said angular distances (delta-FI$_{p1\text{-}p2}$, delta-FI$_{p2\text{-}p3}$) and said corresponding durations (delta-T$_{p1\text{-}p2}$; delta-T$_{p2\text{-}p3}$).

Embodiment E18

The apparatus according to embodiment E17, wherein further momentary speed values for the rotational part (8) are established by interpolation between the at least two momentary speed values (VT1, VT2).

Embodiment E19

The apparatus according to embodiment E17, wherein a speed difference (V$_{Delta}$) is generated in dependence on said at least two momentary speed values (VT1; VT2), such as e.g. by calculation as $$V_{Delta} = VT2 - VT1$$

Embodiment E20

The apparatus according to embodiment E17, E18 or E19, wherein
the speed value generator (601) operates to establish (S #70) a first speed of revolution value (VT1) in dependence of
the angular distance (delta-FI$_{p1\text{-}p2}$) between a first positional signal (P1) and a second positional signal (P2), and in dependence of
a corresponding first duration (delta-T$_{p1\text{-}p2}$); and wherein the speed value generator (601) operates to establish (S #100) a second momentary speed value (VT2) in dependence of
the angular distance (delta-FI$_{p2\text{-}p3}$) between the second positional signal (P2) and a third positional signal (P3), and in dependence of
a corresponding second duration (delta-T$_{p2\text{-}p3}$).

Embodiment E21

The apparatus (14, 920) according to embodiment E20, wherein
the speed value generator (601) operates to assign (S #80) the calculated first speed value (VT1, V$_{(t1)}$) to a first time slot (t1) in the middle between the first positional signal (P1) and the second positional signal (P2); and wherein
the speed value generator (601) operates to assign (S #110) the calculated second speed value (VT2, V$_{(t2)}$) to a second mid time slot (t2) in the middle between the second positional signal (P2) and the third positional signal (P3).

Embodiment E22

The apparatus (14, 920) according to embodiment E21 when including embodiment E19, wherein
the speed difference (V$_{Delta}$) is divided by the number of time slots between the second mid time slot and the first mid time slot so as to generate a speed difference value dV indicative of a speed difference between adjacent slots.

What is claimed is:

1. A system for detecting an operating condition of a machine including a bearing associated with a shaft that rotates at a variable speed, the system comprising:
a position sensor configured to detect a plurality of position values of the shaft;
a vibration sensor configured to detect mechanical vibrations responsive to the rotation of the shaft with respect to the bearing;
an analog to digital converter configured to generate a digital measurement data signal responsive to the detected mechanical vibrations; and
one or more hardware processors configured to:
detect at least two momentary speed values of the shaft based on the detected plurality of position values of the shaft;
generate an interpolated momentary speed value of the shaft based on an interpolation between the at least two momentary speed values;
decimate, after the interpolation and the generation of the interpolated momentary speed value, the digital measurement data signal based on the generated interpolated momentary speed value; and
detect an operating condition of the machine based on the decimated digital measurement data signal.

2. The system according to claim 1, wherein the interpolation comprises a linear interpolation.

3. The system according to claim 1, wherein the interpolation comprises a non-linear interpolation.

4. The system according to claim 1, wherein the operating condition is detected based on an autocorrelation of the decimated digital measurement data signal.

5. A method of detecting an operating condition of a machine including a bearing associated with a shaft that rotates at a variable speed, the method comprising:
detecting a plurality of position values of the shaft;
detecting mechanical vibrations responsive to the rotation of the shaft with respect to the bearing;
generating a digital measurement data signal responsive to the detected mechanical vibrations;
detecting at least two momentary speed values of the shaft based on the detected plurality of position values of the shaft;
generating an interpolated momentary speed value of the shaft based on an interpolation between the at least two momentary speed values;
decimating, after the interpolation and the generation of the interpolated momentary speed value, the digital measurement data signal based on the generated interpolated momentary speed value; and
detecting an operating condition of the machine based on the decimated digital measurement data signal.

6. The method according to claim 5, wherein the interpolation comprises a linear interpolation.

7. The method according to claim 5, wherein the interpolation comprises a non-linear interpolation.

8. The method according to claim 5, wherein the operating condition is detected based on an autocorrelation of the decimated digital measurement data signal.

9. A system for detecting an operating condition of a machine including a bearing associated with a shaft that rotates at a variable speed, the system comprising one or more hardware processors configured to:

detect at least two momentary speed values of the shaft based on a plurality of position values of the shaft;

generate an interpolated momentary speed value of the shaft based on an interpolation between the at least two momentary speed values;

decimate, after the interpolation and the generation of the interpolated momentary speed value, a digital measurement data signal based on the generated interpolated momentary speed value, said digital measurement data signal being responsive to detected vibrations from a vibration sensor; and detect an operating condition of the machine based on the decimated digital measurement data signal.

10. The system according to claim 9, wherein the interpolation comprises a linear interpolation.

11. The system according to claim 9, wherein the interpolation comprises a non-linear interpolation.

12. The system according to claim 9, wherein the operating condition is detected based on an autocorrelation of the decimated digital measurement data signal.

* * * * *